(12) United States Patent
Maeda et al.

(10) Patent No.: US 12,448,321 B2
(45) Date of Patent: Oct. 21, 2025

(54) GLASS PLATE AND WINDOW

(71) Applicant: AGC Inc., Tokyo (JP)

(72) Inventors: Eriko Maeda, Chiyoda-ku (JP); Takato Kajihara, Chiyoda-ku (JP); Kensuke Nagai, Chiyoda-ku (JP); Yutaka Kuroiwa, Chiyoda-ku (JP); Osamu Kagaya, Chiyoda-ku (JP); Ryuta Sonoda, Chiyoda-ku (JP); Hiroyuki Hijiya, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 35 days.

(21) Appl. No.: 18/182,759

(22) Filed: Mar. 13, 2023

(65) Prior Publication Data

US 2023/0212059 A1 Jul. 6, 2023

Related U.S. Application Data

(60) Division of application No. 16/590,573, filed on Oct. 2, 2019, now Pat. No. 11,634,353, which is a continuation of application No. PCT/JP2018/017236, filed on Apr. 27, 2018.

(30) Foreign Application Priority Data

Apr. 28, 2017 (JP) .................................. 2017-090141
Jul. 20, 2017 (JP) ................................. 2017-140687

(51) Int. Cl.
*C03C 3/091* (2006.01)
*C03C 3/083* (2006.01)
*C03C 3/085* (2006.01)
*C03C 3/087* (2006.01)
*C03C 3/093* (2006.01)
*C03C 3/095* (2006.01)
*H01Q 1/12* (2006.01)
*B60J 1/00* (2006.01)
*C03C 3/105* (2006.01)
*C03C 3/108* (2006.01)

(52) U.S. Cl.
CPC .............. *C03C 3/091* (2013.01); *C03C 3/083* (2013.01); *C03C 3/085* (2013.01); *C03C 3/087* (2013.01); *C03C 3/093* (2013.01); *C03C 3/095* (2013.01); *H01Q 1/1271* (2013.01); *B60J 1/00* (2013.01); *C03C 3/105* (2013.01); *C03C 3/108* (2013.01)

(58) Field of Classification Search
CPC ......... C03C 3/083; C03C 3/085; C03C 3/087; C03C 3/091; C03C 3/093; C03C 3/095
See application file for complete search history.

(56) References Cited

U.S. PATENT DOCUMENTS

| 4,298,389 | A | 11/1981 | Johnson et al. |
| 4,298,939 | A | 11/1981 | Johnson et al. |
| 4,430,108 | A | 2/1984 | Hojaji et al. |
| 6,391,810 | B1 | 5/2002 | Lenhart |
| 11,634,353 | B2 * | 4/2023 | Maeda .................... C03C 3/091 501/61 |
| 2013/0135062 | A1 | 5/2013 | Kawamura et al. |
| 2013/0135063 | A1 | 5/2013 | Kawamura et al. |
| 2014/0356576 | A1 | 12/2014 | Dejneka et al. |
| 2015/0166403 | A1 | 6/2015 | Yamamoto |
| 2015/0263400 | A1 | 9/2015 | Kawamura et al. |
| 2015/0263401 | A1 | 9/2015 | Kawamura et al. |
| 2016/0355432 | A1 | 12/2016 | Kase |
| 2017/0081240 | A1 | 3/2017 | Endo |

FOREIGN PATENT DOCUMENTS

| JP | 1-103929 A | 4/1989 | |
| JP | 2001-080933 A | 3/2001 | |
| JP | 2002-348143 A | 12/2002 | |
| JP | 2004-323310 A | 11/2004 | |
| JP | 2013-115741 A | 6/2013 | |
| JP | 2014024731 A * | 2/2014 | ................ A61J 1/05 |
| WO | WO 2017/188415 A1 | 11/2017 | |

OTHER PUBLICATIONS

International Search Report issued Jul. 24, 2018 in PCT/JP2018/017236 filed Apr. 4, 2018.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

To provide a glass plate for a window material and a window comprising the glass plate, which are less likely to be a barrier to radio transmitting/receiving in use of a radio-utilizing apparatus, and a radio communication apparatus comprising the glass plate.
A glass plate having a radio transmittance of at least 20% at a frequency of 100 GHz as calculated as 18 mm thickness, a window comprising the glass plate, and a radio communication apparatus comprising the glass plate.

19 Claims, 5 Drawing Sheets

GLASS PLATE AND WINDOW

CROSS-REFERENCE TO RELATED APPLICATIONS

The present application is a division of U.S. patent application Ser. No. 16/590,573 filed on Oct. 2, 2019, which is a continuation of International patent application PCT/JP2018/017236 filed on Apr. 27, 2018, which is based on and claims the benefits of priority to Japanese Application No. 2017-090141 filed on Apr. 28, 2017 and Japanese Application No. 2017-140687 filed on Jul. 20, 2017. The entire contents of these applications are incorporated herein by reference.

TECHNICAL FIELD

The present invention relates to a glass plate used as a window material of a vehicle, a building, etc.

BACKGROUND ART

An apparatus utilizing radio waves (hereinafter referred to as "radio-utilizing apparatus"), such as radar and a mobile phone is commonly used in a vehicle represented by an automobile or in a building. Particularly in recent years, an apparatus which employs radio waves in a high frequency band (microwaves to millimeter waves), more specifically, in a GHz frequency band, for example, in a region of from 3 to 300 GHz, has been actively developed.

Glass used as a window material of an automobile or a building is disclosed, for example, in Patent Document 1. Patent Document 1 discloses that glass which has a high visible light transmittance, which has high ultraviolet and solar shielding performance and which is visually preferable, is obtained.

PRIOR ART DOCUMENTS

Patent Documents

Patent Document 1: JP-A-2002-348143

DISCLOSURE OF INVENTION

Technical Problem

However, glass for a window material, particularly considering properties assuming use of a radio-utilizing apparatus has not been found.

It is an object of the present invention to provide a glass plate for a window material and a window, which are less likely to impair radio transmitting/receiving by a radio-utilizing apparatus in an environment where a window glass is present.

Solution to Problem

The present invention provides a glass plate having a radio transmittance of at least 20% at a frequency of 100 GHz as calculated as 18 mm thickness, a window comprising the glass plate, and a radio communication apparatus comprising the glass plate.

Advantageous Effects of Invention

According to the glass plate and the window of the present invention, a radio-utilizing apparatus utilizing radio waves in a high frequency band can be used even in an automobile or in a building without any problem.

DESCRIPTION OF EMBODIMENTS

Unless otherwise specified, the following definitions of terms are applicable throughout description, drawings and claims.

"to" used to show the range of the numerical values is used to include the numerical values before and after it as the lower limit value and the upper limit value. The glass "containing substantially no" certain component means that the component is not actively added excluding an inevitably included impurity. The content of each component in the glass is represented by mol % based on oxides.

In this specification, the "radio transmittance" of the glass plate is obtained as follows.

Figure 1:
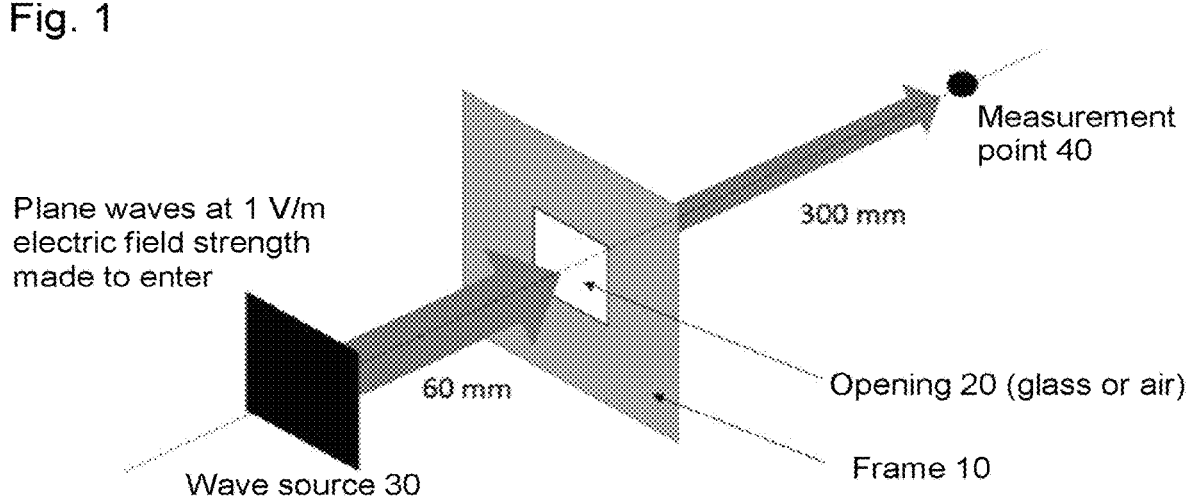
FIG. 1 is a view schematically illustrating outlines of conditions to determine the wave transmittance.
Figure 2A:
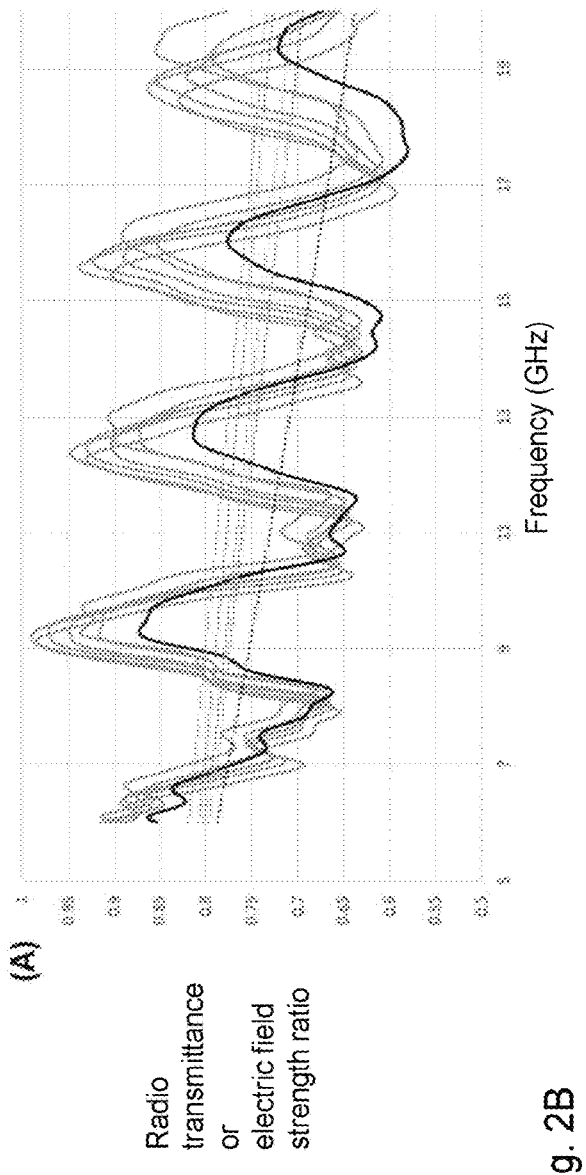
FIG. 2A is a graph illustrating the electric field strength ratios of glass plates with 18 mm thickness in Comparative Example 1 and Examples 1 to 6.
Figure 2B:
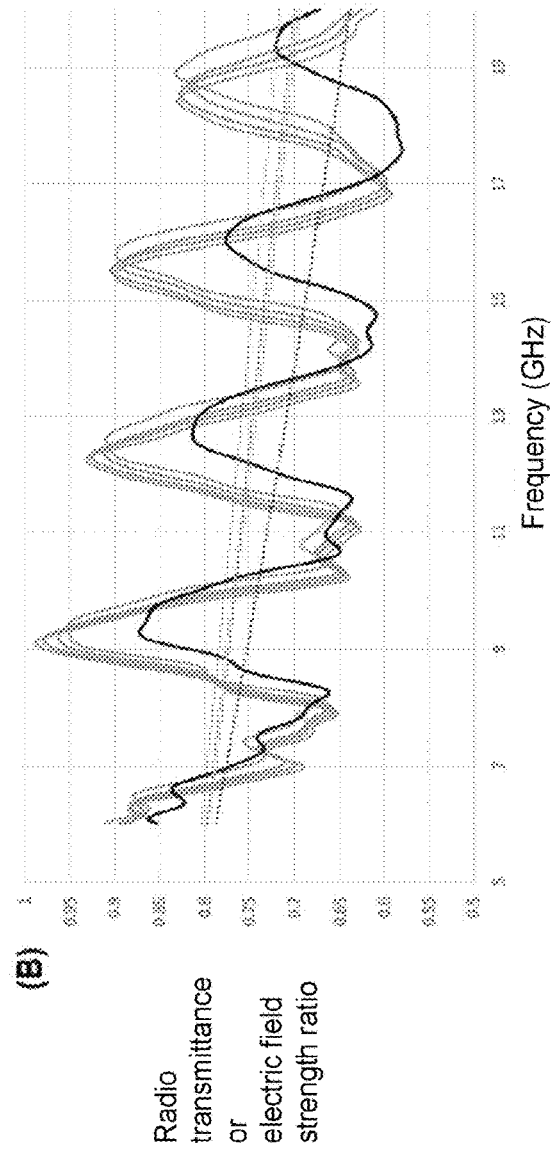
FIG. 2B is a graph illustrating the electric field strength ratios of glass plates with 18 mm thickness in Comparative Example 1 and Examples 7 to 12.
Figure 2C:
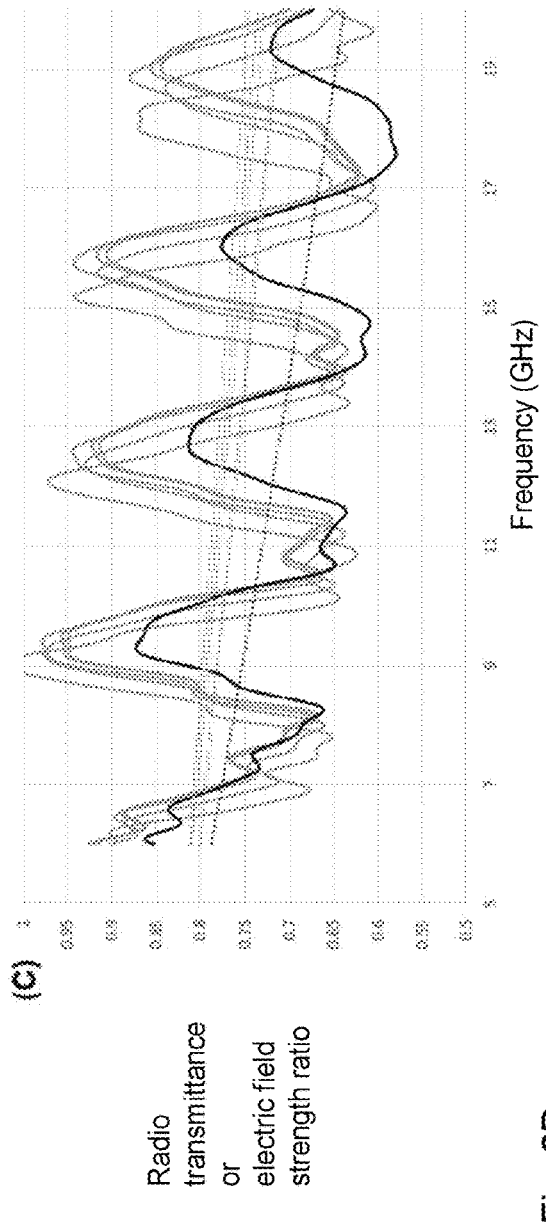
FIG. 2C is a graph illustrating the electric field strength ratios of glass plates with 18 mm thickness in Comparative Example 1 and Examples 13 to 17.
Figure 2D:
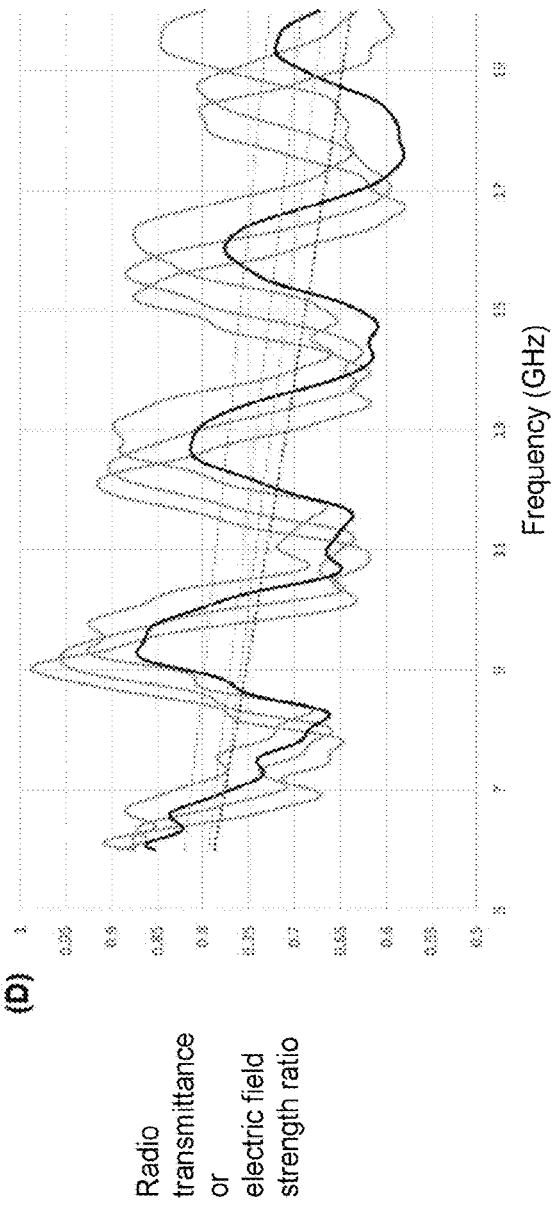
FIG. 2D is a graph illustrating the electric field strength ratios of glass plates with 18 mm thickness in Comparative Example 1 and Examples 18 to 20.

As shown in FIG. 1, it is assumed that a perfect conductor frame 10 having an infinite area and a finite thickness has a 90 mm square (8,100 mm$^2$) opening 20. From a wave source 30, 60 mm apart in a vertical direction from the opening, plane waves having an electric field strength of 1 V/m are made to enter the opening vertically so that the wave front is in parallel with the opening and the polarization direction is in parallel with one side of the opening. And, the electric field strength is measured at a point (measurement point 40) 300 mm apart in a vertical direction from the center of the opening on the opposite side of the opening from the wave source. A value obtained by dividing the electric field strength measured when a glass plate sample having the same shape and the same area as the opening 20 is fitted into the opening 20, by the electric filed strength when no glass plate sample is fitted (that is, the glass plate sample is replaced with an air block having the corresponding thickness), is the electric field strength ratio of the glass plate. This electric field strength is obtained by simulation by an electromagnetic field simulator (CST Microwave Studio 2016) under the above-described conditions.

The electric field strength ratio is a proportion of the electric field strength measured through the glass plate sample to the electric field strength measured through the air, and the unit is a dimensionless number unless otherwise specified, but may be represented by percentage (%). The electric field strength ratio may be determined in accordance with the thickness, the electric constant and the dielectric loss of the glass plate, and the frequency of the incident waves. Methods for measuring the dielectric constant and the dielectric loss of the glass plate sample are known for those skilled in the art, and they are measured, for example, by cavity resonator method.

In this specification, unless otherwise specified, meanings of the following terms are as follows.

The opening is a square opening in a perfect conductor frame having an infinite area. When the radio transmittance or the electric field strength after transmission of a glass plate is measured, a glass plate sample having the same shape and the same area as the opening is fitted into the opening. The wave front of the plane waves is in parallel with the opening surface, the polarization direction of the plane waves is in parallel with one side of the opening, and the plane waves enter the opening in a perpendicular direction. The distance from the opening represents the distance along the perpendicular from the opening surface. The measurement point a certain distance apart from the opening means a point the corresponding distance apart from the opening surface along the perpendicular from the center of the opening. The wave source and the measurement point are located opposite of the opening from each other.

The thickness of the glass plate is represented by mm, the area of the opening by mm$^2$, the wavelength of the radio waves by mm, the frequency by GHz, and the electric field strength by V/m.

The glass plate of the present invention has a radio transmittance of at least 20% at a frequency of 100 GHz as calculated as 18 mm thickness, whereby the glass plate is less likely to be a barrier to transmitting/receiving by a radio-utilizing apparatus such as radar and a mobile phone. In this specification, unless otherwise specified, the radio transmittance is obtained by conducting the after-described exponential approximation. The radio transmittance is preferably at least 21%, more preferably at least 22%, more preferably at least 25%, more preferably at least 29%, more preferably at least 33%, more preferably at least 37%, more preferably at least 40%, further preferably at least 43%, particularly preferably at least 45%, even more preferably at least 48%, most preferably at least 50%.

The thickness calculation of the radio transmittance can be analytically carried out e.g. by transmission formula of plane electromagnetic waves, for example, as described in Denjidouharon Nyumon (Electromagnetic Waveguide Introduction (Masahiro Hashimoto, published by THE NIKKAN KOGYO SHIMBUN, LTD., "Chapter 2: Transmission of Electromagnetic Waves".

The glass plate of the present invention has a radio transmittance of preferably at least 23% at a frequency of 80 GHz as calculated as 18 mm thickness, whereby the glass plate is less likely to be a barrier to transmitting/receiving by a radio-utilizing apparatus such as radar and a mobile phone. The radio transmittance is more preferably 25%, more preferably at least 26%, more preferably at least 30%, more preferably at least 35%, more preferably at least 40%, further preferably at least 44%, particularly preferably at least 48%, even more preferably at least 52%, most preferably at least 54%.

The glass plate of the present invention has a radio transmittance of preferably at least 39% at a frequency of 28 GHz as calculated as 18 mm thickness, whereby the glass plate is less likely to be a barrier to transmitting/receiving by a radio-utilizing apparatus such as radar and a mobile phone. The radio transmittance is more preferably at least 40%, more preferably at least 44%, more preferably at least 50%, more preferably at least 56%, further preferably at least 60%, particularly preferably at least 62%, even more preferably at least 65%, most preferably at least 68%.

The glass plate of the present invention has a radio transmittance of preferably at most 84% at a frequency of 100 GHz as calculated as 18 mm thickness. In order that the radio transmittance is higher than 84%, it may be necessary to excessively increase the $SiO_2$ component in the glass. Such glass is less likely to be melted, and the forming temperature tends to be high, whereby production of a large plate by e.g. float process, fusion process, roll out process or down draw process tends to be difficult. Further, if the radio transmittance is high, the $B_2O_3$ component has to be added in a large amount, whereby not only alkali elements are likely to volatilize during melting/forming, thus leading to deterioration of the glass quality, but also the average coefficient of linear expansion becomes low, whereby physical tempering tends to be difficult. Further, an increase of the $B_2O_3$ and $SiO_2$ components is likely to lead to a decrease of the Young's modulus, whereby the rigidity of the substrate decreases, and the strength at the time of use may not be secured. Further, in order to increase the radio transmittance, it is necessary to lower the content of alkali elements, which may lead to deterioration of the melting property and may remarkably deteriorate the viscosity, and further, such glass is likely to be devitrified, thus impairing the glass production. Such glass is not suitable as window glass particularly for automobiles and for building. Accordingly, the radio transmittance is more preferably at most 80%, more preferably at most 70%, more preferably at most 60%, more preferably at most 55%, further preferably at most 50%, particularly preferably at most 47%, even more preferably at most 45%, most preferably at most 43%.

The glass plate of the present invention has a radio transmittance of preferably at most 84% at a frequency of 80 GHz as calculated as 18 mm thickness. In order that the radio transmittance is higher than 84%, it may be necessary to excessively increase the $SiO_2$ component in the glass. Such glass is less likely to be melted, and the forming temperature tends to be high, and production of a large plate by e.g. float process, fusion process, roll-out process or down-draw process tends to be difficult. The radio transmittance is more preferably at most 80%, more preferably at most 70%, more preferably at most 61%, more preferably at most 58%, further preferably at most 55%, particularly preferably at most 52%, even more preferably at most 49%, most preferably at most 47%.

The glass plate of the present invention has a radio transmittance of preferably at most 84% at a frequency of 28 GHz as calculated as 18 mm thickness. In order that the radio transmittance is higher than 84%, it may be necessary to excessively increase the $SiO_2$ component in the glass. Such glass is less likely to be melted, and the forming temperature tends to be high, and production of a large plate by e.g. float process, fusion process, roll-out process or down-draw process tends to be difficult. The radio transmittance is more preferably at most 82%, more preferably at most 80%, more preferably at most 78%, more preferably at most 76%, further preferably at most 75%, particularly preferably at most 72%, even more preferably at most 68%, most preferably at most 64%.

In this specification, λ represents the wavelength (unit: mm) of radio waves. The glass plate of the present invention preferably satisfies a linear approximation of y>(0.0607×x), wherein y (V/m) is the electric field strength at a measurement point 10λ apart from the opening, when plane waves at a frequency of 10 GHz at an electric field strength of 1 V/m are made to enter a glass plate having a thickness of 1.2λ from a wave source 2λ apart from the opening 20, and x is a value obtained by dividing the opening area S (mm$^2$) by λ$^2$. The measured electric field strength y which varies depending upon the opening area may be determined by simulation by an electromagnetic simulator (CST Microwave Studio 2016) employing the above conditions. The linear approximation is, as is well known to those skilled in the art, a linear approximation obtained by least squares method. The description "enter a glass plate having a thickness of 1.2λ" means that the glass plate is calculated to 1.2λ thickness, and the actual thickness of the glass plate of the present invention is not necessarily 1.2λ.

The linear approximation of the glass plate being y>(0.0607×x) means that the slope of a graph of a linear function obtained by linear approximation of the relation between x and y obtained from the glass plate, is greater than the slope of the graph y=(0.0607×x). If the linear approximation is y≤(0.0607×x), that is, when the slope is at most 0.0607, functions of a radio-utilizing apparatus in a high frequency band tend to be impaired. The slope of the linear function obtained by the linear approximation is more preferably at least 0.0625, further preferably at least 0.0644. There is no particular upper limit of the slope, however, it can not be 0.0879 or greater (the value obtained when an air block is placed instead of the glass plate).

The slope of the linear function obtained by the linear approximation is preferably at most 0.0796. When it is at most 0.0796, the proportions of $SiO_2$ and $B_2O_3$ in the glass can be lowered, whereby the glass is easily produced, and further, the weather resistance and thermal expansion property of the glass can be adjusted, whereby a large glass plate suitable for preparation of a window for various applications is easily produced. The slope of the linear function obtained by the linear approximation is more preferably at most 0.0750, further preferably at most 0.0700, further preferably at most 0.0690, further preferably at most 0.0680, further preferably at most 0.0670, even more preferably at most 0.0665, most preferably at most 0.0657.

The glass plate of the present invention preferably satisfies an exponential approximation (in this specification, referred to as "exponential approximation at 100 GHz") of y'>exp(−0.081×x'), wherein y' is the approximate transmittance at a frequency of 100 GHz, and x' is the thickness of the glass plate.

The exponential approximation at 100 GHz is determined as follows.

First, a curve of changes of the electric field strength ratio in accordance with the frequency x" (GHz) is determined with respect to the glass plate to be measured as calculated as each of 12 mm, 18 mm, 24 mm, 30 mm, 36 mm and 40 mm thicknesses, the exponential approximation of the relation between x" and the electric field strength ratio (in this specification, the exponential approximation will sometimes be referred to as "exponential approximation of the relation between the frequency and the radio transmittance"), which is taken as the radio transmittance y". That is, a function y"=[constant 1]×e$^{[constant\ 2]\times x''}$ is approximated. The exponential approximation is, as is well known to those skilled in the art, an exponential approximation obtained by least squares method. For example, with respect to a thickness 12 mm of a glass plate (Comparative Example 1), exponential approximation of y"=0.7628e$^{-0.0003x''}$ is obtained, and with respect to a thickness 18 mm of the same glass plate, exponential approximation of y"=0.8619e$^{-0.015x''}$ is obtained.

This approximation formula is prepared based on analysis results by the electromagnetic simulator at from 6 to 20 GHz. It is known that due to characteristics of the electromagnetic simulator, the calculation accuracy is deteriorated as apart from the center frequency in the analysis frequency band, and particularly the accuracy in the low frequency band is remarkably deteriorated. Accordingly, values in a frequency band of at least 6 GHz are preferably employed. In this calculation, a frequency up to 20 GHz is taken as the analysis upper limit frequency, however, since the frequency dependence of the attenuation is negligibly small, the present approximation formula may be applied to a frequency of at least 20 GHz.

Accordingly, the glass plate of the present invention satisfies an exponential approximation of the relation between the frequency and the electric field strength ratio at a frequency of from 6 to 20 GHz, as calculated as 18 mm thickness, of preferably y">0.8619e$^{-0.015x''}$, more preferably y">0.85e$^{-0.012x''}$, further preferably y">0.84e$^{-0.010x''}$, particularly preferably y">0.84e$^{-0.09x''}$ even more preferably y">0.84e$^{-0.008x''}$, most preferably y">0.84e$^{-0.007x''}$.

Further, it is preferred that y"<0.84e$^{-0.0005x''}$, whereby the contents of $SiO_2$ and $B_2O_3$ components in the glass can be lowered, and the glass is easily produced and further, the weather resistance, thermal expansion property, etc. of the glass can be adjusted, whereby a large glass plate suitable for preparation of a window for various applications can easily be produced. More preferably y"<0.84e$^{-0.001x''}$, further preferably y"<0.84e$^{-0.003x'}$, particularly preferably y"<0.84e$^{-0.005x'}$, even more preferably y"<0.8435e$^{-0.006x''}$, most preferably y"<0.8462e$^{-0.007x''}$.

Now, the transmittance (approximate transmittance) at 100 GHz is calculated based on the exponential approximation formula of the relation between the frequency and the electric field strength ratio obtained with respect to each thickness, whereby a relation of the approximate transmittance y' depending upon the thickness x' is obtained with respect to frequency 100 GHz, and this relation is further subjected to exponential approximation, whereby the above-described "exponential approximation at frequency 100 GHz" is obtained. The thickness x' is changed as mentioned above for the purpose of calculation to obtain the exponential approximation, however, needless to say, a specific glass plate of the present invention may haven an optional thickness.

The electric field strength ratio of radio waves which passed through a glass plate usually greatly varies whether or not the multiple of the wavelength of the radio waves agrees with the thickness of the glass plate, and is complicatedly influenced by the reflection, refraction and interference of the radio waves. Accordingly, as the frequency is continuously increased, periodic fluctuations of the electric field strength ratio with an unstable locus are observed (for example, FIG. 2A to FIG. 2D). Accordingly, discussion on whether the electric field strength ratio measured at a specific frequency is higher or lower does not necessarily essentially describe the radio transmission characteristics of the glass material. That is, even when a first glass plate transmits radio waves in a larger amount than a second glass plate at a specific frequency, it is possible that the first glass is superior in the radio transmission characteristics as a whole by macroscopic observation in a wider frequency range (FIG. 2A to FIG. 2D). Accordingly, the above-described approximation is useful. By the approximation formula, macroscopic tendency of radio transmission characteristics is described.

The exponential approximation of a certain glass plate at a frequency of 100 GHz being y'>exp(−0.081×x') means that a graph of an exponential function obtained by subjecting the relation between x' and y' obtained from the glass plate to exponential approximation, is located above the graph of y'=exp(−0.081×x'). These graphs are such that y'=1 (transmittance: 100%) when x'=0 (no thickness of the glass plate), where x' is plotted on the horizontal axis and y' on the vertical axis. When the exponential approximation is y'≤exp(−0.081×x'), transmitting/receiving of a radio-utilizing apparatus in a high frequency band tends to be impaired. The coefficient of x' in the exponential weather resistance, thermal expansion property etc. of the glass can be adjusted, whereby a large glass plate suitable for preparation of windows for various applications can easily be produced. The coefficient is more preferably at most −0.03, further preferably at most −0.035, particularly preferably at most −0.04, even more preferably at most −0.045, most preferably at most −0.05.

The glass plate of the present invention has an area of preferably at least 900 mm². When the glass plate has an area of at least 900 mm², the radio transmitted amount for use of a radio-utilizing apparatus can be secured, and such glass may suitably be used for building, for automobiles, etc. The area is more preferably at least 2,500 mm², more preferably at least 10,000 mm², further preferably at least 90,000 mm², particularly preferably at least 180,000 mm², even more preferably at least 360,000 mm², most preferably at least 1,120,000 mm². The upper limit of the area is not particularly limited from the viewpoint of the radio transmittance, however, a glass plate larger than 100,000,000 mm² is difficult to produce. The area is more preferably at most 56,250,000 mm², further preferably at most 25,000,000 mm², particularly preferably at most 9,000,000 mm², even more preferably at most 4,000,000 mm², most preferably at most 2,160,000 mm². When the area of the glass plate is smaller than 900 mm², application in e.g. building or automobile field may be limited, and the absolute amount of radio waves which pass through the glass plate will be small regardless of the transmittance.

The glass plate of the present invention preferably satisfies A×radio transmittance of from 0.0225 m²·% to 8,400 m²·%. Here, "A" is the area (m²) of the glass plate, and the radio transmittance is a radio transmittance (%) at a frequency of 100 GHz as calculated as 18 mm thickness.

When A×radio transmittance is at least 0.0225 m²·%, electric field strength higher than a conventional glass plate can be obtained. If it is less than 0.0225 m²·%, use as a window in a high frequency band will be more difficult. A×radio transmittance is more preferably at least 0.4 m²·%, more preferably at least 4 m²·%, further preferably at least 8 m²·%, particularly preferably at least 16 m²·%, even more preferably at least 28 m²·%, most preferably at least 50 m²·%. Further, by increasing A×radio transmittance, the radio transmitted amount can be increased. There is no particular upper limit of A×radio transmittance, however, it is preferably at most 8,400 m²·%. If A is too large, production of the glass plate tends to be difficult. A×radio transmittance is more preferably at most 3,000 m²·%, further preferably at most 800 m²·%, still more preferably at most 400 m²·%, particularly preferably at most 200 m²·%, even more preferably at most 120 m²·%, most preferably at most 80 m²·%.

The glass plate of the present invention preferably satisfies a radio transmittance/t of from 0.7%/mm to 84%/mm. Here, t is the thickness (mm) of the glass plate, and the radio transmittance is a radio transmittance (%) at a frequency of 100 GHz as calculated as 18 mm thickness. When the radio transmittance/t is at least 0.7%/mm, an approximate transmittance higher than that of a conventional glass plate can be obtained. If the radio transmittance/thickness t is less than 0.7%/mm, use as a window in a high frequency band will be more difficult. The radio transmittance/t is preferably at least 1%/mm, more preferably at least 2%/mm, further preferably at least 3%/mm, particularly preferably at least 4%/mm, even more preferably at least 5%/mm, most preferably at least 5.5%/mm. By increasing the radio transmittance or by reducing the thickness, the radio transmittance/t becomes high, and the approximate transmittance can be increased. There is no particular upper limit of the radio transmittance/t, however, it is preferably at most 84%/mm. If t is too small, deflection tends to be great, and such glass can hardly be used in a large area, and glass having a high radio transmittance tends to contain the $SiO_2$ component in a large amount, whereby production of a glass plate tends to be difficult. Further, in order to achieve a high radio transmittance, the $B_2O_3$ component should be added in a large amount, whereby not only alkali elements are likely to volatilize during melting/forming, thus leading to deterioration of the glass quality, but also the average coefficient of linear expansion becomes low, and physical tempering tends to be difficult. Further, an increase of the $B_2O_3$ and $SiO_2$ components tends to lead to a decrease in the Young's modulus, whereby rigidity of the substrate may be decreased, and strength at the time of use may not be secured. Further, in order to increase the radio transmittance, it is necessary to lower the content of alkali elements, thus leading to deterioration of melting property, whereby the viscosity will remarkably be deteriorated, and further, glass is likely to be devitrified, and glass production may be impaired. Accordingly, the radio transmittance/t is preferably at most 65%/mm, more preferably at most 50%/mm, further preferably at most 40%/mm, particularly preferably at most 30%/mm, even more preferably at most 25%/mm, most preferably at most 20%/mm.

Further, considering the application, when the glass plate is used for building, the thickness of the glass plate is thick in many cases, whereby the lower limit of the radio transmittance/t is preferably lower, and it is more preferably at least 1.3%/mm, further preferably at least 1.6%/mm, particularly preferably at least 1.8%/mm, even more preferably at least 2.4%/mm, most preferably at least 3%/mm. Further, the upper limit is also preferably lower, and it is more preferably at most 25%/mm, further preferably at most 15%/mm, particularly preferably at most 11%/mm, even more preferably at most 9%/mm, most preferably at most 8%/mm.

When the glass plate is used for automobiles, the thickness of the glass plate is from 2 mm to 6 mm for example, and the lower limit of the radio transmittance/t is more preferably at least 5%/mm, further preferably at least 6%/mm, particularly preferably at least 7%/mm, even more preferably at least 7.5%/mm, most preferably at least 8%/mm. Further, the upper limit is more preferably at most 25%/mm, further preferably at most 20%/mm, particularly preferably at most 16%/mm, even more preferably at most 13%/mm, most preferably at most 12%/mm.

On the other hand, in a case where a thin glass plate of from 1 to 2 mm is used, the lower limit of the radio transmittance/t is more preferably at least 15%/mm, further preferably at least 17%/mm, particularly preferably at least 20%/mm, even more preferably at least 25%/mm, most preferably at least 30%/mm. The upper limit is more preferably at most 70%/mm, further preferably at most 60%/mm, particularly preferably at most 55%/mm, even more preferably at most 50%/mm, most preferably at most 48%/mm.

The glass plate of the present invention preferably has a specific gravity of from 2.40 to 3.00, and preferably has a Young's modulus of from 60 GPa to 100 GPa. The average coefficient of linear expansion from 50° C. to 350° C. is preferably from $50\times10^{-7}/°$ C. to $120\times10^{-7}/°$ C. When the glass plate satisfies such physical property requirements, it can be sufficiently suitably used as a window material for building, for automobiles, etc.

In order to secure the weather resistance, a certain amount or more of $SiO_2$ is preferably contained, and the $B_2O_3$ content is preferably lower. As a result, the specific gravity is preferably at least 2.40, more preferably at least 2.42, further preferably at least 2.44, still more preferably at least 2.46, particularly preferably at least 2.48, even more preferably at least 2.50, most preferably at least 2.52. The specific gravity is preferably at most 3.0, whereby the glass is less likely to be fragile, and weigh saving is achieved, and it is more preferably at most 2.90, further preferably at most 2.80, still more preferably at most 2.75, particularly preferably at most 2.70, even more preferably at most 2.65, most preferably at most 2.62.

By a high Young's modulus, the glass plate has rigidity and is more suitable for building, for automobiles, etc. The Young's modulus is more preferably at least 65 GPa, further preferably at least 70 GPa, still more preferably at least 72 GPa, particularly preferably at least 74 GPa, even more preferably at least 75 GPa, most preferably at least 76 GPa. If $SiO_2$ is increased so as to increase the Young's modulus, the melting property may be deteriorated. Accordingly, the Young's modulus is preferably at most 100 GPa, more preferably at most 95 GPa, further preferably at most 90 GPa, still more preferably at most 85 GPa, particularly preferably at most 82 GPa, even more preferably at most 80 GPa, most preferably at most 78 GPa.

The average coefficient of linear expansion is preferably low from the viewpoint of occurrence of thermal stress to the temperature distribution of the glass plate when used, and accordingly the average coefficient of linear expansion from 50° C. to 350° C. is preferably at most $120\times10^{-7}/°$ C., more preferably at most $100\times10^{-7}/°$ C., more preferably at most $100\times10^{-7}/°$ C., further preferably at most $90\times10^{-7}/°$ C., particularly preferably at most $80\times10^{-7}/°$ C., even more preferably at most $70\times10^{-7}/°$ C., most preferably at most $60\times10^{-7}/°$ C. However, if the linear expansion coefficient is too low, the thermal expansion difference with e.g. a metal sash tends to be large, thus leading to distortion and thereby breakage. Accordingly, the average coefficient of linear expansion from 50° C. to 350° C. is preferably at least $35\times10^{-7}/°$ C., more preferably at least $40\times10^{-7}/°$ C., more preferably at least $45\times10^{-7}/°$ C., further preferably at least $50\times10^{-7}/°$ C., particularly preferably at least $55\times10^{-7}/°$ C.

Further, for use in applications to building, for automobiles, etc., it is preferred that physical tempering is possible, and accordingly, the average coefficient of linear expansion is more preferably higher. The average coefficient of linear expansion from 50° C. to 350° C. is more preferably at least $60\times10^{-7}/°$ C., further preferably at least $65\times10^{-7}/°$ C., particularly preferably at least $70\times10^{-7}/°$ C., even more preferably at least $75\times10^{-7}/°$ C., most preferably at least $80\times10^{-7}/°$ C.

The glass plate of the present invention is preferably such that the $Na_2O$ elution amount in water resistance test is preferably from 0.001 mg to 0.6 mg. The water resistance test is to determine the $Na_2O$ elution amount (mg) by JIS 3502 (1995).

A glass plate such that the $Na_2O$ elution amount in the water resistance test is at most 0.6 mg can be commonly used as a window without any problem. The $Na_2O$ elution amount in the water resistance test is more preferably at most 0.55 mg, further preferably at most 0.5 mg, particularly preferably at most 0.4 mg, even more preferably at most 0.35 mg, most preferably at most 0.3 mg. The $Na_2O$ elution amount in the water resistance test is preferably smaller, however, the amount of $SiO_2$ should be increased so as to reduce the elution amount, and if so, the viscosity at the time of melting in glass production tends to be high, and the melting property may be deteriorated. Accordingly, the $Na_2O$ elution amount in the water resistance test is preferably at least 0.001 mg, more preferably at least 0.01 mg, further preferably at least 0.05 mg, particularly preferably at least 0.1 mg, even more preferably at least 0.15 mg, most preferably at least 0.2 mg.

Of the glass plate of the present invention, $T_2$ is preferably at most 1,750° C. Further, $T_4$ is preferably at most 1,350° C. Further, $T_4$-$T_L$ is preferably at least −150° C. In this specification, $T_2$ is a temperature at which the glass viscosity becomes $10^2$ (dPa·s), $T_4$ is a temperature at which the glass viscosity becomes $10^4$ (dPa·s), and $T_L$ is the liquid phase temperature of the glass.

If $T_2$ or $T_4$ is higher than such a predetermined temperature, it is difficult to produce a large plate e.g. by float process, fusion process, roll out process or down draw process. $T_2$ is more preferably at most 1,700° C., further preferably at most 1,650° C., still more preferably at most 1,625° C., particularly preferably at most 1,600° C., even more preferably at most 1,575° C., still even more preferably at most 1,550° C., most preferably at most 1,500° C. $T_4$ is preferably at most 1,350° C., more preferably at most 1,300° C., further preferably at most 1,250° C., particularly preferably at most 1,200° C., even more preferably at most 1,150° C., still even more preferably at most 1,100° C., most preferably at most 1,050° C. The lower limits of $T_2$ and $T_4$ are not particularly limited, and in order to maintain the weather resistance and the glass specific gravity, typically $T_2$ is at least 1,200° C., and $T_4$ is at least 800° C. $T_2$ is more preferably at least 1,250° C., further preferably at least 1,300° C., particularly preferably at least 1,350° C., even more preferably at least 1,400° C. $T_4$ is more preferably at least 900° C., further preferably at least 940° C., particularly preferably 960° C., even more preferably at least 980° C., most preferably at least 1,000° C.

Further, in order that production by float process is possible, $T_4$-$T_L$ is preferably at least −150° C. When $T_4$-$T_L$ is at least −150° C., problems will not arise such that the glass is devitrified at the time of glass forming, mechanical properties of the glass will decrease, and the transparency will decrease, whereby glass having good quality can be obtained. $T_4$-$T_L$ is more preferably at most −140° C., more preferably at most −130° C., more preferably at most −120° C., more preferably at most −110° C., more preferably at most −100° C. Further, $T_4$-$T_L$ is more preferably at least −90° C., more preferably at least −80° C., more preferably at least −70° C., further preferably at least −60° C., further preferably at least −50° C., further preferably at least −40° C., still more preferably at least −30° C., still more preferably at least −20° C., still more preferably at least −10° C., particularly preferably at least 0° C., even more preferably at least 10° C., most preferably at least 20° C.

Of the glass plate of the present invention, $T_g$ is preferably from 400° C. to 750° C. In this specification, $T_g$ represents the glass transition point. When $T_g$ is within such a temperature range, glass bending process can be carried out within a usual production condition range. If $T_g$ is lower than 400° C., although there is no problem in forming property, problems are likely to arise such that the alkali content or the alkaline earth content tends to be too high, whereby thermal expansion of the glass may be excessive, or the weather resistance will decrease. Further, in a forming temperature region, the glass may be devitrified and may not be formed. $T_g$ is more preferably at least 430° C., further preferably at least 450° C., particularly preferably at least 470° C., even more preferably at least 480° C., most preferably at least 490° C. Further, if $T_g$ is too high, high temperature is required at the time of glass bending process, and production will be more difficult. $T_g$ is more preferably at most 650° C., more preferably at most 600° C., more preferably at most 575° C., more preferably at most 565° C., further preferably at most 555° C., particularly preferably at most 550° C., even more preferably at most 520° C., most preferably at most 500° C.

The visible light transmittance $T_{VA}$ is a visible light transmittance calculated by measuring the transmittance by a spectrophotometer in accordance with JIS R3106: 1998. As the weighting factors, standard illuminant A, 2 degree field of view values are employed. In this specification, the value is represented by a value as calculated as 3.85 mm plate thickness.

The value as calculated as 3.85 mm plate thickness is a value (visible light transmittance $T_{VA}$) of the glass plate as calculated as 3.85 mm plate thickness, considering the multiple reflection, by the reflectance of the glass plate calculated by Sellmeier's equation from the refractive index of the glass plate the transmittance of which was measured.

The visible light transmittance $T_{VA}$ is, to secure the visibility, although it depends on the application, preferably at least 30%, more preferably at least 40%, further preferably at least 50%, particularly preferably at least 60%, even more preferably at least 65%, most preferably at least 72%. The upper limit of the visible light transmittance $T_{VA}$ varies depending upon the application, however, if it is too high, heat rays will also be transmitted in a large amount, whereby the heat shielding property may be deteriorated. Further, it is necessary to use raw materials having less impurities so as to increase the visible light transmittance $T_{VA}$, and such raw materials can hardly be available, and further, the glass should have a large amount of the $SiO_2$ component, whereby melting property will be deteriorated, and a large glass plate can hardly be produced. Accordingly, $T_{VA}$ is preferably at most 92%. $T_{VA}$ is more preferably at most 91.5%, further preferably at most 91%, particularly preferably at most 90.5%, even more preferably at most 90%, most preferably at most 89%.

The visible light transmittance $T_{VA}$ is mainly adjusted by adjusting the amounts of coloring components such as $Fe_2O_3$ and $TiO_2$, however, it may be slightly adjusted also by the glass components. Further, it may be adjusted also by adjusting the glass production conditions, such as the melting temperature and the melting atmosphere.

The glass plate of the present invention, when used as a glass for vehicles, has a visible light transmittance $T_{VA}$ of preferably higher than 70% so as to increase the visibility, and more preferably at least 71%, particularly preferably at least 72%.

The solar direct transmittance Te is as specified by ISO 13837A: 2008. In this specification, it is represented by a value as calculated as 3.85 mm plate thickness.

If the solar direct transmittance Te is too low, the visible light transmittance tends to be lowered, and visibility can hardly be secured, although it depends on the application. Further, such glass is hardly produced since a low Te is hardly achieved even by adjusting the melting temperature or the like. The solar direct transmittance Te is preferably at least 35%, more preferably at least 40%, preferably at least 45%, more preferably at least 50%, further preferably at least 55%, particularly preferably at least 60%, even more preferably at least 65%, most preferably at least 70%. Further, although the upper limit of the solar direct transmittance Te varies depending upon the application, if the solar direct transmittance is too high, heat rays will also be transmitted in a large amount, whereby the heat shielding property may be impaired. Further, it is necessary to use raw materials having less impurities so as to increase the solar direct transmittance Te, and such raw materials can hardly be available, and further, the glass should have a large amount of the $SiO_2$ component, whereby melting property will be deteriorated, and a large glass plate can hardly be produced. Accordingly, the solar direct transmittance Te is preferably at least 91%, more preferably at most 90%, further preferably at most 88%, particularly preferably at most 85%, even more preferably at most 80%, most preferably at most 75%.

The solar direct transmittance Te can be adjusted by coloring components such as $Fe_2O_3$ and $TiO_2$ or the glass components, or by adjusting the glass production conditions, such as the melting temperature and the melting atmosphere.

In a case where the glass is used as glass for vehicles having heat shielding performance, the solar direct transmittance Te is, so as to increase the heat shielding performance, preferably at most 65%, more preferably at most 60%, further preferably at most 58%, still more preferably at most 55%, particularly preferably at most 53%. On the other hand, if Te is too low, the visible light transmittance is lowered, and the visibility can hardly be secured. Accordingly, it is preferably at least 35%, more preferably at least 38%, further preferably at least 40%, particularly preferably at least 41%.

The ultraviolet transmittance Tuv is as specified by ISO 9050: 2003. In this specification, it is represented by a value as calculated as 3.85 mm plate thickness. If the ultraviolet transmittance Tuv is too high, ultraviolet rays are also transmitted in a large amount, thus adversely affecting the human body, and further, an interior material of a building, a vehicle or the like for which the glass plate of the present invention is used, may be deteriorated. Tuv is preferably at most 90%, more preferably at most 80%, further preferably at most 70%, particularly preferably at most 50%, most preferably at most 30%. It is necessary that the glass plate contains $Fe_2O_3$, $TiO_2$, $CeO_2$ and the like so as to lower Tuv, and if their content is high, the visible light transmittance $T_{VA}$ may decrease, or solarization by sunlight may occur. Accordingly, Tuv is preferably at least 1%, more preferably at least 5%, particularly preferably at least 10%. Further, the ultraviolet transmittance Tuv is, so as to prevent deterioration of the interior material and to reduce the cooling load in the car, preferably at most 40%, more preferably at most 35%, further preferably at most 30%.

The glass plate of the present invention may be used also for a sensor employing infrared rays such as a laser radar. In a case where it is used as glass for a vehicle having an infrared irradiation apparatus such as a laser radar, in order to be suitably used for a laser radar, the transmittance at a wavelength of 905 nm as calculated as 3.85 mm plate thickness is preferably at least 70%, more preferably at least 75%, further preferably at least 80%, particularly preferably at least 85%, particularly preferably at least 88%, most preferably at least 90%.

The glass plate of the present invention may be used also for a sensor employing infrared rays such as a laser radar. In a case where it is used as glass for a vehicle having an infrared irradiation apparatus such as a laser radar, in order to be suitably used for a laser radar, the transmittance at a wavelength of 1,550 nm as calculated as 3.85 mm plate thickness is preferably at least 70%, more preferably at least 75%, further preferably at least 80%, particularly preferably at least 85%, particularly preferably at least 88%, most preferably at least 90%.

Of the glass plate of the present invention, the dielectric loss can be lowered by adjusting the glass composition, whereby a high radio transmittance can be achieved. Likewise, the dielectric constant can be adjusted by adjusting the composition, and a dielectric constant suitable for the application can be achieved.

Of the glass plate of the present invention, the $SiO_2$ content as represented by mol % based on oxides is preferably from 55% to 75%. Further, the $Al_2O_3$ content is preferably from 0% to 15%. Since $SiO_2$ and $Al_2O_3$ contributes to improvement of the Young's modulus, the strength required for an application to building, an application to automobiles, is likely to be secured. If the content of $Al_2O_3$ and/or $SiO_2$ is lower than the above lower limit value, the weather resistance can hardly be secured, and further, the average coefficient of linear expansion tends to be too high, and heat breakage is likely to occur. Further, if the amount of $Al_2O_3$ and/or $SiO_2$ is too large, the viscosity at the time of glass melting will increase, whereby glass production may be difficult. Further, if the amount of $Al_2O_3$ is too large, the radio transmittance may be low.

The $SiO_2$ content is more preferably at least 57%, further preferably at least 60%, still more preferably at least 63%, particularly preferably at least 64%, even more preferably at least 65%, most preferably at least 66%. The $SiO_2$ content is more preferably at most 74%, further preferably at most 73%, particularly preferably at most 72%, even more preferably at most 70%, most preferably at most 69%.

The $Al_2O_3$ content is more preferably at least 0.3%, further preferably at least 0.5%, still more preferably at least 1.0%, particularly preferably at least 1.3%, even more preferably at least 1.5%, most preferably at least 2%. The $Al_2O_3$ content is, in order to keep the glass viscosity $T_2$ to be low thereby to facilitate glass production, more preferably at most 10%, further preferably at most 6%, still more preferably at most 5%, even more preferably at most 4%, most preferably at most 3.5%.

In order to improve the radio transmittance, $SiO_2+Al_2O_3$, that is, the sum of the $SiO_2$ content and the $Al_2O_3$ content is preferably from 50% to 80%. Further considering keeping $T_2$ and $T_4$ to be low and facilitating glass production, $SiO_2+Al_2O_3$ is preferably at most 80%, more preferably at most 75%, further preferably at most 72%, even more preferably at most 71%, most preferably at most 70%. However, if $SiO_2+Al_2O_3$ is too low, the weather resistance may decrease and the average coefficient of linear expansion may be too high, and accordingly $SiO_2+Al_2O_3$ is preferably at least 55%, preferably at least 64%, more preferably at least 65%, further preferably at least 66%, even more preferably at least 67%, most preferably at least 68%.

Of the glass plate of the present invention, the $B_2O_3$ content is preferably from 0% 15 to 15%. By $B_2O_3$ being contained, the melting property and the glass strength will improve, and an effect to increase the radio transmittance will be obtained. If the amount of $B_2O_3$ is too large, alkali elements are likely to volatilize during melting/forming, thus leading to deterioration of the glass quality. Further, if the amount of $B_2O_3$ is large, the average coefficient of linear expansion becomes low, whereby physical tempering tends to be difficult. The $B_2O_3$ content is more preferably at most 12%, further preferably at most 10%, still more preferably at most 8%, particularly preferably at most 6%, even more preferably at most 4%, most preferably at most 2%. It is very preferred that substantially no $B_2O_3$ is contained.

Of the glass plate of the present invention, the MgO content is preferably from 0% to 20%. MgO is a component which promotes melting of glass raw materials and improves the weather resistance. The MgO content is more preferably at least 0.1%, further preferably at least 0.2%, particularly preferably at least 0.3%, even more preferably at least 0.5%. If the MgO content is at most 20%, devitrification is less likely to occur, and an effect to increase the radio transmittance may sometimes be obtained. The MgO content is more preferably at most 15%, further preferably at most 8%, particularly preferably at most 4%, even more preferably at most 2%, most preferably at most 1%.

In the glass plate of the present invention, CaO, SrO and/or BaO may be contained in a certain amount so as to reduce the dielectric loss of the glass. The CaO content is preferably at least 0% and at most 20%. The SrO content is preferably at least 0% and at most 15%. The BaO content is preferably from 0% to 15%. When CaO, SrO and/or BaO is contained, the melting property of the glass may improve. The CaO content is more preferably at least 3%, whereby the dielectric loss of the glass reduces, and thus the radio transmittance will improve. Further, CaO being contained in a content of at least 3% may lead to an improvement of the melting property of the glass (a decrease of $T_2$ and a decrease of $T_4$). The CaO content is further preferably at least 6%, particularly preferably at least 8%, even more preferably at least 10%, most preferably at least 11%. By the CaO content being at most 20%, the SrO content being at most 15% and the BaO content being at most 15%, an increase of the specific gravity of the glass will be avoided, and low fragility and the strength can be maintained. In order to prevent the glass from being fragile, the CaO content is more preferably at most 15%, further preferably at most 14%, particularly preferably at most 13.5%, even more preferably at most 13%, most preferably at most 12.5%. The SrO content is more preferably at most 8%, further preferably at most 3%, particularly preferably at most 2%, even more preferably at most 1%, and most preferably substantially no SrO is contained. The BaO content is more preferably at most 5%, further preferably at most 3%, particularly preferably at most 2%, even more preferably at most 1%, and most preferably substantially no BaO is contained.

In this specification, "RO" means the total content of MgO, CaO, SrO and BaO. Of the glass plate of the present invention, RO is preferably from 0% to 20%. When RO is at most 20%, an improvement of the weather resistance will be obtained. In the glass plate of the present invention, RO is more preferably at most 17%, further preferably at most 16%, particularly preferably at most 15%, even more preferably at most 14%, most preferably at most 13%.

Further, with a view to lowering $T_2$ and $T_4$ at the time of production, or with a view to increasing the Young's modulus, of the glass plate of the present invention, RO is preferably higher than 0%, more preferably at least 0.5%, further preferably at least 5%, particularly preferably at least 8%, even more preferably at least 10%, most preferably at least 12%.

Further, in order to prevent occurrence of devitrification at the time of glass melting or at the time of forming, thus leading to deterioration of the glass quality, MgO+CaO, that is, the sum of the MgO content and the CaO content is preferably from 0% to 30%. MgO+CaO is more preferably at most 25%, further preferably at most 20%, even more preferably at most 15%, most preferably at most 13%. However, if MgO+CaO is too low, the glass viscosity at the time of melting/forming may be too high, whereby glass production may be difficult. Accordingly, MgO+CaO is more preferably at least 1%, further preferably at least 2%, particularly preferably at least 3%, even more preferably at least 4%, most preferably at least 5%.

Of the glass plate of the present invention, the $Na_2O$ content is preferably from 0% to 20%. $Na_2O$ and $K_2O$ are components which improve the melting property of the glass, and by either one or both being contained each in a content of at least 0.1%, $T_2$ and $T_4$ can easily be kept to be at most 1,750° C. and at most 1,350° C., respectively. Further, by $Na_2O$ being contained, chemical tempering is possible. The $Na_2O$ content is more preferably at least 0.1%, further preferably at least 1%, particularly preferably at least 3%, even more preferably at least 5%, most preferably at least 6%.

It is more preferred that both $Na_2O$ and $K_2O$ are contained, whereby the weather resistance can be improved while the melting property is maintained, and further, an effect to increase the radio transmittance may sometimes be obtained. If the $Na_2O$ and/or $K_2O$ content is low, the average coefficient of linear expansion cannot be made high, and heat tempering may not be conducted. Within the above predetermined amount, the glass may be utilized as a material for a window having favorable compatibility with another member.

If the $Na_2O$ amount is too large, the average coefficient of linear expansion will be too high, whereby heat breakage is likely to occur. The $Na_2O$ content is more preferably at most 16%, further preferably at most 14%, particularly preferably at most 12%, even more preferably at most 10%, most preferably at most 8%.

Of the glass plate of the present invention, the $K_2O$ content is preferably at least 0% to 20%. $K_2O$ is a component which improves the melting property of the glass and is likely to keep $T_2$ and $T_4$ to be at most 1,750° C. and at most 1,350° C., respectively, and accordingly the $K_2O$ content is more preferably at least 0.1%, further preferably at least 0.9%, particularly preferably at least 2%, even more preferably at least 3%, most preferably at least 4%.

Further, if the amount of $K_2O$ is too large, the average coefficient of linear expansion may be too high, and heat breakage is likely to occur. If the $K_2O$ content is higher than 20%, the weather resistance may be lowered. The $K_2O$ content is more preferably at most 16%, further preferably at most 14%, particularly preferably at most 12%, even more preferably at most 10%, most preferably at most 8%.

From the viewpoint of the radio transmittance, within the above range, a high radio transmittance can be obtained.

Of the glass plate of the present invention, the $Li_2O$ content is preferably from 0% to 20%. $Li_2O$ is a component which improves the melting property of the glass, and further, increases the Young's modulus and contributes to an improvement of the strength of the glass. By $Li_2O$ being contained, chemical tempering is possible, and further, an effect to increase the radio transmittance may sometimes be obtained. The $Li_2O$ content is more preferably at least 0.1%, further preferably at least 1%, particularly preferably at least 2%, even more preferably at least 3%, most preferably at least 4%.

If the amount of $Li_2O$ is too large, devitrification or phase separation may occur at the time of glass production, whereby glass production may be difficult. The $Li_2O$ content is more preferably at most 16%, further preferably at most 12%, particularly preferably at most 8%, even more preferably at most 7%, most preferably at most 6.5%.

In this specification, "$R_2O$" means the total amount of alkali metal oxides, and usually means the total content of $Li_2O$, $Na_2O$ and $K_2O$. Of the glass plate of the present invention, $R_2O$ is preferably from 0% to 20%. When $R_2O$ is at most 20%, an improvement of the weather resistance will be achieved. $R_2O$ of the glass plate of the present invention is more preferably at most 19%, further preferably at most 18.5%, particularly preferably at most 18%, even more preferably at most 17.5%, most preferably at most 17%.

Further, with a view to lowering $T_2$ and $T_4$ at the time of production, $R_2O$ is preferably higher than 0%, more preferably at least 1%, further preferably at least 5%, still more preferably at least 6%, particularly preferably at least 8%, especially particularly preferably at least 10%, even more preferably at least 11%, most preferably at least 12%.

$Na_2O/R_2O$ is, in order to increase the radio transmittance, preferably from 0.01 to 0.98. If $Na_2O/R_2O$ is too low or too high, an effect to increase the radio transmittance may not sufficiently be obtained. $Na_2O/R_2O$ is preferably at least 0.01, more preferably at least 0.05, further preferably at least 0.1, particularly preferably at least 0.2, even more preferably at least 0.25, most preferably at least 0.3. If no $Li_2O$ is contained, the lower content of $Na_2O/R_2O$ is preferably somewhat high as compared with a case where $Li_2O$ is contained, and $Na_2O/R_2O$ is preferably at least 0.01, more preferably at least 0.1, further preferably at least 0.2, particularly preferably at least 0.3, even more preferably at least 0.35, most preferably at least 0.4.

The $Na_2O/R_2O$ is preferably at most 0.98, more preferably at most 0.8, further preferably at most 0.6, particularly preferably at most 0.5, even more preferably at most 0.45, most preferably at most 0.4. In a case where no $Li_2O$ is contained, the upper limit of $Na_2O/R_2O$ is preferably somewhat high as compared with a case where $Li_2O$ is contained, and $Na_2O/R_2O$ is preferably at most 0.98, more preferably at most 0.9, further preferably at most 0.8, particularly preferably at most 0.7, even more preferably at most 0.65, most preferably at most 0.6.

$K_2O/R_2O$ is, in order to increase the radio transmittance, preferably from 0.01 to 0.98. If $K_2O/R_2O$ is too low or too high, an effect to increase the radio transmittance may not sufficiently be obtained. $K_2O/R_2O$ is preferably at least 0.01, more preferably at least 0.05, further preferably at least 0.1, particularly preferably at least 0.2, even more preferably at least 0.25, most preferably at least 0.3. In a case where no $Li_2O$ is contained, the lower limit of $K_2O/R_2O$ is preferably somewhat high as compared with a case where $Li_2O$ is contained, and $K_2O/R_2O$ is preferably at least 0.01, more preferably at least 0.1, further preferably at least 0.2, particularly preferably at least 0.3, even more preferably at least 0.35, most preferably at least 0.4.

$K_2O/R_2O$ is preferably at most 0.98, more preferably at most 0.8, further preferably at most 0.6, particularly preferably at most 0.5, even more preferably at most 0.45, most preferably at most 0.4. In a case where no $Li_2O$ is contained, the upper limit of $K_2O/R_2O$ is preferably somewhat high as compared with a case where $Li_2O$ is contained, and $K_2O/R_2O$ is preferably at most 0.98, more preferably at most 0.9, further preferably at most 0.8, particularly preferably at most 0.7, even more preferably at most 0.65, most preferably at most 0.6.

$R_2O \times MgO$ is preferably low so as to increase the radio transmittance. $R_2O \times MgO$ is preferably at most $100\%^2$, more preferably at most $80\%^2$, further preferably at most $66\%^2$, still more preferably at most $60\%^2$, particularly preferably at most $50\%^2$, even more preferably at most $40\%^2$, most preferably at most $30\%^2$. In a case where no $Li_2O$ is contained, the upper limit of $R_2O \times MgO$ is preferably somewhat high as compared with a case where $Li_2O$ is contained, and $R_2O \times MgO$ is preferably at most $250\%^2$, more preferably at most $200\%^2$, further preferably at most $150\%^2$, particularly preferably at most $100\%^2$, even more preferably at most $85\%^2$, most preferably at most $80\%^2$.

Further, in order to prevent boron and alkali elements from volatilizing during melting/forming, thus leading to deterioration of the glass quality, $R_2O+B_2O_3$, that is, the sum of the $R_2O$ content and the $B_2O_3$ content is preferably at most 30%. $R_2O+B_2O_3$ is more preferably at most 25%, further preferably at most 20%, even more preferably at most 19%, most preferably at most 18%. However, if $R_2O+B_2O_3$ is too low, the glass viscosity at the time of melting and forming may be too high, whereby glass production may be difficult. Accordingly, $R_2O+B_2O_3$ is preferably at least 1%, more preferably at least 2%, further preferably at least 3%, even more preferably at least 4%, most preferably at least 5%.

Of the glass plate of the present invention, $7Al_2O_3+3MgO$ is preferably from 0% to 66%. By $Al_2O_3$, MgO and $7Al_2O_3+3MgO$ satisfying the above content ranges, an improvement of the radio transmittance of the glass material can be achieved. From the viewpoint of the radio transmittance, $7Al_2O_3+3MgO$ is preferably low. If $7Al_2O_3+3MgO$ is higher than the predetermined amount, the average coefficient of linear expansion is hardly maintained, and matching with another member may be impaired, or physical tempering may be difficult. $7Al_2O_3+3MgO$ is more preferably at most 60%, further preferably at most 55%, still more preferably at most 48%, particularly preferably at most 42%, even more preferably at most 30%, most preferably at most 24%.

However, from the viewpoint of the weather resistance, $7Al_2O_3+3MgO$ is preferably higher, and more preferably at least 0.5%, further preferably at least 5%, particularly preferably at least 10%, even more preferably at least 15%, most preferably at least 20%, whereby sufficient weather resistance will be obtained.

Of the glass plate of the present invention, $7Al_2O_3+3MgO-4Li_2O$ is preferably from −60% to 66%. By $Al_2O_3$, MgO, $Li_2O$ and $7Al_2O_3+3MgO-4Li_2O$ satisfying the above content ranges, an improvement of the radio transmittance of the glass material will be achieved. With a view to increasing the radio transmittance and increasing the Young's modulus, $7Al_2O_3+3MgO-4Li_2O$ is preferably low. Further, if $7Al_2O_3+3MgO-4Li_2O$ is higher than the predetermined amount, the average coefficient of linear expansion is hardly maintained, and matching with another member may be impaired, or physical tempering may be difficult. $7Al_2O_3+3MgO-4Li_2O$ is more preferably at most 50%, further preferably at most 40%, particularly preferably at most 30%, even more preferably at most 20%, most preferably at most 10%.

However, from the viewpoint of the weather resistance, $7Al_2O_3+3MgO-4Li_2O$ is preferably high, and is more preferably at least −50%, further preferably at least −40%, particularly preferably at least −30%, even more preferably at least −20%, most preferably at least −10%, whereby sufficient weather resistance will be obtained.

Of the glass plate of the present invention, the $ZrO_2$ content is preferably from 0% to 5%. $ZrO_2$ has an effect to lower the viscosity of the glass at the time of melting and to accelerate melting, and may contributes to an improvement of heat resistance and chemical durability. If the $ZrO_2$ content is high, the liquid phase temperature will increase, and the average coefficient of linear expansion may increase. The $ZrO_2$ content is more preferably at most 2.5%, further preferably at most 2%, particularly preferably at most 1.0%, even more preferably at most 0.5%, and most preferably substantially no $ZrO_2$ is contained.

The glass plate of the present invention preferably satisfies $85\% \leq SiO_2+Al_2O_3+MgO+CaO+SrO+BaO+Li_2O+Na_2O+K_2O+Fe_2O_3+TiO_2 \leq 100\%$, whereby a glass plate can be produced from easily available glass raw materials, and the weather resistance of the glass plate is likely to be secured. The above total content is more preferably at least 88%, further preferably at least 90%, particularly preferably at least 92%, even more preferably at least 95%, still even more preferably at least 98%, most preferably at least 99.5%. Since a glass plate for a window material typically contains a coloring agent, a fining agent, etc., the upper limit of the above total content is more preferably 99.9%.

Of the glass plate of the present invention, the $Fe_2O_3$ content is preferably from 0.001% to 5%. Here, the $Fe_2O_3$ content is a total iron content including FeO which is an oxide of bivalent iron and $Fe_2O_3$ which is an oxide of trivalent iron. If the $Fe_2O_3$ content is less than 0.001%, the glass plate may not be used for an application for which heat shielding property is required, it is necessary to use an expensive raw material having a low iron content for production of the glass plate, and further, thermal radiation may reach the bottom of the melting furnace more than necessary at the time of glass melting and a burden may be imposed on the melting furnace. The $Fe_2O_3$ content is more preferably at least 0.005%, further preferably at least 0.01%, particularly preferably at least 0.015%, even more preferably at least 0.02%, most preferably at least 0.05%.

If the $Fe_2O_3$ content is higher than 5%, heat transfer by radiation may be inhibited, whereby the raw materials may not easily be melted. Further, if the $Fe_2O_3$ content is too high, the light transmittance in the visible region decreases ($T_V$ decreases), and such a glass plate may not be suitable for an application to automobiles. Accordingly, the $Fe_2O_3$ content is more preferably at most 2%, further preferably at most 1%, further preferably at most 0.8%, still more preferably at most 0.6%, particularly preferably at most 0.5%, even more preferably at most 0.4%, most preferably at most 0.3%.

Of the glass plate of the present invention, in a case where an infrared irradiation apparatus such as a laser radar is used, the content of bivalent iron (FeO) as calculated as $Fe_2O_3$ is preferably from 0.0001% to 0.02%. In order to increase the heat absorption efficiency of the glass melt at the time of melting the glass raw materials and to improve the melting property, the content is preferably at least 0.0002%, more preferably at least 0.0006%, further preferably at least 0.0008%, particularly preferably at least 0.001%. Further, FeO absorbs light from the visible region to the near infrared region, so as to increase the transmittance in a near infrared region, the content is preferably at most 0.015%, more preferably at most 0.01%, further preferably at most 0.008%, particularly preferably at most 0.006%, particularly preferably at most 0.004%.

Of the glass plate of the present invention, in a case where it is required to have heat shielding performance, the content of bivalent iron (FeO) as calculated as $Fe_2O_3$ is preferably from 0.05% to 0.16%. Since FeO absorbs light from the visible region to the near infrared region and increases the heat shielding performance, the FeO content is preferably at least 0.07%, more preferably at least 0.08%, further preferably at least 0.09%, particularly preferably at least 0.1%. Further, if the FeO content is high, the glass will absorb heat at the time of production, whereby the glass production may be difficult, and accordingly the FeO content is preferably at most 0.015%, more preferably at most 0.01%, further preferably at most 0.008%, particularly preferably at most 0.006%, particularly preferably at most 0.004%.

Of the glass plate of the present invention, in a case where an infrared irradiation apparatus such as a laser radar is used, the mass ratio of bivalent iron as calculated as $Fe_2O_3$ to the total iron as calculated as $Fe_2O_3$ (hereinafter sometimes referred to as Fe-redox) is preferably higher than 0% and at most 35%. Here, the mass ratio of bivalent iron as calculated as $Fe_2O_3$ means the ratio of the content of FeO which is an oxide of bivalent iron as calculated as the form of $Fe_2O_3$, to the total iron content. That is, the content of bivalent iron as calculated as $Fe_2O_3$ is calculated by multiplying the FeO content by $\{(159.7 \div 2)/71.85\}$, since the molecular weight of FeO is 71.85 g/mol, and the molecular weight of $Fe_2O_3$ is 159.7 g/mol. By Fe-redox being higher than 0%, the heat absorption efficiency of the glass melt at the time of melting the glass raw materials is increased, and the melting property can be improved. As a method of adjusting Fe-redox, for example, melting at low temperature, or use of an oxidizing agent such as cerium oxide or chromium oxide may be mentioned. Fe-redox is preferably at least 1%, more preferably at least 2%, further preferably at least 3%, particularly preferably at least 4%, most preferably at least 5%.

Further, if Fe-redox is high, the transmittance in the near infrared region may be decreased, and accordingly Fe-redox is preferably at most 35%, more preferably at most 30%, further preferably at most 25%, still more preferably at most 20%, particularly preferably at most 15%, most preferably at most 10%.

Of the glass plate of the present invention, in a case where it is required to have heat shielding performance, Fe-redox is preferably higher than 30%, more preferably at least 35%, further preferably at least 40%, still more preferably at least 45%, particularly preferably at least 50%, most preferably at least 55%. By Fe-redox being higher than 30%, the heat shielding property of the glass may be improved. As a method of increasing Fe-redox, for example, melting at high temperature, or use of a reducing agent such as tin oxide or coke may be mentioned.

In a case where the glass plate of the present invention contains $SO_3$, if it is melted in a reducing atmosphere so as to increase Fe-redox, sulfur (S) becomes negative bivalent sulfur. As a result, it reacts with positive bivalent iron in the glass, thus causing amber coloring, whereby the transmittance in the visible region may decrease. Accordingly, Fe-redox is preferably at most 80%, more preferably at most 75%, further preferably at most 70%, still more preferably at most 65%, particularly preferably at most 60%, most preferably at most 58%.

Of the glass plate of the present invention, the $TiO_2$ content is preferably from 0.001% to 5%. If the $TiO_2$ content is less than 0.001%, at the time of production of the glass plate of the present invention, a bubble layer may form on the molten glass surface. If a bubble layer forms, the temperature of the molten glass will not increase, whereby the molten glass can hardly be fined, whereby the productivity tends to deteriorate. In order to reduce or eliminate the bubble layer formed on the molten glass surface, a titanium compound as an anti-foaming agent may be supplied to the bubble layer formed on the molten glass surface. The titanium compound is included into the molten glass, and is present as $TiO_2$. This titanium compound may be an inorganic titanium compound (such as titanium tetrachloride or titanium oxide) or may be an organic titanium compound. The organic titanium compound may be a titanate or its derivative, a titanium chelate or its derivative, a titanium acylate or its derivative, or titanium oxalate. The $TiO_2$ content is more preferably at least 0.005%, further preferably at least 0.01%, particularly preferably at least 0.02%, even more preferably at least 0.05%, most preferably at least 0.06%. Further, since $TiO_2$ has absorption in the ultraviolet region, it is preferably added for an application in which ultraviolet rays should be blocked. In such a case, the $TiO_2$ content is preferably at least 0.04%, more preferably at least 0.1%, further preferably at least 0.2%, particularly preferably at least 0.5%. However, if the $TiO_2$ content is high, the liquid phase temperature will increase, and devitrification may occur, and further, since $TiO_2$ has absorption in the visible region, yellow coloring may occur, and accordingly the $TiO_2$ content is preferably at most 5%. The $TiO_2$ content is more preferably at most 1%, further preferably at most 0.5%, particularly preferably at most 0.3%, even more preferably at most 0.2%, most preferably at most 0.1%.

In a case where an infrared irradiation apparatus such as a laser radar is used, if moisture is present in the glass, which has absorption in the near infrared region, the transmittance in the near infrared region decreases, and such glass is not suitable for application to an infrared irradiation apparatus. Moisture in the glass is generally represented by a value p-OH, and p-OH is preferably at most 0.5, more preferably at most 0.4, further preferably at most 0.3, particularly preferably at most 0.2. p-OH may be obtained in accordance with the following formula from the transmittance of the glass plate measured by using FT-IR (Fourier transform infrared spectrophotometer):

$$\beta\text{-OH (mm}^{-1}) = (1/X)\log_{10}(T_A/T_B)$$

X: thickness (mm) of glass plate $T_A$: transmittance (%) at a reference wave number of 4,000 cm$^{-1}$ $T_B$: minimum transmittance (%) in the vicinity of hydroxy group absorption wave number of 3,600 cm$^{-1}$ The heat shielding property of the glass plate of the present invention can be increased when moisture is present in the glass, which has absorption in the near infrared region. So as to increase the heat shielding property, p-OH in the glass is preferably at least 0.05, more preferably at least 0.07, further preferably at least 0.1, particularly preferably at least 0.15.

The glass plate of the present invention further preferably has composition ranges as identified in the following ten embodiments, whereby more excellent properties will be achieved.

The glass plate according to embodiment 1 of the present invention preferably satisfies the following conditions.

It contains, as represented by mol % based on oxides, the following components in the following contents:

$55 \leq SiO_2 \leq 75$ $0 \leq Al_2O_3 \leq 9$ $0 \leq B_2O_3 \leq 15$ $0 \leq MgO \leq 15$ $0 \leq CaO \leq 20$ $0 \leq SrO \leq 15$ $0 \leq BaO \leq 15$ $0 \leq Li_2O < 0.01$ $1.2 \leq Na_2O \leq 15.6$ $3.5 \leq K_2O \leq 12.5$ $0 \leq ZrO_2 \leq 2$ $0.001 \leq Fe_2O_3 \leq 5$ $0.001 \leq TiO_2 \leq 5$ $4.7 \leq R_2O \leq 19.5$ $0 \leq RO \leq 20$ $85 \leq SiO_2 + Al_2O_3 + MgO + CaO + SrO + BaO + Li_2O + Na_2O + K_2O + Fe_2O_3 + TiO_2 \leq 100$ $42 < 7Al_2O_3 + 3MgO \leq 66$ $0.25 \leq Na_2O/R_2O \leq 0.8$ $R_2O + B_2O_3 \leq 23$ $0 \leq PbO < 0.001$.

Within the range of the embodiment 1, a glass plate having a high radio transmittance and satisfying properties required for the desired application can be obtained.

In order to increase the radio transmittance, in the embodiment 1, the following range is more preferred. The $SiO_2$ content is, in order to increase the Young's modulus and the weather resistance, more preferably at least 57%, further preferably at least 60%. In order to suppress deterioration of the viscosity by a viscosity increase, it is more preferably at most 70%, further preferably at most 68%, particularly preferably at most 66%.

The $Al_2O_3$ content is, in order to increase the Young's modulus and the weather resistance, more preferably at least 2%, more preferably at least 3%, further preferably at least 4%, particularly preferably at least 5%. In order to increase the radio transmittance, it is more preferably at most 8%, further preferably at most 7%, still more preferably at most 6%, particularly preferably at most 5%, most preferably at most 4.5%. The MgO content is, with a view to improving the melting property and the weather resistance, more preferably at least 0.1%, further preferably at least 0.25%, particularly preferably at least 0.4%. With a view to improving the viscosity, it is more preferably at most 13%, further preferably at most 10%, still more preferably at most 7%, particularly preferably at most 5%, particularly preferably at most 4.5%, especially particularly preferably at most 4%, even more preferably at most 3%, still even more preferably at most 2%, most preferably at most 1%.

The CaO content is, in order to improve the melting property and to increase the radio transmittance, preferably at least 1%. It is more preferably at least 2%, further preferably at least 4%, particularly preferably at least 5%, even more preferably at least 6%, most preferably at least 8%. The CaO content is, with a view to suppressing devitrification, more preferably at most 18%, further preferably at most 16%, particularly preferably at most 15%, even more preferably at most 14%, particularly preferably at most 13%, most preferably at most 12%.

SrO may be contained so as to improve the melting property and to increase the radio transmittance, and if SrO is contained, its content is preferably at least 0.5%, more preferably at least 1%. The SrO content is, in order to prevent the glass from being fragile, more preferably at most 12%, further preferably at most 10%, particularly preferably at most 8%, even more preferably at most 5%, still even more preferably at most 3%, most preferably at most 2%.

BaO may be contained so as to improve the melting property and to increase the radio transmittance, and in a case where BaO is contained, its content is preferably at least 0.5%, more preferably at least 1%, particularly preferably at least 2%. The BaO content is, so as to prevent the glass from being fragile, more preferably at most 12%, further preferably at most 10%, particularly preferably at most 9%, even more preferably at most 7%, still even more preferably at most 5%, most preferably at most 3%.

The $Na_2O$ content is, in order to increase the melting property and to adjust the average coefficient of linear expansion, more preferably at least 3%, further preferably at least 4%, particularly preferably at least 5%, even more preferably at least 6%, most preferably at least 7%. Further, $Na_2O$ if contained deteriorates the weather resistance, and accordingly its content is more preferably at most 15%, further preferably at most 14%, particularly preferably at most 13%, even more preferably at most 12%, still even more preferably at most 11%, most preferably at most 10%.

The $K_2O$ content is, in order to increase the radio transmittance and to adjust the average coefficient of linear expansion, more preferably at least 4%, further preferably at least 4.5%, particularly preferably at least 5%, even more preferably at least 5.5%, most preferably at least 6%. Further, $K_2O$ if contained deteriorates the weather resistance, and accordingly its content is more preferably at most 12%, further preferably at most 11.5%, particularly preferably at most 11%, even more preferably at most 10.5%, most preferably at most 10%.

$ZrO_2$ may be contained so as to improve the chemical durability, and in a case where $ZrO_2$ is contained, its content is more preferably at least 0.5%. In order that the average coefficient of linear expansion is not high, the content is more preferably at most 1.8%, further preferably at most 1.5%.

The $R_2O$ content is, with a view to improving the melting property, more preferably at least 5%, more preferably at least 6%, further preferably at least 7%, still more preferably at least 8%, particularly preferably at least 10%. On the other hand, in order to improve the weather resistance, it is more preferably at most 18.5%, further preferably at most 17%, still more preferably at most 16%, particularly preferably at most 15%, most preferably at most 14%.

The RO content is, with a view to improving the melting property and improving the radio transmittance, more preferably at least 5%, further preferably at least 7%, particularly preferably at least 10%. On the other hand, with a view to improving the weather resistance and suppressing devitrification, it is more preferably at most 19%, further preferably at most 18%, still more preferably at most 17%, particularly preferably at most 16%, most preferably at most 15%.

The glass plate according to the present embodiment more preferably satisfies $85 \leq SiO_2+Al_2O_3+MgO+CaO+SrO+BaO+Li_2O+Na_2O+K_2O+Fe_2O_3+TiO_2 \leq 100$, whereby the glass plate can be produced from easily available glass raw materials.

$7Al_2O_3+3MgO$ is, in order to increase the radio transmittance, more preferably at least 43%, further preferably at least 44%, particularly preferably at least 44.5%, even more preferably at least 45%, most preferably at least 45.5%. Further, $7Al_2O_3+3MgO$ is more preferably at most 60%, further preferably at most 58%, particularly preferably at most 56%, even more preferably at most 52%, most preferably at most 50%.

$Na_2O/R_2O$ is, in order to increase the radio transmittance, more preferably at least 0.3, further preferably at least 0.35, particularly preferably at least 0.4, even more preferably at least 0.43, most preferably at least 0.45. Further, $Na_2O/R_2O$ is more preferably at most 0.75, further preferably at most 0.7, particularly preferably at most 0.65, still even more preferably at most 0.6, most preferably at most 0.55.

In the embodiment 1 of the present invention, $SiO_2+Al_2O_3$ is preferably at least 50%, further preferably at least 55%, particularly preferably at least 60%, even more preferably at least 65%, still even more preferably at least 67%, most preferably at least 68%. Further, $SiO_2+Al_2O_3$ is preferably at most 80%, more preferably at most 78%, particularly preferably at most 76%, even more preferably at most 74%, most preferably at most 72%.

$R_2O \times MgO$ is, in order to increase the radio transmittance, preferably lower. In a case where no $Li_2O$ is contained, the upper limit of $R_2O \times MgO$ is preferably higher, and is preferably at most $250\%^2$.

In order to prevent boron and alkali elements from volatilizing during melting/forming, thus leading to deterioration of the glass quality, $R_2O+B_2O_3$ is preferably at most 23%. $R_2O+B_2O_3$ is more preferably at most 22%, more preferably at most 21%, further preferably at most 20%, still even more preferably at most 19%, most preferably at most 18.5%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 4%, further preferably at least 8%, even more preferably at least 10%, most preferably at least 12%.

In order to prevent boron and alkali elements from volatilizing during melting/forming, thus leading to deterioration of the glass quality, the $B_2O_3$ content is preferably at most 15%, more preferably at most 12%, more preferably at most 10%, more preferably at most 7%, further preferably at most 5%, still more preferably at most 4%, even more preferably at most 3%, still even more preferably at most 2%, most preferably at most 1%.

In order to prevent occurrence of devitrification at the time of glass melting/forming, thus leading to deterioration of the glass quality, MgO+CaO is more preferably at most 20%, further preferably at most 18%, particularly preferably at most 16%, even more preferably at most 15%, still even more preferably at most 14%, most preferably at most 13%. However, if MgO+CaO is too low, the glass viscosity at the time of melting/forming may be too high, whereby glass production may be difficult. Accordingly, MgO+CaO is preferably at least 1%, more preferably at least 2%, further preferably at least 4%, even more preferably at least 5%, still even more preferably at least 7%, most preferably at least 9%, still most preferably at least 10%.

By the glass plate satisfying such conditions, a high radio transmittance in a high frequency band can be achieved.

The glass plate according to embodiment 2 of the present invention preferably satisfies the following conditions.

It contains, as represented by mol % based on oxides, the following components in the following contents:

$55 \leq SiO_2 \leq 75$ $0 \leq Al_2O_3 \leq 6$ $0 \leq B_2O_3 \leq 15$ $0 \leq MgO \leq 14$ $0 \leq CaO \leq 20$ $0 \leq SrO \leq 15$ $0 \leq BaO \leq 15$ $0 Li_2O \leq 0.01$ $4 \leq Na_2O \leq 17$ $1.9 \leq K_2O \leq 14.2$ $0 \leq ZrO_2 \leq 2$ $0.001 \leq Fe_2O_3 \leq 5$ $0.001 \leq TiO_2 \leq 3$ $5.9 \leq R_2O \leq 20$ $0 \leq RO \leq 20$ $85 \leq SiO_2+Al_2O_3+MgO+CaO+SrO+BaO+Li_2O+Na_2O+K_2O+Fe_2O_3+TiO_2 \leq 100$ $23.5 < 7Al_2O_3+3MgO \leq 42$ $0.22 \leq Na_2O/R_2O \leq 0.85$ $R_2O \times MgO \leq 66$ $55 \leq SiO_2+Al_2O_3 \leq 76$ $0 PbO < 0.001$.

Within the range of the embodiment 2, a glass plate having a high radio transmittance and satisfying properties required for the desired application can be obtained.

In order to increase the radio transmittance, in the embodiment 2, the following range is more preferred.

The $SiO_2$ content is, in order to increase the Young's modulus and the weather resistance, more preferably at least 60%, further preferably at least 65%, still more preferably at least 66%, particularly preferably at least 67%, most preferably at least 68%, and with a view to improving the viscosity, more preferably at most 74%, further preferably at most 73%, particularly preferably at most 72%, most preferably at most 71%.

The $Al_2O_3$ content is, in order to increase the Young's modulus and the weather resistance, more preferably at least 0.5%, further preferably at least 1%, particularly preferably at least 1.5%, most preferably at least 2%, and in order to increase the radio transmittance, more preferably at most 5%, further preferably at most 4%, still more preferably at most 3%.

The MgO content is, with a view to improving the melting property and the weather resistance, more preferably at least 0.1%, further preferably at least 0.25%, particularly preferably at least 0.35%, and with a view to improving the viscosity, more preferably at most 13%, further preferably at most 10%, further preferably at most 9%, still more preferably at most 7%, particularly preferably at most 5%, especially particularly preferably at most 4%, even more preferably at most 3%, still even more preferably at most 2%, most preferably at most 1%.

The CaO content is, in order to improve the melting property and to increase the radio transmittance, preferably at least 1%, more preferably at least 3%, further preferably at least 4%, particularly preferably at least 6%, even more preferably at least 8%, most preferably at least 10%. The CaO content is, with a view to suppressing devitrification, preferably at most 18%, further preferably at most 17%, particularly preferably at most 16%, even more preferably at most 15%, most preferably at most 14%.

SrO may be contained so as to improve the melting property and to increase the radio transmittance, and in a case where SrO is contained, its content is preferably at least 0.5%, more preferably at least 1%. The SrO content is, in order to prevent the glass from being fragile, more preferably at most 12%, further preferably at most 10%, particularly preferably at most 7%, even more preferably at most 4%, most preferably at most 2%.

BaO may be contained so as to improve the melting property and to increase the radio transmittance, and in a case where BaO is contained, its content is preferably at least 0.5%. It is more preferably at least 1%, particularly preferably at least 2%. The BaO content is, in order to prevent the glass from being fragile, more preferably at most 12%, further preferably at most 10%, particularly preferably at most 8%, even more preferably at most 5%, most preferably at most 3%.

In order to increase the radio transmittance while keeping the melting property, the $Na_2O$ content is preferably from 4% to 17%. Within such a range, the above-described range of $Na_2O/R_2O$ and range of $R_2O \times MgO$ are likely to be maintained in proper ranges, and the weather resistance is secured. The $Na_2O$ content is more preferably at least 4.5%, further preferably at least 5%, most preferably at least 6%. Further, the $Na_2O$ content is more preferably at most 16%, further preferably at most 14%, particularly preferably at most 12%, even more preferably at most 11%, most preferably at most 10%.

The $K_2O$ content is, in order to increase the radio transmittance, more preferably at least 2%, further preferably at least 3.5%, still more preferably at least 4%, particularly preferably at least 5%, even more preferably at least 5.5%, most preferably at least 6%, and more preferably at most 13.5%, further preferably at most 12%, particularly preferably at most 11%, even more preferably at most 10.5%, most preferably at most 10%.

$ZrO_2$ may be contained so as to improve chemical durability, and in a case where $ZrO_2$ is contained, its content is more preferably at least 0.5%. In order that the average coefficient of linear expansion is not high, the $ZrO_2$ content is more preferably at most 1.8%, further preferably at most 1.5%.

The RO content is, with a view to improving the melting property, more preferably at least 7%, further preferably at least 8%, particularly preferably at least 10%. On the other hand, in order to improve the weather resistance, it is more preferably at most 18%, further preferably at most 16%, still more preferably at most 14%, particularly preferably at most 13%, most preferably at most 12%.

The RO content is, with a view to improving the melting property and improving the radio transmittance, more preferably at least 2%, more preferably at least 5%, further preferably at least 7%, still more preferably at least 8%, particularly preferably at least 10%. On the other hand, with a view to improving the weather resistance and suppressing devitrification, it is more preferably at most 19%, further preferably at most 18%, still more preferably at most 17%, particularly preferably at most 16%, most preferably at most 15%.

The glass plate according to the embodiment 2 more preferably satisfies $85 \leq SiO_2+Al_2O_3+MgO+CaO+SrO+BaO+Li_2O+Na_2O+K_2O+Fe_2O_3+TiO_2 \leq 100$, whereby the glass plate can be produced from easily available glass raw materials.

$7Al_2O_3+3MgO$ is, in order to increase the radio transmittance, more preferably at least 24%, further preferably at least 25%, particularly preferably at least 26%, even more preferably at least 28%, most preferably at least 30%. Further, $7Al_2O_3+3MgO$ is more preferably at most 40%, further preferably at most 38%, particularly preferably at most 37%, even more preferably at most 36%, most preferably at most 35%.

$Na_2O/R_2O$ is, in order to increase the radio transmittance, more preferably at least 0.3, further preferably at least 0.35, particularly preferably at least 0.4, most preferably at least 0.45. Further, $Na_2O/R_2O$ is more preferably at most 0.8, further preferably at most 0.75, particularly preferably at most 0.7, even more preferably at most 0.6, most preferably at most 0.55.

$SiO_2+Al_2O_3$ is, in order to improve the melting property and to improve the radio transmittance, more preferably at least 60%, further preferably at least 65%, particularly preferably at least 67%, most preferably at least 68%. Further, $SiO_2+Al_2O_3$ is preferably at most 76%, more preferably at most 75%, further preferably at most 74%, particularly preferably at most 73%, most preferably at most 72%.

$R_2O \times MgO$ is, in order to increase the radio transmittance, preferably lower. $R_2O \times MgO$ is preferably at most $66\%^2$, more preferably at most $60\%^2$, further preferably at most $50\%^2$, particularly preferably at most $40\%^2$, even more preferably at most $30\%^2$, most preferably at most $25\%^2$.

In order to prevent boron and alkali elements from volatilizing during melting/forming, thus leading to deterioration of the glass quality, $R_2O+B_2O_3$ is preferably at most 30%, more preferably at most 28%, further preferably at most 25%, even more preferably at most 20%, still even more preferably at most 18%, most preferably at most 16%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 3%, even more preferably at least 4%, still even more preferably at least 6%, most preferably at least 8%.

In order to prevent boron and alkali elements from volatilizing during melting/forming, thus leading to deterioration of the glass quality, by a high $Na_2O$ content, the $B_2O_3$ content is preferably at most 15%. The $B_2O_3$ content is more preferably at most 12%, further preferably at most 10%, even more preferably at most 8%, still even more preferably at most 6%, most preferably at most 5%.

In order to prevent occurrence of devitrification at the time of glass melting/forming, thus leading to deterioration of the glass quality, MgO+CaO is more preferably at most 18%, further preferably at most 16%, even more preferably at most 14%, most preferably at most 12%. However, if MgO+CaO is too low, the glass viscosity at the time of melting/forming may be too high, whereby glass production may be difficult. Accordingly, MgO+CaO is preferably at least 1%, more preferably at least 2%, further preferably at least 3%, even more preferably at least 4%, most preferably at least 5%.

The glass plate according to the embodiment 2 tends to be devitrified, and accordingly the $TiO_2$ content is preferably at most 3%, more preferably at most 2%, further preferably at most 1%, particularly preferably at most 0.5%, even more preferably at most 0.2%, most preferably at most 0.1%.

The glass plate according to embodiment 3 of the present invention preferably satisfies the following conditions.

It contains, as represented by mol % based on oxides, the following components in the following contents:

$55 \leq SiO_2 \leq 75$ $1.3 \leq Al_2O_3 \leq 3.35$ $0 \leq B_2O_3 \leq 15$ $0 \leq MgO \leq 4.8$ $0 \leq CaO \leq 20$ $0 \leq SrO \leq 4$ $0 \leq BaO \leq 15$ $0 \leq Li_2O < 0.01$ $0.1 \leq Na_2O \leq 16$ $1 \leq K_2O \leq 16$ $0 \leq ZrO_2 \leq 2$ $0.001 \leq Fe_2O_3 \leq 5$ $0.001 \leq TiO_2 \leq 1.5$ $1.1 \leq R_2O \leq 20$ $0 \leq RO \leq 20$ $85 \leq SiO_2+Al_2O_3+MgO+CaO+SrO+BaO+Li_2O+Na_2O+K_2O+Fe_2O_3+TiO_2 \leq 100$ $0 \leq 7Al_2O_3+3MgO \leq 23.5$ $0.05 \leq Na_2O/R_2O \leq 0.8$ $0 \leq R_2O+B_2O_3 \leq 22$ $0 \leq PbO < 0.001$ $0 \leq ZnO \leq 8$.

Within the range of the embodiment 3, a glass plate having a high radio transmittance and satisfying properties required for the desired application can be obtained.

In order to increase the radio transmittance, in the embodiment 3, the following range is more preferred.

The $SiO_2$ content is, in order to increase the Young's modulus and the weather resistance, more preferably at least 60%, further preferably at least 65%, particularly preferably at least 68%. With a view to improving the viscosity, the $SiO_2$ content is more preferably at most 74%, further preferably at most 73.5%, particularly preferably at most 73%, most preferably at most 72.5%.

The $Al_2O_3$ content is, in order to increase the Young's modulus and the weather resistance, more preferably at least 1.5%, further preferably at least 1.7%, particularly preferably at least 1.9%, most preferably at least 2%. In order to increase the radio transmittance, it is more preferably at most 3.0%, further preferably at most 2.5%.

The MgO content is, with a view to improving the melting property and the weather resistance, more preferably at least 0.1%, further preferably at least 0.25%, particularly preferably at least 0.5%. With a view to improving the viscosity, the MgO content is more preferably at most 4%, further preferably at most 3%, particularly preferably at most 2%, most preferably at most 1%.

The CaO content is, in order to improve the melting property and to increase the radio transmittance, preferably at least 1%, more preferably at least 2%, further preferably at least 4%, particularly preferably at least 5%, even more preferably at least 6%, most preferably at least 8%. The CaO content is, with a view to suppressing devitrification, more preferably at most 18%, further preferably at most 16%, particularly preferably at most 15%, even more preferably at most 14%, most preferably at most 13%.

BaO may be contained so as to improve the melting property and to increase the radio transmittance, and in a case where BaO is contained, its content is preferably at least 0.5%, more preferably at least 1%, particularly preferably at least 2%. The BaO content is, in order to prevent the glass from being fragile, more preferably at most 12%, further preferably at most 10%, still more preferably at most 9%, particularly preferably at most 8%, especially particularly preferably at most 4%, most preferably at most 3%.

The $Na_2O$ content is, in order to increase the melting property and to adjust the average coefficient of linear expansion, more preferably at least 2%, further preferably at least 4%, particularly preferably at least 5%, even more preferably at least 6%, most preferably at least 7%. Further, $Na_2O$ if contained deteriorates the weather resistance, and accordingly its content is more preferably at most 15%, further preferably at most 14%, particularly preferably at most 13%, even more preferably at most 12%, most preferably at most 11%.

The $K_2O$ content is, in order to increase the radio transmittance, more preferably at least 1.5%, further preferably at least 2%, particularly preferably at least 2.5%, most preferably at least 3%, and more preferably at most 13%, further preferably at most 11%, particularly preferably at most 10%, even more preferably at most 9%, most preferably at most 8%.

$ZrO_2$ may be contained so as to improve the chemical durability, and in a case where $ZrO_2$ is contained, its content is more preferably at least 0.5%. In order that the average coefficient of linear expansion is not high, the $ZrO_2$ content is more preferably at most 1.8%, further preferably at most 1.5%.

The $R_2O$ content is, with a view to improving the melting property, more preferably at least 5%, further preferably at least 6%, particularly preferably at least 8%, most preferably at least 10%. On the other hand, in order to improve the weather resistance, it is more preferably at most 19%, further preferably at most 17%, still more preferably at most 15%, particularly preferably at most 14.5%, most preferably at most 14%.

RO is, with a view to improving the melting property and improving the radio transmittance, more preferably at least 5%, further preferably at least 6%, particularly preferably at least 9%. On the other hand, with a view to improving the weather resistance and suppressing devitrification, more preferably at most 18%, further preferably at most 16%, still more preferably at most 15%, particularly preferably at most 13%, most preferably at most 12%.

$7Al_2O_3+3MgO$ is, in order to increase the radio transmittance, more preferably at least 0.5%, further preferably at least 1%, particularly preferably at least 5%, even more preferably at least 8%, most preferably at least 10%. Further, $7Al_2O_3+3MgO$ is more preferably at most 23%, further preferably at most 22.5%, still more preferably at most 22%.

$Na_2O/R_2O$ is, in order to increase the radio transmittance, more preferably at least 0.1, further preferably at least 0.15, particularly preferably at least 0.2, even more preferably at least 0.25, most preferably at least 0.3. Further, $Na_2O/R_2O$ ratio is more preferably at most 0.75, further preferably at most 0.7, particularly preferably at most 0.65, especially particularly preferably at most 0.6, most preferably at most 0.55.

$SiO_2+Al_2O_3$ is more preferably at least 50%, further preferably at least 55%, particularly preferably at least 60%, even more preferably at least 65%, still even more preferably at least 68%, most preferably at least 71%. Further, $SiO_2+Al_2O_3$ is more preferably at most 80%, further preferably at most 78%, particularly preferably at most 76%, even more preferably at most 75%, most preferably at most 74%.

$R_2O \times MgO$ is, in order to increase the radio transmittance, more preferably low. $R_2O \times MgO$ is preferably at most $80\%^2$, more preferably at most $60\%^2$, further preferably at most $40\%^2$, particularly preferably at most $30\%^2$, even more preferably at most $20\%^2$, most preferably at most $10\%^2$.

In order to prevent boron and alkali elements from volatilizing during melting/forming, thus leading to deterioration of the glass quality, $R_2O+B_2O_3$ is preferably at most 22%, more preferably at most 20%, further preferably at most 18.5%, even more preferably at most 18%, most preferably at most 16%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 4%, even more preferably at least 6%, most preferably at least 8%.

In the embodiment 3 also, in order to prevent boron and alkali elements from volatilizing during melting/forming, thus leading to deterioration of the glass quality, by a relative increase of the $Na_2O$ component in the glass to the total alkali amount, the $B_2O_3$ content is preferably at most 15%, more preferably at most 10%, further preferably at most 8%, even more preferably at most 6%, most preferably at most 5%.

The glass plate according to the embodiment 3 more preferably satisfies $85 \leq SiO_2+Al_2O_3+MgO+CaO+SrO+BaO+Li_2O+Na_2O+K_2O+Fe_2O_3+TiO_2 \leq 100$, whereby the glass plate can be produced from easily available glass raw materials. Further, in the case of a composition with small $Al_2O_3$ and MgO as the glass of the present embodiment, in order to secure also the weather resistance of the glass plate, the above total amount is more preferably at least 98%. It is more preferably at least 98.5%, particularly preferably at least 99%. Since a glass plate for a window material typically contains a coloring agent, a fining agent, etc., the upper limit of the total amount is even more preferably 99.9%.

Further, in the embodiment 3, in order to prevent the glass from being fragile and having lowered strength, since the amounts of $Al_2O_3$ and MgO are small, or for weight saving of the glass plate, the SrO content is preferably at most 4%, more preferably at most 2.5%, further preferably at most 2%, and particularly preferably substantially no SrO is contained.

In order to prevent occurrence of devitrification at the time of glass melting/forming, thus leading to deterioration of the glass quality, MgO+CaO is preferably at most 18%, more preferably at most 16%, further preferably at most 14%, even more preferably at most 13%, most preferably at most 12%. However, if MgO+CaO is too low, the glass viscosity at the time of melting/forming may be too high, whereby glass production may be difficult. Accordingly, MgO+CaO is preferably at least 1%, more preferably at least 2%, further preferably at least 3%, even more preferably at least 4%, most preferably at least 5%.

The glass plate according to the embodiment 3 particularly tends to be devitrified. Accordingly, the $TiO_2$ content is preferably at most 1.5%, more preferably at most 1%, further preferably at most 0.5%, particularly preferably at most 0.2%, even more preferably at most 0.1%, most preferably at most 0.05%.

The glass plate according to the embodiment 3 may contain ZnO, which has an effect to suppress devitrification. If it is contained in a large amount, defects may occur at the time of production in a float bath, and accordingly the ZnO content is preferably at most 8%, more preferably at most 6%, more preferably at most 4%, further preferably at most 3%, further preferably at most 2%, still more preferably at most 1%, still more preferably at most 0.5%.

The glass plate according to embodiment 4 of the present invention preferably satisfies the following conditions.

It contains, as represented by mol % based on oxides, the following components in the following contents:

$$55 \leq SiO_2 \leq 75$$

$$1.44 \leq Al_2O_3 \leq 9$$

$$0 \leq B_2O_3 \leq 2$$

$$0 \leq MgO \leq 15$$

$$0 \leq CaO \leq 20$$

$$0 \leq SrO \leq 15$$

$$0 \leq BaO \leq 1$$

$$0.01 \leq Li_2O \leq 19.1$$

$$0 \leq Na_2O \leq 16$$

$$0.9 \leq K_2O \leq 16$$

$$0 \leq ZrO_2 \leq 2$$

$$0.001 \leq Fe_2O_3 \leq 5$$

$$0.001 \leq TiO_2 \leq 5$$

$$0.91 \leq R_2O \leq 20$$

$$0 \leq RO \leq 20$$

$$98 \leq SiO_2+Al_2O_3+MgO+CaO+SrO+BaO+Li_2O+Na_2O+K_2O+Fe_2O_3+TiO_2 \leq 100$$

$$10 < 7Al_2O_3+3MgO-4Li_2O \leq 66$$

$0 \leq Na_2O/R_2O \leq 0.8$ $0 \leq PbO < 0.001$.

Within the range of the embodiment 4, a glass plate having a high radio transmittance and satisfying properties required for the desired application can be obtained.

In order to increase the ratio transmittance, in the embodiment 4, the following range is more preferred.

The $SiO_2$ content is, in order to increase the Young's modulus and the weather resistance, more preferably at least 60%, further preferably at least 64%, particularly preferably at least 65%, and with a view to improving the viscosity, more preferably at most 72%, further preferably at most 70%, particularly preferably at most 68%.

The $Na_2O$ content is, in order to increase the melting property and to adjust the average coefficient of linear expansion, more preferably at least 2%, more preferably at least 3%, further preferably at least 4%, particularly preferably at least 5%, even more preferably at least 6%, and in order to improve the weather resistance, more preferably at most 15%, further preferably at most 14%, particularly preferably at most 13%, even more preferably at most 12%, still even more preferably at most 10%, most preferably at most 9%.

The $K_2O$ content is, in order to increase the radio transmittance, more preferably at least 1%, further preferably at least 1.5%, particularly preferably at least 2%, even more preferably at least 2.5%, most preferably at least 3%, and more preferably at most 15%, further preferably at most 13%, particularly preferably at most 12%, even more preferably at most 10%, most preferably at most 9%.

The $Li_2O$ content is, in order to increase the melting property and the Young's modulus and to improve the radio transmittance, more preferably at least 1%, further preferably at least 2%, particularly preferably at least 3%, even more preferably at least 4%, and further, $Li_2O$ may cause devitrification or phase separation, its content is more preferably at most 15%, further preferably at most 12%, particularly preferably at most 10%, even more preferably at most 8%, most preferably at most 7%.

SrO may be contained so as to improve the melting property and to increase the radio transmittance, and in a case where SrO is contained, its content is preferably at least 0.5%, more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

$7Al_2O_3+3MgO-4Li_2O$ is, in order to increase the radio transmittance, more preferably at least 12, further preferably at least 14, particularly preferably at least 16, even more preferably at least 18, most preferably at least 20. Further, $7Al_2O_3+3MgO-4Li_2O$ is more preferably at most 60, further preferably at most 55, particularly preferably at most 50, even more preferably at most 45, most preferably at most 40.

$Na_2O/R_2O$ is, to increase the radio transmittance, more preferably at least 0.05, further preferably at least 0.1, particularly preferably at least 0.15, even more preferably at least 0.2, most preferably at least 0.25. Further, $Na_2O/R_2O$ is more preferably at most 0.8, further preferably at most 0.75, particularly preferably at most 0.7, even more preferably at most 0.6, most preferably at most 0.5.

In the embodiment 4, in order to lower the glass viscosity at the time of melting/forming for easy production, $SiO_2+Al_2O_3$ is preferably at least 50%, further preferably at least 60%, particularly preferably at least 65%, even more preferably at least 66%, most preferably at least 68%. Further, $SiO_2+Al_2O_3$ is preferably at most 75%, further preferably at most 74%, particularly preferably at most 73%, even more preferably at most 72%, most preferably at most 71%.

In order to lower the glass viscosity at the time of melting/forming for easy production and to increase the radio transmittance, the $Al_2O_3$ content is preferably at most 9%, more preferably at most 8%, further preferably at most 7%, particularly preferably at most 6%, even more preferably at most 5%, most preferably at most 4%, and in order to secure the weather resistance, it is more preferably at least 1.5%, further preferably at least 2%, particularly preferably at least 2.5%.

$K_2O/R_2O$ is, in order to increase the radio transmittance, more preferably at least 0.05, further preferably at least 0.1, particularly preferably at least 0.15, even more preferably at least 0.2, most preferably at least 0.25. Further, $K_2O/R_2O$ is more preferably at most 0.95, further preferably at most 0.9, particularly preferably at most 0.7, even more preferably at most 0.5, most preferably at most 0.4.

In the embodiment 4, in order to increase the radio transmittance, $R_2O \times MgO$ is preferably lower. $R_2O \times MgO$ is preferably at most $200\%^2$, more preferably at most $180\%^2$, further preferably at most $160\%^2$, particularly preferably at most $140\%^2$, even more preferably at most 120, still even more preferably at most $100\%^2$, most preferably at most $80\%^2$.

In order to prevent boron and alkali elements from volatilizing during melting/forming, thus leading to deterioration of the glass quality, $R_2O+B_2O_3$ is preferably at most 19%, more preferably at most 18.5%, further preferably at most 18%, even more preferably at most 17%, most preferably at most 16%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 3%, even more preferably at least 4%, most preferably at least 5%.

In order to prevent boron and alkali elements from volatilizing during melting/forming, thus leading to deterioration of the glass quality, the $B_2O_3$ content is preferably at most 2%, more preferably at most 1.8%, further preferably at most 1.5%, even more preferably at most 1.0%, most preferably at most 0.5%.

In order to prevent occurrence of devitrification at the time of glass melting/forming, thus leading to deterioration of the glass quality, MgO+CaO is preferably at most 20%, more preferably at most 18%, further preferably at most 16%, even more preferably at most 15%, most preferably at most 14%. However, if MgO+CaO is too low, the glass viscosity at the time of melting/forming may be too high, whereby glass production may be difficult. Accordingly, MgO+CaO is preferably at least 1%, more preferably at least 2%, further preferably at least 4%, even more preferably at least 6%, most preferably at least 8%.

Further, in order to prevent the glass from being fragile and having lowered strength, or for weight saving of the glass plate, the BaO content is preferably at most 1%, more preferably at most 0.5%, further preferably at most 0.1%, and particularly preferably substantially no BaO is contained.

In the same manner as above, in order to prevent the glass from being fragile and having lowered strength, or for weight saving of the glass plate, $SrO+BaO+ZrO_2$ is preferably at most 8%, more preferably at most 7%, further preferably at most 6%, particularly preferably at most 5%, even more preferably at most 3%, most preferably at most 2%.

Further, in order to increase the radio transmittance, the MgO content is more preferably at most 14%, further preferably at most 12%, particularly preferably at most 10%, even more preferably at most 8%, still even more preferably at most 6%, most preferably at most 4.5%.

In order to improve the melting property and to increase the radio transmittance, the CaO content is preferably at least 0.5%, more preferably at least 1%, further preferably at least 3%, particularly preferably at least 5%, even more preferably at least 7%, most preferably at least 8%, and with a view to suppressing devitrification, it is more preferably at most 18%, further preferably at most 16%, particularly preferably at most 14%, even more preferably at most 13%, most preferably at most 12%.

$ZrO_2$ may be contained so as to improve chemical durability, and in a case where $ZrO_2$ is contained, its content is preferably at least 0.5%. Further, in order that the average coefficient of linear expansion is not high, it is more preferably at most 1.8%, further preferably at most 1.5%.

$R_2O$ is, with a view to improving melting property, more preferably at least 5%, more preferably at least 6%, further preferably at least 7%, particularly preferably at least 8%. On the other hand, in order to improve the weather resistance, it is more preferably at most 18%, further preferably at most 17%, still more preferably at most 16%, particularly preferably at most 15%, most preferably at most 14%.

RO is, with a view to improving the melting property and improving the radio transmittance, more preferably at least 5%, further preferably at least 6%, particularly preferably at least 8%, and on the other hand, with a view to improving the weather resistance and suppressing devitrification, it is more preferably at most 19%, further preferably at most 18%, still more preferably at most 17%, particularly preferably at most 16%, most preferably at most 15%.

The glass plate according to embodiment 5 of the present invention preferably satisfies the following conditions.

It contains, as represented by mol % based on oxides, the following components in the following contents.

$55 \leq SiO_2 \leq 75$ $0 \leq Al_2O_3 \leq 7.8$ $0 \leq B_2O_3 \leq 2$ $0 \leq MgO \leq 11.8$ $2 \leq CaO \leq 20$ $0 \leq SrO \leq 15$ $0 \leq BaO \leq 1$ $2.5 \leq Li_2O \leq 19.52$ $0.15 \leq Na_2O \leq 17.17$ $0.33 \leq K_2O \leq 16.5$ $0 \leq ZrO_2 \leq 2$ $0.001 \leq Fe_2O_3 \leq 5$ $0.001 \leq TiO_2 \leq 5$ $2.98 \leq R_2O \leq 20$ $2 \leq RO \leq 20$ $98 \leq SiO_2+Al_2O_3+MgO+CaO+SrO+BaO+Li_2O+Na_2O+K_2O+Fe_2O_3+TiO_2 \leq 100$ $-10 \leq 7Al_2O_3+3MgO-4Li_2O \leq 10$ $0.05 \leq Na_2O/R_2O \leq 0.85$ $0.11 \leq K_2O/R_2O \leq 0.83$ $0 \leq PbO < 0.001$ Within the range of the embodiment 5, a glass plate having a high radio transmittance and satisfying properties required for the desired application can be obtained.

In order to increase the radio transmittance, in the embodiment 5, the following range is more preferred.

The $SiO_2$ content is, in order to increase the Young's modulus and the weather resistance, more preferably at least 60%, further preferably at least 63%, particularly preferably at least 65%, and with a view to improving the viscosity, more preferably at most 73%, more preferably at most 71%, further preferably at most 70%, particularly preferably at most 69%.

The $Na_2O$ content is, in order to increase the melting property and to adjust the average coefficient of linear expansion, more preferably at least 0.5%, more preferably at least 1%, further preferably at least 2%, more preferably at least 3%, further preferably at least 4%, particularly preferably at least 5%, and in order to improve the weather resistance, it is more preferably at most 15%, further preferably at most 13%, particularly preferably at most 11%, even more preferably at most 10%, most preferably at most 8%.

The $K_2O$ content is, in order to increase the radio transmittance, more preferably at least 0.5%, more preferably at least 2%, further preferably at least 3%, particularly preferably at least 4%, even more preferably at least 5%, most preferably at least 6%, and with a view to improving the viscosity, it is more preferably at most 16%, further preferably at most 14%, particularly preferably at most 12%, even more preferably at most 11%, most preferably at most 10%.

The $Li_2O$ content is, in order to increase the melting property and the Young's modulus, and to improve the radio transmittance, more preferably at least 3%, further preferably at least 4%, particularly preferably at least 5%. Further, $Li_2O$ may cause devitrification and phase separation, its content is more preferably at most 15%, further preferably at most 12%, particularly preferably at most 10%, even more preferably at most 8%, most preferably at most 7%.

$7Al_2O_3+3MgO-4Li_2O$ is, in order to increase the radio transmittance, more preferably at least −9, further preferably at least −6, particularly preferably at least −4, even more preferably at least −2, most preferably at least −1. Further, $7Al_2O_3+3MgO-4Li_2O$ is more preferably at most 9.5, further preferably at most 9, particularly preferably at most 8.5, even more preferably at most 8.

SrO may be contained so as to improve the melting property and to increase the radio transmittance, and in a case where SrO is contained, its content is preferably at least 0.5, more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

Na$_2$O/R$_2$O is, in order to increase the radio transmittance, more preferably at least 0.1, further preferably at least 0.15, particularly preferably at least 0.2, even more preferably at least 0.25, most preferably at least 0.3. Further, Na$_2$O/R$_2$O is more preferably at most 0.9, further preferably at most 0.8, particularly preferably at most 0.7, even more preferably at most 0.6, most preferably at most 0.5.

In the embodiment 5, SiO$_2$+Al$_2$O$_3$ is more preferably at least 50%, further preferably at least 55%, particularly preferably at least 60%, even more preferably at least 65%, still even more preferably at least 67%, most preferably at least 68. Further, SiO$_2$+Al$_2$O$_3$ is more preferably at most 80%, further preferably at most 78%, particularly preferably at most 76%, even more preferably at most 75%, even more preferably at most 74%, still even more preferably at most 73%, most preferably at most 72.5%.

In order to lower the glass viscosity at the time of melting/forming for easy production and to increase the radio transmittance, the Al$_2$O$_3$ content is more preferably at most 7%, further preferably at most 6%, particularly preferably at most 5%, even more preferably at most 4.5%, still even more preferably at most 3%, most preferably at most 3.5%. The lower limit of Al$_2$O$_3$ is not particularly limited, and in order to secure the weather resistance, the Al$_2$O$_3$ content is more preferably at least 0.5%, further preferably at least 1%, particularly preferably at least 1.5%, especially particularly preferably at least 1.8%, even more preferably at least 2%, most preferably at least 2.5%.

K$_2$O/R$_2$O is, in order to increase the radio transmittance, more preferably at least 0.15, further preferably at least 0.2, particularly preferably at least 0.25, even more preferably at least 0.28, most preferably at least 0.3. Further, K$_2$O/R$_2$O is more preferably at most 0.80, further preferably at most 0.7, particularly preferably at most 0.6, even more preferably at most 0.5, most preferably at most 0.4. When Na$_2$O/R$_2$O and K$_2$O/R$_2$O are within the predetermined ranges, the radio transmittance is likely to be high.

In the embodiment 5, R$_2$O×MgO is preferably lower, so as to increase the radio transmittance. R$_2$O×MgO is preferably at most 200%$^2$, more preferably at most 150%$^2$, more preferably at most 130%$^2$, more preferably at most 120%$^2$, further preferably at most 100%$^2$, still more preferably at most 80%$^2$, particularly preferably at most 60%$^2$ even more preferably at most 40%$^2$, most preferably at most 30%$^2$.

In order to prevent boron and alkali elements from volatilizing during melting/forming, thus leading to deterioration of the glass quality, R$_2$O+B$_2$O$_3$ is preferably at most 19%. R$_2$O+B$_2$O$_3$ is more preferably at most 18.5%, further preferably at most 18%, even more preferably at most 17%, most preferably at most 16%. However, if R$_2$O+B$_2$O$_3$ is too low, the glass viscosity at the time of melting/forming may be too high, whereby glass production may be difficult. Accordingly, R$_2$O+B$_2$O$_3$ is preferably at least 1%, more preferably at least 2%, further preferably at least 4%, even more preferably at least 6%, most preferably at least 8%.

In order to prevent boron and alkali elements from volatilizing during melting/forming, thus leading to deterioration of the glass quality, the B$_2$O$_3$ content is preferably at most 2%. The B$_2$O$_3$ content is more preferably at most 1.5%, further preferably at most 1%, most preferably at most 0.5%.

In order to prevent occurrence of devitrification at the time of glass melting/forming, thus leading to deterioration of the glass quality, MgO+CaO is preferably at most 17%, more preferably at most 15%, further preferably at most 14%, even more preferably at most 13%. However, if MgO+CaO is too low, the glass viscosity at the time of melting/forming may be too high, whereby glass production may be difficult. Accordingly, MgO+CaO is preferably at least 1%, more preferably at least 2%, further preferably at least 4%, even more preferably at least 6%, most preferably at least 8%.

Further, in order to prevent the glass from being fragile and having lowered strength, or for weight saving of the glass plate, the BaO content is preferably at most 1%, more preferably at most 0.8%, more preferably at most 0.5%, further preferably at most 0.1%, particularly preferably substantially no BaO is contained.

In the same manner as above, in order to prevent the glass from being fragile and having lowered strength, or for weight saving of the glass plate, SrO+BaO+ZrO$_2$ is more preferably at most 12%, further preferably at most 10%, particularly preferably at most 8%, even more preferably at most 4%, most preferably at most 2%.

Further, in order to increase the radio transmittance, the MgO content is preferably at most 11.8%, more preferably at most 10%, further preferably at most 7%, particularly preferably at most 6%, even more preferably at most 5%, still even more preferably at most 4%, still even more preferably at most 3%, most preferably at most 2%. With a view to improving the melting property, it is preferably at least 0%, more preferably at least 0.1%, still more preferably at least 0.3%, particularly preferably at least 0.5%.

In order to improve the melting property and to increase the radio transmittance, the CaO content is preferably at least 2%, more preferably at least 3%, further preferably at least 4%, particularly preferably at least 5%, even more preferably at least 6%, most preferably at least 8%. The CaO content is, with a view to suppressing devitrification, more preferably at most 18%, further preferably at most 17%, particularly preferably at most 16%, even more preferably at most 14%, most preferably at most 12%.

ZrO$_2$ may be contained so as to improve the chemical durability, and in a case where ZrO$_2$ is contained, its content is more preferably at least 0.5, and in order that the average coefficient of linear expansion is not high, it is more preferably at most 1.8%, further preferably at most 1.5%.

R$_2$O is, with a view to improving the melting property, more preferably at least 5%, more preferably at least 6%, more preferably at least 7%, further preferably at least 9%, particularly preferably at least 10%, and on the other hand, in order to improve the weather resistance, it is more preferably at most 18%, further preferably at most 16.5%, still more preferably at most 15.5%, particularly preferably at most 14.5%, most preferably at most 13.5%.

RO is, with a view to improving the melting property and improving the radio transmittance, more preferably at least 5%, further preferably at least 7%, particularly preferably at least 8%, most preferably at least 10%. On the other hand, with a view to improving the weather resistance and suppressing devitrification, it is more preferably at most 19%, further preferably at most 18%, still more preferably at most 17%, particularly preferably at most 16%, most preferably at most 14%.

The glass plate according to embodiment 6 of the present invention preferably satisfies the following conditions.

It contains, as represented by mol % based on oxides, the following components in the following contents:

$55 \leq SiO_2 \leq 75$ $0 \leq Al_2O_3 \leq 5.5$ $0 \leq B_2O_3 \leq 2$ $0 \leq MgO \leq 10.5$ 0≤CaO≤20

0≤SrO≤15

0≤BaO≤15

2.5≤Li$_2$O≤20

0≤Na$_2$O≤18.5

0≤K$_2$O≤18.5

0≤ZrO$_2$≤2

0.001≤Fe$_2$O$_3$≤5

0.001≤TiO$_2$≤5

2.5≤R$_2$O≤20

0≤RO≤20

98≤SiO$_2$+Al$_2$O$_3$+MgO+CaO+SrO+BaO+Li$_2$O+Na$_2$O+K$_2$O+Fe$_2$O$_3$+TiO$_2$≤100

−60≤7Al$_2$O$_3$+3MgO−4Li$_2$O≤−10

0≤PbO<0.001.

Within the range of the embodiment 6, a glass plate having a high radio transmittance and satisfying properties required for the desired application can be obtained.

In order to increase the radio transmittance, in the embodiment 6, the following range is more preferred.

The SiO$_2$ content is, in order to increase the Young's modulus and the weather resistance, more preferably at least 60%, further preferably at least 63%, particularly preferably at least 65%, and with a view to improving the viscosity, it is more preferably at most 72%, further preferably at most 71%, particularly preferably at most 70%.

The Na$_2$O content is, in order to increase the melting property and to adjust the average coefficient of linear expansion, more preferably at least 1%, further preferably at least 2%, particularly preferably at least 3%. Further, Na$_2$O if contained deteriorates the weather resistance, and accordingly its content is more preferably at most 15%, further preferably at most 12%, particularly preferably at most 10%, even more preferably at most 8%, most preferably at most 7%.

The K$_2$O content is, in order to increase the radio transmittance, more preferably at least 0.5%, more preferably at least 1%, further preferably at least 2%, still more preferably at least 3%, particularly preferably at least 4%, and with a view to improving the viscosity, it is more preferably at most 15.5%, further preferably at most 14%, particularly preferably at most 12%, even more preferably at most 10%, still even more preferably at most 8%, most preferably at most 7%.

The Li$_2$O content is, in order to increase the melting property and the Young's modulus, and to improve the radio transmittance, more preferably at least 3%, further preferably at least 4%. Further, Li$_2$O may cause devitrification and phase separation, its content is more preferably at most 15%, more preferably at most 14%, more preferably at most 13%, further preferably at most 12%, particularly preferably at most 10%, even more preferably at most 8%, most preferably at most 7%.

SrO may be contained so as to improve the melting property and to increase the radio transmittance, and in a case where SrO is contained, its content is preferably at least 0.5%. It is more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

7Al$_2$O$_3$+3MgO−4Li$_2$O is, in order to improve the water resistance of the glass, more preferably at least −50, further preferably at least −40, particularly preferably at least −35, even more preferably at least −30, most preferably at least −25. Further, in order to increase the radio transmittance of the glass, 7Al$_2$O$_3$+3MgO−4Li$_2$O is more preferably at most −10.5, more preferably at most −11, further preferably at most −12, particularly preferably at most −13, even more preferably at most −14, most preferably at most −15.

Na$_2$O/R$_2$O is, in order to increase the radio transmittance, more preferably at least 0.05, further preferably at least 0.1, particularly preferably at least 0.15, even more preferably at least 0.2, most preferably at least 0.25. Further, Na$_2$O/R$_2$O is, with a view to improving the weather resistance, more preferably at most 0.95, further preferably at most 0.9, particularly preferably at most 0.8, even more preferably at most 0.6, still even more preferably at most 0.5, most preferably at most 0.4.

In the embodiment 6, in order to lower the viscosity at the time of glass melting/forming for easy production, SiO$_2$+Al$_2$O$_3$ is preferably at least 50%, more preferably at least 55%, particularly preferably at least 60%, even more preferably at least 65%, most preferably at least 68%. Further, SiO$_2$+Al$_2$O$_3$ is preferably at most 80%, further preferably at most 78%, particularly preferably at most 76%, even more preferably at most 74%, most preferably at most 72.5%.

In order to lower the glass viscosity at the time of melting/forming for easy production, the Al$_2$O$_3$ content is more preferably at most 5%, further preferably at most 4.5%, particularly preferably at most 4%, even more preferably at most 3.5%, most preferably at most 3%. The lower limit of the Al$_2$O$_3$ content is not particularly limited, and in order to secure the weather resistance, Al$_2$O$_3$ content is more preferably at least 0.1%, more preferably at least 0.2%, more preferably at least 0.5%, further preferably at least 1%, particularly preferably at least 1.5%, even more preferably at least 2%.

K$_2$O/R$_2$O is, in order to increase the radio transmittance, more preferably at least 0.05, further preferably at least 0.1, particularly preferably at least 0.15, even more preferably at least 0.2, most preferably at least 0.25. Further, K$_2$O/R$_2$O is, with a view to improving the weather resistance, more preferably at most 0.95, further preferably at most 0.9, particularly preferably at most 0.7, even more preferably at most 0.5, most preferably at most 0.4. By Na$_2$O/R$_2$O and K$_2$O/R$_2$O being within the predetermined ranges, the radio transmittance is likely to be increased.

In the embodiment 6, R$_2$O×MgO is more preferably lower, so as to increase the radio transmittance. R$_2$O×MgO is more preferably at most 200%$^2$, more preferably at most 160%$^2$, more preferably at most 120%$^2$, further preferably at most 100%$^2$, still more preferably at most 80%$^2$, particularly preferably at most 60%$^2$, even more preferably at most 40%$^2$, most preferably at most 20%$^2$.

In order to prevent boron and alkali elements from volatilizing during melting/forming, thus leading to deterioration of the glass quality, R$_2$O+B$_2$O$_3$ is preferably at most 19%, more preferably at most 18.5%, further preferably at most 18%, even more preferably at most 17%, most preferably at most 16%. However, if R$_2$O+B$_2$O$_3$ is too low, the glass viscosity at the time of melting/forming may be too high, whereby glass production may be difficult. Accordingly, $R_2O+B_2O_3$ is preferably at least 2.5%, more preferably at least 5%, further preferably at least 10%, even more preferably at least 12%, most preferably at least 13%.

In order to prevent boron and alkali elements from volatilizing during melting/forming, thus leading to deterioration of the glass quality, the $B_2O_3$ content is preferably at most 2%. The $B_2O_3$ content is more preferably at most 1.5%, further preferably at most 1%, even more preferably at most 0.75%, most preferably at most 0.5%.

In order to prevent occurrence of devitrification at the time of glass melting/forming, thus leading to deterioration of the glass quality, MgO+CaO is preferably at most 15%, more preferably at most 14%, further preferably at most 13%. However, if MgO+CaO is too low, the glass viscosity at the time of melting/forming may be too high, and glass production may be difficult. Accordingly, MgO+CaO is preferably at least 1%, more preferably at least 2%, further preferably at least 4%, even more preferably at least 6%, most preferably at least 8%.

Further, in order to prevent the glass from being fragile and having lowered strength, or for weight saving of the glass plate, the BaO content is preferably at most 15%, more preferably at most 8%, further preferably at most 4%, particularly preferably at most 2%, even more preferably at most 1%, still more preferably at most 0.5%, most preferably substantially no BaO is contained.

In the same manner as above, in order to prevent the glass from being fragile and having lowered strength, or for weight saving of the glass plate, $SrO+BaO+ZrO_2$ is preferably at most 15%. It is more preferably at most 14%, further preferably at most 10%, still more preferably at most 8%, particularly preferably at most 5%, even more preferably at most 4%, most preferably at most 2%.

Further, in order to increase the radio transmittance, the MgO content is more preferably at most 10.5%, further preferably at most 8%, particularly preferably at most 6%, even more preferably at most 4%, most preferably at most 2%. With a view to improving the melting property, it is preferably at least 0%, more preferably at least 0.1%, still more preferably at least 0.2%, particularly preferably at least 0.3%, most preferably at least 0.5%.

In order to improve the melting property and to increase the radio transmittance, the CaO content is more preferably at least 0.5%, further preferably at least 1%, particularly preferably at least 2%, even more preferably at least 3%, still even more preferably at least 6%, most preferably at least 8%. The CaO content is, with a view to suppressing devitrification, more preferably at most 18%, further preferably at most 17%, particularly preferably at most 16%, even more preferably at most 15%, most preferably at most 14%.

$ZrO_2$ may be contained so as to improve the chemical durability, and in a case where $ZrO_2$ is contained, its content is more preferably at least 0.5%. In order that the average coefficient of linear expansion is not high, it is more preferably at most 1.8%, further preferably at most 1.5%.

$R_2O$ is, with a view to improving the melting property, more preferably at least 5%, more preferably at least 6%, more preferably at least 7%, further preferably at least 8%, particularly preferably at least 10%, most preferably at least 12%. On the other hand, in order to improve the weather resistance, it is more preferably at most 18%, further preferably at most 16%, still more preferably at most 15%, particularly preferably at most 14.5%.

RO is, with a view to improving the melting property and improving the radio transmittance, more preferably at least 5%, further preferably at least 7%, particularly preferably at least 10%, most preferably at least 12%. On the other hand, with a view to improving the weather resistance and suppressing devitrification, it is more preferably at most 19%, further preferably at most 18%, still more preferably at most 17%, particularly preferably at most 16%, most preferably at most 15%.

The glass plate according to embodiment 7 of the present invention preferably satisfies the following conditions.

It contains, as represented by mol % based on oxides, the following components in the following contents:

$55 \le SiO_2 \le 75$ $1.44 \le Al_2O_3 \le 9$ $0.5 \le B_2O_3 \le 13$ $0 \le MgO \le 15$ $0 \le CaO \le 20$ $0 \le SrO \le 15$ $0 \le BaO \le 1$ $0.01 \le Li_2O \le 19.1$ $0 \le Na_2O \le 16$ $0.9 \le K_2O \le 16$ $0 \le ZrO_2 \le 2$ $0.001 \le Fe_2O_3 \le 5$ $0.001 \le TiO_2 \le 5$ $0.91 \le R_2O \le 20$ $0 \le RO \le 20$ $85 \le SiO_2+Al_2O_3+MgO+CaO+SrO+BaO+Li_2O+Na_2O+K_2O+Fe_2O_3+TiO_2 \le 100$ $10 \le 7Al_2O_3+3MgO-4Li_2O \le 66$ $0 \le Na_2O/R_2O \le 0.8$ $0 \le PbO < 0.001$ $0 \le ZnO \le 3$.

Within the range of the embodiment 7, a glass plate having a high radio transmittance and satisfying properties required for the desired application can be obtained.

In order to increase the radio transmittance, in the embodiment 7, the following range is more preferred.

The $SiO_2$ content is, in order to increase the Young's modulus and the weather resistance, more preferably at least 60%, more preferably at least 62%, further preferably at least 64%, particularly preferably at least 65%. With a view to improving the viscosity, it is more preferably at most 73%, further preferably at most 71%, still more preferably at most 70%, particularly preferably at most 68%.

The $Na_2O$ content is, in order to increase the melting property and to adjust the average coefficient of linear expansion, more preferably at least 1%, further preferably at least 1.5%, particularly preferably at least 2%, even more preferably at least 2.5%, still even more preferably at least 3%, most preferably at least 4%. Further, $Na_2O$ if contained deteriorates the weather resistance, and accordingly its content is more preferably at most 15%, further preferably at most 14%, particularly preferably at most 13%, even more preferably at most 12%, still even more preferably at most 10%, most preferably at most 8%.

The $K_2O$ content is, in order to increase the radio transmittance, more preferably at least 0.5%, more preferably at least 1%, further preferably at least 1.5%, particularly preferably at least 2%, even more preferably at least 3%, most preferably at least 4%. Further, the $K_2O$ content is more preferably at most 15%, further preferably at most 13%, particularly preferably at most 12%, even more preferably at most 10%, most preferably at most 8%.

The $Li_2O$ content is, in order to increase the melting property and the Young's modulus and to improve the radio transmittance, more preferably at least 1%, further preferably at least 2%, particularly preferably at least 3%, even more preferably at least 4%. Further, $Li_2O$ if contained may cause devitrification and phase separation, and accordingly its content is more preferably at most 15%, further preferably at most 12%, particularly preferably at most 10%, even more preferably at most 8%, most preferably at most 6%.

SrO may be contained so as to improve the melting property and to increase the radio transmittance, and in a case where SrO is contained, its content is preferably at least 0.5%, more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

$7Al_2O_3+3MgO-4Li_2O$ is, in order to increase the radio transmittance, more preferably at least 11, further preferably at least 13, particularly preferably at least 15, even more preferably at least 17, most preferably at least 19. Further, the range of $7Al_2O_3+3MgO-4Li_2O$ is more preferably at most 60, further preferably at most 50, particularly preferably at most 45, even more preferably at most 40, most preferably at most 35.

$Na_2O/R_2O$ is, in order to increase the radio transmittance, more preferably at least 0.05, further preferably at least 0.1, particularly preferably at last 0.15, even more preferably at least 0.2, still even more preferably at least 0.25, most preferably at least 0.3. Further, $Na_2O/R_2O$ is more preferably at most 0.85, further preferably at most 0.8, particularly preferably at most 0.6, even more preferably at most 0.5, most preferably at most 0.4.

In the embodiment 7, in order to lower the glass viscosity at the time of melting/forming for easy production, $SiO_2+Al_2O_3$ is preferably at least 50, further preferably at least 55, particularly preferably at least 60, even more preferably at least 65, most preferably at least 67. Further, $SiO_2+Al_2O_3$ is preferably at most 75, further preferably at most 74, particularly preferably at most 73, even more preferably at most 72, most preferably at most 71.

In order to lower the glass viscosity at the time of melting/forming for easy production, and to increase the radio transmittance, the $Al_2O_3$ content is preferably at most 9%. The $Al_2O_3$ content is more preferably at most 8%, further preferably at most 7%, particularly preferably at most 6%, even more preferably at most 5%. Further, the $Al_2O_3$ content is, in order to secure the weather resistance, more preferably at least 1.5%, further preferably at least 2%, particularly preferably at least 2.5%.

$K_2O/R_2O$ is, in order to increase the radio transmittance, more preferably at least 0.05, further preferably at least 0.1, particularly preferably at least 0.15, even more preferably at least 0.2, still even more preferably at least 0.25, most preferably at least 0.30. Further, $K_2O/R_2O$ is more preferably at most 0.95, further preferably at most 0.8, particularly preferably at most 0.7, even more preferably at most 0.6, still even more preferably at most 0.5, most preferably at most 0.4.

In the embodiment 7, $R_2O \times MgO$ is more preferably lower so as to increase the radio transmittance. $R_2O \times MgO$ is preferably at most $200\%^2$, more preferably at most $180\%^2$, further preferably at most $160\%^2$, particularly preferably at most $140\%^2$, even more preferably at most $120\%^2$, still even more preferably at most $100\%^2$, most preferably at most $80\%^2$.

In order to prevent boron and alkali elements from volatilizing during melting/forming, thus leading to deterioration of the glass quality, $R_2O+B_2O_3$ is preferably at most 25%. It is more preferably at most 23%, further preferably at most 20%, even more preferably at most 18%, most preferably at most 16%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 4%, even more preferably at least 6%, most preferably at least 8%.

In order to prevent boron and alkali elements from volatilizing during melting/forming, thus leading to deterioration of the glass quality, the $B_2O_3$ content is preferably at most 13%, more preferably at most 12%, further preferably at most 10%, even more preferably at most 8%, most preferably at most 6%. Further, with a view to improving the melting property, the $B_2O_3$ content is preferably at least 0.5%, more preferably at least 1%, further preferably at least 1.5%, particularly preferably at least 2%.

In order to prevent occurrence of devitrification at the time of glass melting/forming, thus leading to deterioration of the glass quality, MgO+CaO is preferably at most 15%, more preferably at most 14%, further preferably at most 13%, even more preferably at most 12%, most preferably at most 10%. Further, if MgO+CaO is too low, the glass viscosity at the time of melting/forming may be too high, whereby glass production may be difficult. Accordingly, MgO+CaO is preferably at least 1%, more preferably at least 2%, further preferably at least 4%, even more preferably at least 5%, most preferably at least 6%.

Further, in order to prevent the glass from being fragile and having lowered strength, or for weight saving of the glass plate, the BaO content is preferably at most 1%, more preferably at most 0.5%, further preferably at most 0.1%, particularly preferably substantially no BaO is contained.

In the same manner as above, in order to prevent the glass from being fragile and having lowered strength, or for weight saving of the glass plate, $SrO+BaO+ZrO_2$ is preferably at most 10%, more preferably at most 8%, further preferably at most 6%, particularly preferably at most 5%, even more preferably at most 4%, most preferably at most 3%.

Further, in order to increase the radio transmittance, the MgO content is more preferably at most 10%, further preferably at most 8%, particularly preferably at most 6%, even more preferably at most 4.5%, still even more preferably at most 3%, most preferably at most 2%.

In order to improve the melting property and to increase the radio transmittance, the CaO content is more preferably at least 0.5%. The CaO content is more preferably at least 1%, further preferably at least 3%, particularly preferably at least 5%, even more preferably at least 6%, most preferably at least 7%. The CaO content is, with a view to suppressing devitrification, more preferably at most 18%, further preferably at most 15%, particularly preferably at most 14%, even more preferably at most 12%, most preferably at most 10%.

$ZrO_2$ may be contained so as to improve the chemical durability, and in a case where $ZrO_2$ is contained, its content is more preferably at least 0.5%. In order that the average coefficient of linear expansion is not high, the $ZrO_2$ content is more preferably at most 1.8%, further preferably at most 1.5%.

The $R_2O$ content is, with a view to improving the melting property, more preferably at least 5%, more preferably at least 6%, further preferably at least 7%, particularly preferably at least 8%, and on the other hand, in order to improve the weather resistance, more preferably at most 18%, further preferably at most 17%, still more preferably at most 16%, particularly preferably at most 15%, most preferably at most 14%.

The RO content is, with a view to improving the melting property and improving the radio transmittance, more preferably at least 5%, further preferably at least 7%, particularly preferably at least 10%, and on the other hand, with a view to improving the weather resistance and suppressing devitrification, more preferably at most 19%, further preferably at most 18%, still more preferably at most 17%, particularly preferably at most 15%, most preferably at most 13%.

The glass plate according to the present embodiment may contain ZnO which has an effect to suppress devitrification. If ZnO is contained in a large amount, defects may occur at the time of production in a float bath, and accordingly the ZnO content is preferably at most 3%. The ZnO content is more preferably at most 2%, more preferably at most 1.5%, further preferably at most 1%, and preferably substantially no ZnO is contained.

The glass plate according to embodiment 8 of the present invention preferably satisfies the following conditions.

It contains, as represented by mol % based on oxides, the following components in the following contents:

$55 \leq SiO_2 \leq 75$ $1 \leq Al_2O_3 \leq 7.8$ $0.5 \leq B_2O_3 \leq 15$ $0 \leq MgO \leq 11.8$ $2 \leq CaO \leq 20$ $0 \leq SrO \leq 15$ $0 \leq BaO \leq 1$ $4.25 \leq Li_2O \leq 19.15$ $0.25 \leq Na_2O \leq 15.15$ $0.60 \leq K_2O \leq 15.5$ $0 \leq ZrO_2 \leq 2$ $0.001 \leq Fe_2O_3 \leq 5$ $0.001 \leq TiO_2 \leq 5$ $5.10 \leq R_2O \leq 20$ $2 \leq RO \leq 20$ $85 \leq SiO_2+Al_2O_3+MgO+CaO+SrO+BaO+Li_2O+Na_2O+K_2O+Fe_2O_3+TiO_2 \leq 100$ $-10 \leq 7Al_2O_3+3MgO-4Li_2O \leq 10$ $0.05 \leq Na_2O/R_2O \leq 0.95$ $0.11 \leq K_2O/R_2O \leq 0.9$ $0 \leq PbO \leq 0.001$.

Within the range of the embodiment 8, a glass plate having a high radio transmittance and satisfying properties required for the desired application can be obtained.

In order to increase the radio transmittance, in the embodiment 8, the following range is more preferred.

The $SiO_2$ content is, in order to increase the Young's modulus and the weather resistance, more preferably at least 60%, further preferably at least 63%, particularly preferably at least 65%. With a view to improving the viscosity, it is more preferably at most 73%, further preferably at most 72%, particularly preferably at most 70%.

The $Na_2O$ content is, in order to increase the melting property and to adjust the average coefficient of linear expansion, more preferably at least 2%, further preferably at least 4%, particularly preferably at least 5%. Further, $Na_2O$ if contained deteriorates the weather resistance, and accordingly its content is more preferably at most 15%, further preferably at most 13%, particularly preferably at most 11%, even more preferably at most 10%, most preferably at most 8%.

The $K_2O$ content is, in order to increase the radio transmittance, more preferably at least 1.0%, further preferably at least 2%, particularly preferably at least 4%, even more preferably at least 5%. Further, the $K_2O$ content is more preferably at most 15%, further preferably at most 14%, particularly preferably at most 12%, even more preferably at most 10%, most preferably at most 8%.

The $Li_2O$ content is, in order to increase the melting property and the Young's modulus and to improve the radio transmittance, more preferably at least 4.5%, further preferably at least 5.0%, particularly preferably at least 5.5%, even more preferably at least 6.0%. Further, $Li_2O$ if contained may cause devitrification and phase separation, and accordingly its content is more preferably at most 15%, more preferably at most 12%, more preferably at most 10%, further preferably at most 9%, particularly preferably at most 8%, even more preferably at most 7%, most preferably at most 6%.

$7Al_2O_3+3MgO-4Li_2O$ is, in order to increase the radio transmittance, more preferably at least $-9$, further preferably at least $-6$, particularly preferably at least $-4$, even more preferably at least $-2$, most preferably at least $-1$. Further, $7Al_2O_3+3MgO-4Li_2O$ is more preferably at most 9, further preferably at most 8, particularly preferably at most 7, even more preferably at most 6, most preferably at most 5.

SrO may be contained so as to improve the melting property and to increase the radio transmittance, and in a case where SrO is contained, its content is preferably at least 0.5%, more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

$Na_2O/R_2O$ is, in order to increase the radio transmittance, more preferably at least 0.1, further preferably at least 0.15, particularly preferably at least 0.2, even more preferably at least 0.25, most preferably at least 0.3. Further, $Na_2O/R_2O$ is more preferably at most 0.9, further preferably at most 0.8, particularly preferably at most 0.7, even more preferably at most 0.6, still even more preferably at most 0.5, most preferably at most 0.4.

In the embodiment 8, $SiO_2+Al_2O_3$ is more preferably at least 50%, further preferably at least 55%, particularly preferably at least 60%, even more preferably at least 65%, most preferably at least 68. Further, $SiO_2+Al_2O_3$ is more preferably at most 80%, further preferably at most 78%, particularly preferably at most 75%, even more preferably at most 74%, still even more preferably at most 73%, most preferably at most 72%.

In order to lower the glass viscosity at the time of melting/forming for easy production, and to increase the radio transmittance, the $Al_2O_3$ content is preferably at most 7%. The $Al_2O_3$ content is further preferably at most 6%, particularly preferably at most 5%, most preferably at most 4%. The $Al_2O_3$ content is, to secure the weather resistance, more preferably at least 1.5%, further preferably at least 2%, particularly preferably at least 2.5%.

$K_2O/R_2O$ is, in order to increase the radio transmittance, more preferably at least 0.15, further preferably at least 0.2, particularly preferably at least 0.25, even more preferably at least 0.28, most preferably at least 0.3. Further, $K_2O/R_2O$ is more preferably at most 0.85, further preferably at most 0.8, particularly preferably at most 0.7, even more preferably at most 0.5, most preferably at most 0.4. By $Na_2O/R_2O$ and $K_2O/R_2O$ being within the predetermined ranges, the radio transmittance is likely to be increased.

In the embodiment 8, $R_2O \times MgO$ is more preferably low so as to increase the radio transmittance. $R_2O \times MgO$ is preferably at most 200%$^2$, more preferably at most 150%$^2$, further preferably at most 100%$^2$, particularly preferably at most 60%$^2$, even more preferably at most 50%$^2$, still even more preferably at most 40%$^2$, most preferably at most 30%$^2$.

In order to prevent boron and alkali elements from volatilizing during melting/forming, thus leading to deterioration of the glass quality, $R_2O+B_2O_3$ is preferably at most 25%, more preferably at most 22%, further preferably at most 20%, even more preferably at most 19%, most preferably at most 18%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 4%, even more preferably at least 6%, most preferably at least 10%.

In order to prevent boron and alkali elements from volatilizing during melting/forming, thus leading to deterioration of the glass quality, the $B_2O_3$ content is more preferably at most 12%, further preferably at most 8%, even more preferably at most 6%, most preferably at most 5%. Further, in order to improve the melting property, the $B_2O_3$ content is preferably at least 0.5%. The $B_2O_3$ content is more preferably at least 1%, further preferably at least 2%.

In order to prevent occurrence of devitrification at the time of glass melting/forming, thus leading to deterioration of the glass quality, the range of MgO+CaO is preferably at most 15%, more preferably at most 14%, further preferably at most 13%, even more preferably at most 12%, most preferably at most 10%. However, if MgO+CaO is too low, the glass viscosity at the time of melting/forming may be too high, whereby glass production may be difficult. Accordingly, MgO+CaO is preferably at least 1%, more preferably at least 2%, further preferably at least 3%, even more preferably at least 4%, most preferably at least 5%.

Further, in order to prevent the glass from being fragile and having lowered strength, or for weight saving of the glass plate, the BaO content is preferably at most 1%, more preferably at most 0.5%, further preferably at most 0.1%, particularly preferably substantially no BaO is contained.

In the same manner as above, in order to prevent the glass from being fragile and having lowered strength, or for weight saving of the glass plate, $SrO+BaO+ZrO_2$ is more preferably at most 12%, further preferably at most 8%, particularly preferably at most 5%, even more preferably at most 4%, most preferably at most 3%.

Further, in order to increase the radio transmittance, the MgO content is preferably at most 11.8%, more preferably at most 10%, further preferably at most 8%, particularly preferably at most 6%, even more preferably at most 4%, most preferably at most 2%.

In order to improve the melting property and to increase the radio transmittance, the CaO content is preferably at least 2%, more preferably at least 3%, further preferably at least 4%, particularly preferably at least 5%, even more preferably at least 6%. The CaO content is, with a view to suppressing devitrification, more preferably at most 18%, further preferably at most 16%, particularly preferably at most 14%, even more preferably at most 12%, still even more preferably at most 10%, still even more preferably at most 9%, most preferably at most 8%.

$ZrO_2$ may be contained so as to improve the chemical durability, and in a case where $ZrO_2$ is contained, its content is more preferably at least 0.5%. In order that the average coefficient of linear expansion is not high, its content is more preferably at most 1.8%, further preferably at most 1.5%.

The $R_2O$ content is, with a view to improving the melting property, more preferably at least 6%, further preferably at least 7%, particularly preferably at least 8%. On the other hand, in order to improve the weather resistance, it is more preferably at most 18%, further preferably at most 16%, still more preferably at most 15%, even more preferably at most 14.5%, particularly preferably at most 13.5%.

The RO content is, with a view to improving the melting property and improving the radio transmittance, more preferably at least 4%, further preferably at least 6%, particularly preferably at least 7%. On the other hand, with a view to improving the weather resistance and suppressing devitrification, it is preferably at most 19%, further preferably at most 18%, still more preferably at most 17%, still more preferably at most 16%, particularly preferably at most 14%, most preferably at most 12%.

The glass plate according to embodiment 9 of the present invention preferably satisfies the following conditions.

It contains, as represented by mol % based on oxides, the following components in the following contents:

$55 \leq SiO_2 \leq 75$ $0.5 \leq Al_2O_3 \leq 15$ $0 \leq B_2O_3 \leq 15$ $0 \leq MgO \leq 15$ $0 \leq CaO \leq 20$ $0 \leq SrO \leq 15$ $0 \leq BaO \leq 15$ $3.4 < Li_2O \leq 20$ $0 \leq Na_2O \leq 16.6$ $0 \leq K_2O \leq 16.6$ $0 \leq ZrO_2 \leq 2$ $0.001 \leq Fe_2O_3 \leq 5$ $0.001 \leq TiO_2 \leq 5$ $3.4 \leq R_2O \leq 20$ $1 \leq RO \leq 20$ $85 \leq SiO_2+Al_2O_3+MgO+CaO+SrO+BaO+Li_2O+Na_2O+K_2O+Fe_2O_3+TiO_2 \leq 100$ $-60 \leq 7Al_2O_3+3MgO-4Li_2O \leq -10$ $0 \leq PbO < 0.001$.

Within the range of the embodiment 9, a glass plate having a high radio transmittance and satisfying properties required for the desired application can be obtained.

In order to increase the radio transmittance, in the embodiment 9, the following range is more preferred.

The $SiO_2$ content is, in order to increase the Young's modulus and the weather resistance, more preferably at least 60%, further preferably at least 63%, particularly preferably at least 65%. With a view to improving the viscosity, it is more preferably at most 74%, further preferably at most 72%, particularly preferably at most 70%.

The $Na_2O$ content is, in order to increase the melting property and to adjust the average coefficient of linear expansion, more preferably at least 1%, further preferably at least 2%, particularly preferably at least 3%. Further, $Na_2O$ if contained deteriorates the weather resistance, and accordingly its content is more preferably at most 15%, further preferably at most 13%, particularly preferably at most 11%, even more preferably at most 9%, most preferably at most 7%.

The $K_2O$ content is, in order to increase the radio transmittance, more preferably at least 0.5%, further preferably at least 1%, particularly preferably at least 2%, even more preferably at least 3%, most preferably at least 4%. Further, the $K_2O$ content is more preferably at most 15%, further preferably at most 13%, particularly preferably at most 11%, even more preferably at most 9%, most preferably at most 7%.

The $Li_2O$ content is, in order to increase the melting property and the Young's modulus and to improve the radio transmittance, more preferably at least 3.5%, further preferably at least 4%, particularly preferably at least 4.5%, even more preferably at least 5%. Further, $Li_2O$ if contained may cause devitrification and phase separation, and accordingly its content is more preferably at most 18%, further preferably at most 16%, particularly preferably at most 14%, even more preferably at most 13%, still even more preferably at most 12%, most preferably at most 10%.

SrO may be contained so as to improve the melting property and to increase the radio transmittance, and in a case where SrO is contained, its content is preferably at least 0.5%, more preferably at least 1%, particularly preferably at least 2%. The SrO content is, in order to prevent the glass from being fragile, more preferably at most 12%, further preferably at most 10%, particularly preferably at most 8%, even more preferably at most 6%, most preferably at most 4%.

$7Al_2O_3+3MgO-4Li_2O$ is, in order to improve the water resistance of the glass, more preferably at least $-50$, further preferably at least $-40$, particularly preferably at least $-35$, even more preferably at least $-30$, most preferably at least $-25$. Further, in order to increase the radio transmittance of the glass, $7Al_2O_3+3MgO-4Li_2O$ is more preferably at most 11, further preferably at most $-12$, particularly preferably at most $-13$, even more preferably at most $-14$, most preferably at most $-15$.

$Na_2O/R_2O$ is, in order to increase the radio transmittance, more preferably at least 0.05, further preferably at least 0.1, particularly preferably at least 0.15, even more preferably at least 0.2, most preferably at least 0.25. Further, $Na_2O/R_2O$ is more preferably at most 0.95, further preferably at most 0.9, particularly preferably at most 0.8, even more preferably at most 0.7, still even more preferably at most 0.6, most preferably at most 0.5.

In the embodiment 9, in order to lower the viscosity at the time of glass melting/forming for easy production, $SiO_2+Al_2O_3$ is preferably at least 50%, further preferably at least 55%, particularly preferably at least 60%, even more preferably at least 65%, most preferably at least 68%. Further, the range of $SiO_2+Al_2O_3$ is preferably at most 80%, further preferably at most 78%, particularly preferably at most 76%, even more preferably at most 74%, most preferably at most 72%.

In order to lower the glass viscosity at the time of melting/forming for easy production, the $Al_2O_3$ content is more preferably at most 13%. The $Al_2O_3$ content is further preferably at most 11%, particularly preferably at most 9%, even more preferably at most 7%, most preferably at most 5%. The $Al_2O_3$ content is, in order to secure the weather resistance, more preferably at least 1%, further preferably at least 1.5%, particularly preferably at least 2%, especially particularly preferably at least 2.5%, most preferably at least 3%.

$K_2O/R_2O$ is, in order to increase the radio transmittance, more preferably at least 0.05, further preferably at least 0.1, particularly preferably at least 0.15, even more preferably at least 0.2, most preferably at least 0.25. Further, $K_2O/R_2O$ is more preferably at most 0.95, further preferably at most 0.9, particularly preferably at most 0.7, even more preferably at most 0.5, most preferably at most 0.4. By $Na_2O/R_2O$ and $K_2O/R_2O$ being within the predetermined ranges, the radio transmittance is likely to be increased.

In the embodiment 9, $R_2O \times MgO$ is more preferably low so as to increase the radio transmittance. $R_2O \times MgO$ is more preferably at most $200\%^2$, further preferably at most $100\%^2$, particularly preferably at most $70\%^2$, even more preferably at most $50\%^2$, most preferably at most $30\%^2$.

In order to prevent boron and alkali elements from volatilizing during melting/forming, thus leading to deterioration of the glass quality, $R_2O+B_2O_3$ is preferably at most 25%, more preferably at most 24%, more preferably at most 23%, further preferably at most 21%, even more preferably at most 19%, most preferably at most 18%. However, if $R_2O+B_2O_3$ is too low, the glass viscosity at the time of melting/forming may be too high, whereby glass production may be difficult. Accordingly, $R_2O+B_2O_3$ is preferably at least 1%, more preferably at least 2%, further preferably at least 4%, even more preferably at least 6%, most preferably at least 8%.

In order to prevent boron and alkali elements from volatilizing during melting/forming, thus leading to deterioration of the glass quality, the $B_2O_3$ content is preferably at most 15%, more preferably at most 12%, further preferably at most 10%, even more preferably at most 8%, most preferably at most 6%. Further, $B_2O_3$ may be contained so as to improve the melting property, and in a case where $B_2O_3$ is contained, its content is preferably at least 0.5%, more preferably at least 1%, further preferably at least 2%.

In order to prevent occurrence of devitrification at the time of glass melting/forming, thus leading to deterioration of the glass quality, in a case where MgO and CaO are contained, MgO+CaO is preferably at most 15%, more preferably at most 14%, further preferably at most 13%, even more preferably at most 12%, most preferably at most 10%. However, if MgO+CaO is too low, the glass viscosity at the time of melting/forming may be too high, whereby glass production may be difficult. Accordingly, MgO+CaO is preferably at least 1%, more preferably at least 2%, further preferably at least 3%, even more preferably at least 4%, most preferably at least 5%.

Further, in order to prevent the glass from being fragile and having lowered strength, or for weight saving of the glass plate, the BaO content is preferably at most 15%, more preferably at most 10%, further preferably at most 8%, particularly preferably at most 5%, even more preferably at most 3%, still even more preferably at most 1%, most preferably substantially no BaO is contained.

In the same manner as above, in order to prevent the glass from being fragile and having lowered strength, or for weight saving of the glass plate, $SrO+BaO+ZrO_2$ is more preferably at most 12%, further preferably at most 8%, particularly preferably at most 6%, even more preferably at most 4%, most preferably at most 2%.

Further, in order to increase the radio transmittance, the MgO content is more preferably at most 12%. The MgO content is further preferably at most 8%, particularly preferably at most 5%, even more preferably at most 3%, most preferably at most 2%.

In order to improve the melting property and to increase the radio transmittance, the CaO content is more preferably at least 0.5%, further preferably at least 1%, particularly preferably at least 2%, even more preferably at least 3%, most preferably at least 4%. The CaO content is, with a view to suppressing devitrification, more preferably at most 15%, further preferably at most 13%, particularly preferably at most 11%, even more preferably at most 9%, most preferably at most 8%.

$ZrO_2$ may be contained so as to improve the chemical durability, and in a case where $ZrO_2$ is contained, its content is more preferably at least 0.5%. In order that the average coefficient of linear expansion is not high, the content is more preferably at most 1.8%, further preferably at most 1.5%.

The $R_2O$ content is, with a view to improving the melting property, more preferably at least 5%, more preferably at least 6%, more preferably at least 7%, further preferably at least 8%, particularly preferably at least 10%. On the other hand, in order to improve the weather resistance, the $R_2O$ content is more preferably at most 18%, further preferably at most 17%, even more preferably at most 15%, particularly preferably at most 14.5%.

The RO content is, with a view to improving the melting property and improving the radio transmittance, more preferably at least 5%, further preferably at least 7%, particularly preferably at least 10%, most preferably at least 12%, and on the other hand, with a view to improving the weather resistance and suppressing devitrification, more preferably at most 19%, further preferably at most 18%, still more preferably at most 17%, particularly preferably at most 16%, most preferably at most 15%.

The glass plate according to embodiment 10 of the present invention preferably satisfies the following conditions.

It contains, as represented by mol % based on oxides, the following components in the following contents:

$55 \leq SiO_2 \leq 75$ $0 \leq Al_2O_3 < 1.3$ $0 \leq B_2O_3 \leq 15$ $0 \leq MgO \leq 4.5$ $0 \leq CaO \leq 20$ $0 \leq SrO \leq 4$ $0 \leq BaO \leq 15$ $0 Li_2O < 0.01$ $0 \leq Na_2O \leq 14.4$ $1 \leq K_2O \leq 16$ $0 \leq ZrO_2 \leq 2$ $0.001 \leq Fe_2O_3 \leq 1.5$ $0.001 \leq TiO_2 \leq 5$ $1.1 \leq R_2O \leq 18$ $0 \leq RO \leq 20$ $85 \leq SiO_2+Al_2O_3+MgO+CaO+SrO+BaO+Li_2O+Na_2O+K_2O+Fe_2O_3+TiO_2 \leq 100$ $0 \leq 7Al_2O_3+3MgO \leq 22.6$ $0.05 \leq Na_2O/R_2O \leq 0.80$ $0 \leq PbO < 0.001$ $0 \leq ZnO \leq 0.5$.

Within the range of the embodiment 10, a glass plate which has a high radio transmittance, mass production of which by float process is easily conducted, and which satisfies properties required for the desired application, can be obtained.

In order to increase the radio transmittance, in the embodiment 10, the following range is more preferred.

The $SiO_2$ content is, in order to increase the Young's modulus and the weather resistance, more preferably at least 60%, further preferably at least 65%, still more preferably at least 68%, particularly preferably at least 70%. With a view to improving the viscosity, the $SiO_2$ content is more preferably at most 74%, further preferably at most 73.5%, particularly preferably at most 73%.

$Al_2O_3$ is, in order to increase the radio transmittance, more preferably less than 1.3%, more preferably at most 1.2%, further preferably at most 1.0%, particularly preferably at most 0.8%. In order to increase the Young's modulus and the weather resistance, more preferably at least 0.1%, further preferably at least 0.2%, particularly preferably at least 0.3%, most preferably at least 0.5%.

The MgO content is, with a view to improving the melting property and the weather resistance, more preferably at least 0.1%, further preferably at least 0.25%, still more preferably at least 0.3%, still more preferably at least 0.4%, particularly preferably at least 0.5%. The MgO content is, in order to increase the radio transmittance, more preferably at most 4.5%, more preferably at most 4.0%, more preferably at most 3.5%, further preferably at most 3%, still more preferably at most 2.5%, even more preferably at most 2%, particularly preferably at most 1.5%, most preferably at most 1%.

The CaO content is, in order to improve the melting property and to increase the radio transmittance, preferably at least 1%, more preferably at least 2%, further preferably at least 4%, particularly preferably at least 5%, even more preferably at least 6%, most preferably at least 8%. The CaO content is, with a view to suppressing devitrification, more preferably at most 18%, further preferably at most 16%, particularly preferably at most 15%, even more preferably at most 14%, most preferably at most 13%.

BaO may be contained so as to improve the melting property and to increase the radio transmittance, and in a case where BaO is contained, its content is preferably at least 0.5%, more preferably at least 1%, particularly preferably at least 2%. The BaO content is, in order to prevent the glass from being fragile, more preferably at most 12%, further preferably at most 10%, particularly preferably at most 7%, especially particularly preferably at most 5%, most preferably at most 3%.

The $Na_2O$ content is, in order to increase the melting property and to adjust the average coefficient of linear expansion, more preferably at least 0.1%, further preferably at least 1%, particularly preferably at least 3%, even more preferably at least 5%, still even more preferably at least 6%, most preferably at least 7%. Further, $Na_2O$ if contained deteriorates the weather resistance, and accordingly its content is more preferably at most 13%, further preferably at most 11%, particularly preferably at most 10%, even more preferably at most 9%, most preferably at most 8%.

The $K_2O$ content is, in order to increase the radio transmittance, more preferably at least 3%, further preferably at least 4%, particularly preferably at least 5%, even more preferably at least 6%, most preferably at least 7%. In order that the high temperature viscosity is not too high, it is more preferably at most 13%, further preferably at most 11%, particularly preferably at most 10%, even more preferably at most 9%, most preferably at most 8%.

$ZrO_2$ may be contained so as to improve the chemical durability, and in a case where $ZrO_2$ is contained, its content is more preferably at least 0.5%. The $ZrO_2$ content is, in order that the average coefficient of linear expansion is not high, more preferably at most 1.8%, further preferably at most 1.5%.

$R_2O$ is, with a view to improving the melting property, more preferably at least 4%, more preferably at least 5%, further preferably at least 6%, still more preferably at least 7%, particularly preferably at least 8%. On the other hand, in order to improve the weather resistance, it is more preferably at most 17%, further preferably at most 15%, still more preferably at most 14%, particularly preferably at most 13%, particularly preferably at most 12%, especially particularly preferably at most 11%, most preferably at most 10%.

RO is, with a view to improving the melting property and improving the radio transmittance, more preferably at least 4%, more preferably at least 5%, further preferably at least 7%, particularly preferably at least 10%, especially particularly preferably at least 12%, most preferably at least 12.5%. On the other hand, with a view to improving the weather resistance and suppressing devitrification, it is more preferably at most 19%, further preferably at most 18%, still more preferably at most 17%, particularly preferably at most 16%, most preferably at most 15%.

$7Al_2O_3+3MgO$ is, in order to increase the weather resistance and to increase the Young's modulus thereby to increase rigidity of the glass plate, more preferably at least 0.5%, further preferably at least 1%, particularly preferably at least 2%, even more preferably at least 3%, most preferably at least 5%. Further, in order to increase the radio transmittance, $7Al_2O_3+3MgO$ is more preferably at most 22%, further preferably at most 20%, particularly preferably at most 18%, even more preferably at most 15%, most preferably at most 10%.

$Na_2O/R_2O$ is, in order to increase the radio transmittance, more preferably at least 0.1, more preferably at least 0.2, more preferably at least 0.25, further preferably at least 0.3, particularly preferably at least 0.35, even more preferably at least 0.4, most preferably at least 0.45. Further, $Na_2O/R_2O$ is more preferably at most 0.75, further preferably at most 0.7, particularly preferably at most 0.65, even more preferably at most 0.6, most preferably at most 0.55.

$SiO_2+Al_2O_3$ is more preferably at least 50%, further preferably at least 55%, particularly preferably at least 60%, even more preferably at least 65%, most preferably at least 68%. Further, $SiO_2+Al_2O_3$ is more preferably at most 80%, further preferably at most 78%, particularly preferably at most 76%, even more preferably at most 74.5%, still even more preferably at most 74%, most preferably at most 73%.

$R_2O \times MgO$ is more preferably lower so as to increase the radio transmittance. $R_2O \times MgO$ is preferably at most $80\%^2$, more preferably at most $75\%^2$, further preferably at most $70\%^2$, particularly preferably at most $50\%^2$, even more preferably at most $30\%^2$, most preferably at most $20\%^2$.

In order to prevent boron and alkali elements from volatilizing during melting/forming, thus leading to deterioration of the glass quality, $R_2O+B_2O_3$ is preferably at most 19%, more preferably at most 18%, further preferably at most 17%, even more preferably at most 16%, most preferably at most 15%. However, if $R_2O+B_2O_3$ is too low, the glass viscosity at the time of melting/forming may be too high, whereby glass production may be difficult. Accordingly, $R_2O+B_2O_3$ is preferably at least 2%, more preferably at least 4%, more preferably at least 6%, further preferably at least 8%, even more preferably at least 10%, most preferably at least 12%.

In the embodiment 10 also, in order to prevent boron and alkali elements from volatilizing during melting/forming, thus leading to deterioration of the glass quality, by a relative increase of the $Na_2O$ content in the glass to the total alkali amount, particularly in production by float process, the $B_2O_3$ content is preferably at most 15%, more preferably at most 10%, further preferably at most 7%, even more preferably at most 5%, still even more preferably at most 3%, particularly preferably at most 2%, especially particularly preferably at most 1%, most preferably substantially no $B_2O_3$ is contained.

The glass plate according to the embodiment 10 preferably satisfies $85 \leq SiO_2+Al_2O_3+MgO+CaO+SrO+BaO+Li_2O+Na_2O+K_2O+Fe_2O_3+TiO_2 \leq 100$, whereby a glass plate can be produced from easily available glass raw materials. Further, in the case of a composition with small $Al_2O_3$ and MgO as the glass of the present embodiment, in order to secure also the weather resistance of the glass plate, the above total amount is more preferably at least 98.5%. It is more preferably at least 99%, particularly preferably at least 99.5%. Since a glass plate for a window material typically contains a coloring agent, a fining agent, etc., the upper limit of the total amount is even more preferably 99.9%.

Further, in the embodiment 10, in order to prevent the glass from being fragile and having lowered strength, since the amounts of $Al_2O_3$ and MgO are small, and for weight saving of the glass plate, the SrO content is preferably at most 4%, more preferably at most 2.5%, further preferably at most 1%, and particularly preferably substantially no SrO is contained.

In order to prevent occurrence of devitrification at the time of glass melting/forming, thus leading to deterioration of the glass quality, MgO+CaO is preferably at most 18%, more preferably at most 16%, more preferably at most 14%, further preferably at most 13%, even more preferably at most 12%, most preferably at most 11%. However, if MgO+CaO is too low, the glass viscosity at the time of melting/forming may be too high, whereby glass production may be difficult. Accordingly, MgO+CaO is preferably at least 1%, more preferably at least 3%, further preferably at least 4%, even more preferably at least 6%, most preferably at least 9%.

The glass plate according to the embodiment 10 particularly tends to be devitrified. Accordingly, the $TiO_2$ content is preferably at most 1.5%, more preferably at most 1%, further preferably at most 0.5%, particularly preferably at most 0.2%, even more preferably at most 0.1%, most preferably at most 0.05%.

In order that the glass plate according to the embodiment 10 can be produced by float process, the ZnO content is preferably at most 0.5%. ZnO if contained forms a Zn-based compound in a float bath, thus leading to glass defects. Accordingly, the ZnO content is more preferably at most 0.1%, further preferably ZnO is not contained.

Of the glass plate according to the present embodiment, the $Fe_2O_3$ content is preferably from 0.001% to 1.5%. If the $Fe_2O_3$ content is less than 0.001%, the glass plate may not be used for an application for which heat shielding property is required, it is necessary to use an expensive raw material having a low iron content for production of the glass plate, and further, thermal radiation may reach the bottom of the melting furnace more than necessary at the time of glass melting and a burden may be imposed on the melting furnace. The $Fe_2O_3$ content is more preferably at least 0.005%, further preferably at least 0.01%, particularly preferably at least 0.015%, even more preferably at least 0.02%, most preferably at least 0.05%.

If the $Fe_2O_3$ content is higher than 1.5%, heat transfer by radiation may be inhibited, whereby the raw materials may not easily be melted. Further, if the $Fe_2O_3$ content is too high, the light transmittance in the visible region decreases ($T_V$ decreases), and such a glass plate may not be suitable for an application to automobiles. Accordingly, the $Fe_2O_3$ content is more preferably at most 1.5%, further preferably at most 1%, further preferably at most 0.8%, still more preferably at most 0.6%, particularly preferably at most 0.5%, even more preferably at most 0.4%, most preferably at most 0.3%.

Of the glass plate in the present invention, according to any of the above embodiments, the NiO content is preferably at most 100 mass ppm (including 0 mass ppm). Of the glass plate of the present invention, the total content of components other than $SiO_2$, $Al_2O_3$, $B_2O_3$, MgO, CaO, SrO, BaO, $Li_2O$, $Na_2O$, $K_2O$, $TiO_2$, $ZrO_2$, $Fe_2O_3$ and NiO (hereinafter sometimes referred to as "other components") is preferably at most 5%. Such other components may, for example, be $Y_2O_3$, $Nd_2O_5$, $P_2O_5$, $GaO_2$, $GeO_2$, $CeO_2$, $MnO_2$, CoO, $Cr_2O_3$, $V_2O_5$, Se, $Au_2O_3$, $Ag_2O$, ZnO, CuO, CdO, $SO_3$, Cl, F, $SnO_2$ and $Sb_2O_3$, and they may be in the form of metal ions or may be in the form of an oxide. Of the glass plate of the present invention, more preferably the NiO content is at most 100 mass ppm (including 0 mass ppm) and the total content of other components is at most 5%.

NiO if contained forms NiS, which may lead to glass destruction, and accordingly its content is preferably at most 100 mass ppm, more preferably at most 10 mass ppm, and further preferably substantially no NiO is contained. Other components may be contained in a content of at most 5% for various purposes (for example, fining and coloring). If the content of other components is higher than 5%, the radio transmittance may be negatively affected. The content of other components is more preferably at most 3%, more preferably at most 2%, further preferably at most 1.5%, further preferably at most 1%, particularly preferably at most 0.5%, even more preferably at most 0.3%, most preferably at most 0.1%. Further, in order to prevent influence over the environment and human body, the $As_2O_3$ and PbO contents are respectively preferably less than 0.001%, and most preferably substantially no $As_2O_3$ and PbO are contained.

$SO_3$ may be used as a fining agent and contribute to degassing. In a case where $SO_3$ is used, it may be contained in the glass by using a sulfate as a raw material, and in a case where $SO_3$ is contained, its content is preferably at least 0.01%, more preferably at least 0.02%, more preferably at least 0.04%, particularly preferably at least 0.08%, most preferably at least 0.1%. If it is contained in a large amount, the above-described amber coloring may occur, and accordingly its content is preferably at most 1%, more preferably at most 0.8%, still more preferably at most 0.6%, most preferably at most 0.5%.

$Sb_2O_3$ acts as a fining agent in the same manner as $SO_3$, and in order to prevent influence over the environment and human body, its content is more preferably at most 0.5%, further preferably at most 0.2%, still more preferably at most 0.1%, particularly preferably at most 0.05%, especially particularly preferably at most 0.01%, and most preferably substantially no $Sb_2O_3$ is contained.

$CeO_2$ acts as an oxidizing agent to control the FeO amount. Further, it blocks ultraviolet light to prevent deterioration of an interior material by ultraviolet light. In a case where $CeO_2$ is contained, its content is preferably at least 0.004%, more preferably at least 0.01%, further preferably at least 0.05%, particularly preferably at least 0.1%. In order to prevent the cost increase at the time of production, it is preferably at most 1%, more preferably at most 0.5%, particularly preferably at most 0.3%.

$Cr_2O_3$ acts as an oxidizing agent to control the FeO amount. In a case where $Cr_2O_3$ is contained, its content is preferably at least 0.002%, more preferably at least 0.004%. $Cr_2O_3$ has coloring in the visible region and thus may decrease the transmittance in the visible region. The content is preferably at most 1%, more preferably at most 0.5%, particularly preferably at most 0.3%, most preferably at most 0.1%.

$SnO_2$ functions as a reducing agent to control the FeO amount. In a case where $SnO_2$ is contained, its content is preferably at least 0.01%, more preferably at least 0.04%, further preferably at least 0.06%, particularly preferably at least 0.08%. In order to suppress defects derived from $SnO_2$ at the time of production, its content is preferably at most 1%, more preferably at most 0.5%, particularly preferably at most 0.3%, most preferably at most 0.2%.

Further, $P_2O_5$ is likely to generate glass defects in a float bath in production by float process, and accordingly its content is more preferably at most 1%, further preferably at most 0.5%, particularly preferably at most 0.1%, even more preferably less than 0.001%.

The glass plate of the present invention preferably has a dielectric loss tan δ at a frequency of 35 GHz of at least 0.001 and at most 0.019. The dielectric loss tan δ of the glass material is particularly preferably low, whereby the radio transmittance can be increased. tan δ is preferably at most 0.019, more preferably at most 0.017, further preferably at most 0.015, particularly preferably at most 0.013, even more preferably at most 0.010, most preferably at most 0.008. In view of the radio transmittance, there is no lower limit of the preferred dielectric loss, however, if tan δ is too low, the $SiO_2$ content tends to be too high, and the glass melting property may decrease. Accordingly, tan δ is preferably at least 0.0015, more preferably at least 0.003, further preferably at least 0.004, particularly preferably at least 0.005, even more preferably at least 0.007, most preferably at least 0.0075.

The glass plate of the present invention has a thickness of preferably at least 1 mm and at most 36 mm. If the thickness is less than 1 mm, the glass plate is less likely to have rigidity and may hardly be practically used. The thickness of the glass plate of the present invention is more preferably at least 1.2 mm, further preferably at least 1.8 mm, particularly preferably at least 2.4 mm, even more preferably at least 2.8 mm, most preferably at least 3.7 mm. Further, if the thickness exceeds 36 mm, advantageous of the material having a high radio transmittance may not practically sufficiently be made use of. The thickness is more preferably at most 24 mm, further preferably at most 12 mm, particularly preferably at most 10 mm, even more preferably at most 8 mm, most preferably at most 7 mm.

The thickness may be a total thickness of a plurality of glass plates overlaid. For examples, two different glass plates of the present invention may be laminated to have the above thickness. The glass plate of the present invention may be used together with another glass plate, that is, as overlaid on or disposed to be adjacent to another glass plate. The above-described glass plate having a specific composition may secure the radio transmittance as defined in this specification, even when overlaid on a glass plate having a composition out of the range of the specific composition. That is, only one or some layers in laminated glass may have the above specific composition. The glass plate of the present invention may be used as laminated on a transparent resin other than glass.

In another aspect of the present invention, a window comprising the glass plate according to the above embodiment is provided.

In this specification, a "window" means one comprising a see-through glass plate to partition the interior and the exterior of a vehicle or a building or one room and an adjacent room, surrounded by a non-glass material. The "vehicle" includes any vehicle and transport having a room surrounded by a wall (which may include a window), such as an automobile, a train, a carriage, ship, an airplane, a helicopter, a cable car, a Ferris wheel, etc. Likewise, the "building" includes any building having a room surrounded by a wall (which may include a window), such as a house, an office building, a store, a warehouse, a factory, a booth, etc. The non-glass material surrounding the glass plate in the window may, for example, be a metal, a wood material, a concrete, a stone material, a ceramic, bricks, plastic, carbon fibers, or any mixture thereof, but it is not limited thereto. The non-glass material surrounding the glass plate is typically a body frame or a door frame of an automobile, or a material of a wall, a ceiling, a floor or a door, or a window frame, of a building. It is possible that the entire door, the entire wall, the entire ceiling or the entire floor may comprise a window.

The glass plate which the window of the present invention comprises usually has an area of at least 10,000 $mm^2$ per plate, however, a window constituted by a plurality of glass plates having a smaller area is possible. The window by the present invention may comprise the glass plate of the present invention as laminated with other glass plate or a transparent material and embedded.

According to an embodiment, the window is a window for an automobile. That is, this window may be a windshield, a rear glass, a front door glass, a rear door glass, a side glass or a roof glass of an automobile. The thickness of the glass plate which the window for an automobile comprises is preferably at least 1.2 mm, more preferably at least 2 mm, further preferably at least 2.8 mm, even more preferably at least 3.2 mm, most preferably at least 3.7 mm. The visible light transmittance $T_{VA}$ (JIS R3106: 1998) of the glass plate which the window for an automobile comprises, is preferably at least 72% as calculated as 3.85 mm thickness, in the case of a windshield or a front door glass. In applications other than a windshield or a front door glass, $T_{VA}$ is usually from 30 to 92%.

According to an embodiment, the window for an automobile may be provided with an information acquisition apparatus to acquire information from outside by light irradiation and/or light receiving, has at least one information acquisition region which faces the information acquisition apparatus and which transmits light, and has an outside glass plate, an inside glass plate and an interlayer disposed between these glass plates. It is particularly preferably used for a windshield. The window for an automobile may be a laminated glass or may be tempered glass. The tempered glass may be physically tempered glass or may be chemically tempered glass.

The wavelength of light which is applied to or received by the window for an automobile is preferably within a range of from 700 to 1,650 nm, whereby a commercial laser radar or infrared camera can be used. Further, the transmittance of the information acquisition region at a wavelength of from 700 to 1,650 nm is preferably from 80 to 92%, whereby light detection by the information acquisition apparatus becomes easy. The transmittance is more preferably at least 83%, further preferably at least 86%, particularly preferably at least 88%, even more preferably at least 89%, most preferably at least 90%. Further, if the transmittance at a wavelength of from 700 to 1,650 nm is too high, the heat shielding property may be deteriorated, and accordingly the transmittance is more preferably at most 91.5%, further preferably at most 91%.

According to an embodiment, the window for an automobile may be provided with an information acquisition apparatus to acquire information from outside by light irradiation and/or light receiving, has at least one information acquisition region which faces the information acquisition apparatus and which transmits light, and has an outside glass plate, an inside glass plate and an interlayer disposed between these glass plates. It is particularly preferably used for a windshield.

The frequency of radio waves applied to or received by the window for an automobile is preferably within a range of from 2 to 100 GHz, whereby a commercial radar apparatus can be used. it is more preferably at least 20 GHz, further preferably at least 50 GHz, particularly preferably at least 60 GHz. Further, at least one of the outside glass plate and the inside glass plated to be used for the information acquisition region has a radio transmittance of preferably from 20 to 84% at a frequency of 100 GHz as calculated as 18 mm thickness, whereby radio detection by the information acquisition apparatus will be easy. The radio transmittance is more preferably at least 22%, further preferably at least 25%, still more preferably at least 29%, particularly preferably at least 33%, even more preferably at least 37%, most preferably at least 40%. Further, if the radio transmittance is too high, preparation of such glass is difficult, and accordingly it is more preferably at most 80%, more preferably at most 70%, more preferably at most 60%, further preferably at most 55%, still more preferably at most 50%, particularly preferably at most 45%, even more preferably at most 43%, most preferably at most 41%.

Further, according to an embodiment, it is more preferred that both light irradiation and/or light receiving, and radio irradiation and/or radio receiving, are possible.

Accordingly to an embodiment, the window is a window for a building material. That is, the window is disposed on a wall, a door, a ceiling, a roof or a floor of a building. The thickness of the glass plate which the window for a building material comprises, is preferably at least 2 mm, more preferably at least 4 mm, further preferably at least 6 mm, particularly preferably at least 8 mm, even more preferably at least 10 mm, most preferably at least 12 mm.

The glass plate according to the embodiment of the present invention, or the glass plate which the window according to the embodiment of the present invention comprises, has a length of preferably at least 30 mm in a radio polarization direction. The polarization direction may be a direction perpendicular to the vertical line and in parallel with the glass plate surface, or a direction in parallel with the vertical line and in parallel with the glass plate surface. For example, a glass plate disposed in a flat window placed perpendicular to the horizontal plane, may have the above length in a lateral (horizontal) direction or in a lengthwise (vertical) direction. When the glass plate has a sufficient length in a polarization direction, radio waves of a radar or a mobile phone are likely to be transmitted/received.

According to another aspect of the present invention, a radio communication apparatus comprising the glass plate according to the above embodiment is provided.

In this specification, the "radio communication apparatus" means an electronic apparatus medium utilizing radio communication. The "radio communication apparatus" may include a mobile phone, a tablet, a personal computer, a clock, glasses, etc. In this specification, the "radio communication apparatus" comprises a front member and a rear member, and the glass plate according to the embodiment may be used for at least part of the front member or the rear member. Further, typically, the radio communication apparatus has a body holding the front member and the rear member. It may have, in the interior surrounded by the front member, the rear member and the body, an element having display function, an electric circuit board to drive the element, etc. The element having display function may, for example, be a liquid crystal display device or an organic EL device. Information can be displayed by the element having display function at least on the front member side. Information may also be displayed by the element having display function also on the rear member side as the case requires. The front member and the rear member may have a shape corresponding to the application and may be flat or curved.

The front member and the rear member may have a hole for a speaker, an operation button, a camera lens or the like.

Typically, the front member has a hole for a speaker and an operation button, and the rear member has a hole for a camera lens.

The material of the front member, the rear member and the body may, for example, be glass, crystallized glass, phase separated glass, a metal, a wood material, a stone material, a ceramic, a plastic, carbon fibers, a mixture of any of them, or a laminate of the combination of them.

The glass plate which the radio communication apparatus of the present invention comprises, may be laminated with other glass plate or transparent material and embedded. Further, it may be a chemically tempered glass plate.

The glass plate which the radio communication apparatus of the present invention comprises, may be used for both of the front member and the rear member of the radio communication apparatus, or may be used for only one of them.

The glass plate which the radio communication apparatus of the present invention comprises, has a radio transmittance of at least 20% at a frequency of 100 GHz as calculated as 18 mm thickness, and is thereby hardly a barrier to transmitting/receiving when the radio communication apparatus is used. In a case where the glass plate is provided to the radio communication apparatus, the radio transmittance is preferably at least 27%, more preferably at least 28%, further preferably at least 29%, particularly preferably at least 30%, most preferably at least 32%.

Further, in a case where the glass plate according to the embodiment is used for both the front member and the rear member, the difference between the radio transmittance of the glass plate used for the front member at a frequency of 100 GHz as calculated as 18 mm thickness and the radio transmittance of the glass plate used for the rear member at a frequency of 100 GHz as calculated as 18 mm thickness, is preferably at least 4%. When the difference in the radio transmittance is at least 4%, radio transmitting/receiving is carried out via the member having a higher radio transmittance between the front member and the rear member, and radio transmitting/receiving from the other member can be suppressed. For example, in a case where a speaker or a microphone is provided on the front member side, the front member side is used on the human head side, and by using the glass plate having a low radio transmittance on the front member side, radio waves which reach the human head can be weakened, and by using the glass plate having a high radio transmittance on the rear member side, radio transmitting/receiving can be conducted.

According to an embodiment, the radio communication apparatus has an antenna as a radio transmitting/receiving apparatus. The antenna may be disposed adjacent to or in contact with the glass plate, or may be formed in the glass plate, whereby the transmitting/receiving sensitivity of the antenna can be improved. Further, the antenna is preferably one capable of transmitting/receiving electromagnetic waves at a frequency of at least 1.0 GHz. The frequency of the radio waves transmitted/received by the antenna is preferably at least 2.4 GHz, more preferably at least 5 GHz, further preferably at least 10 GHz, particularly preferably at least 15 GHz, most preferably at least 25 GHz. There is no particular upper limit, and considering the application of the glass of the present invention, the frequency is at most 100 GHz, preferably at most 90 GHz.

According to an embodiment, the thickness of the glass plate which the radio communication apparatus comprises is, in a case where the glass plate is used for a part of or the entire rear member, preferably at most 4 mm, more preferably at most 2.5 mm, further preferably at most 1.5 mm, particularly preferably at most 1.1 mm, even more preferably at most 0.9 mm, most preferably at most 0.7 mm. On the other hand, the glass plate may have lowered strength if it is thin, and accordingly, the thickness is more preferably at least 0.5 mm. The thickness may not necessarily be uniform, may be distributed, and can be determined depending upon the application. If the thickness of the glass plate is distributed, the thickness at the thickest portion is defined as the "thickness of the glass plate" (the same applies in this specification).

Further, according to an embodiment, the thickness of the glass plate which the radio communication apparatus comprises is, when the glass plate is used for a part of or the entire front member, preferably at most 2.5 mm, more preferably at most 1.5 mm, further preferably at most 1.3 mm, particularly preferably at most 1.1 mm, even more preferably at most 0.9 mm, most preferably at most 0.7 mm. On the other hand, the glass plate may have lowered strength if it is thin, and accordingly the thickness is more preferably at least 0.5 mm. The thickness may not necessarily be uniform, may be distributed, and can be determined depending upon the application.

The visible light transmittance of the glass plate which the radio communication apparatus comprises may be adjusted depending upon the application, and the visible light transmittance of the glass plate used for a side on which information is displayed is more preferably at least 60% as calculated as 3.85 mm thickness.

EXAMPLES

Now, the present invention will be described in further detail with reference to Examples. However, it should be understood that the present invention is by no means restricted to such specific Examples.

[Preparation of Glass Plate Sample]

A glass plate having a composition (unit: mol %) as identified in the following Tables 1-1 to 1-28 was produced by a common method known to those skilled in the art. Specifically, raw materials were put in a platinum crucible so as to achieve the identified glass composition and melted at 1,550° C. for 2 hours, the melt was cast on a carbon plate and annealed to obtain a plate of glass. Both surfaces of the obtained plate were polished to obtain a glass plate having a thickness of about 30 mm.

Methods to determine values shown in Tables 1-1 to 1-28 are shown below.

(1) Average Coefficient of Linear Expansion (a) from 50 to 350° C.:

The average coefficient of linear expansion (a) was measured by a differential thermal dilatometer (TMA) and obtained as specified by JIS R3102 (1995).

(2) Glass Transition Point (Tg):

The glass transition point (Tg) was a value measured by TMA and determined by the specification of JIS R 3103-3 (2001).

(3) Specific Gravity (d):

The specific gravity (d) was obtained by measuring about 20 g of a glass block containing no bubble, cut out from the glass plate, by Archimedes' principle.

(4) Viscosity:

The viscosity was measured by a rotation viscosimeter, and the temperature $T_2$ (standard temperature for melting property) when the viscosity η becomes $10^2$ dPa·s, and the temperature $T_4$ (standard temperature for forming property) when the viscosity η becomes $10^4$ dPa·s were measured.

(5) Liquid Phase Temperature ($T_L$):

Platinum dishes on which 5 g of a glass block cut out from the glass plate was put, were respectively put in electric furnaces at different temperatures higher than the glass transition point, held for 17 hours, taken out of the furnaces and cooled. Whether precipitation was observed or not on the surface and in the inside of the glass block after cooling was examined, and the minimum temperature after held for 17 hours, among temperatures when no crystal was precipitated, was taken as the liquid phase temperature.

(6) Young's Modulus (E):

The Young's modulus (E) was measured by ultrasonic glass technique (Olympus Corporation, DL35) at 25° C.

(7) Water Resistance:

It was measured as a $Na_2O$ elution amount (mg) as specified by JIS R3502 (1995).

(8) Visible Light Transmittance ($T_{VA}$):

The glass plate was formed into a rectangle of 30.0 mm×30.0 mm×3.85 mm in thickness, and the 30.0 mm×30.0 mm faces were polished to mirror surface. The transmittance was measured by a spectrophotometer in accordance with JIS R3106: 1998, and the visible light transmittance $T_{VA}$ was calculated. As the spectrophotometer, spectrophotometer U4100 manufactured by Hitachi High-Technologies Corporation was used. As the weighting factors, standard illuminant A, 2 degree field of view values are employed. The value is as calculated as 3.85 mm plate thickness.

The value as calculated as 3.85 mm plate thickness is a value (visible light transmittance $T_{VA}$) of the glass plate as calculated as 3.85 mm plate thickness, considering the multiple reflection, by the reflectance of the glass plate calculated by Sellmeier's equation from the refractive index of the glass plate the transmittance of which was measured.

Glass having a visible light transmittance $T_{VA}$ of from 30 to 92% is represented by "◯", and a glass having a visible light transmittance $T_{VA}$ of higher than 92% or lower than 30% is represented by "×".

(9) Solar Direct Transmittance (Te):

As for Te, the transmittance was measured in accordance with ISO-13837A: 2008 by a spectrophotometer, and the solar direct transmittance Te was calculated. It is represented by a value as calculated as 3.85 mm plate thickness.

A glass plate having a solar direct transmittance Te of from 35 to 91% is represented by "◯", and a glass having a solar direct transmittance Te of higher than 91% or lower than 35% is represented by "×".

(10) Ultraviolet Transmittance (Tuv):

Tuv is as specified by ISO-9050: 2003.

(11) Transmittance at Wavelength 905 nm, Transmittance at Wavelength 1,550 nm

They were measured by a spectrophotometer. They are represented by values as calculated as 3.85 mm plate thickness.

(12) FeO Content

Ground glass was decomposed by a mixed acid of hydrofluoric acid and hydrochloric acid at room temperature, a certain amount of the decomposed liquid was collected in a plastic container, and a 2,2'-dipyridyl solution and an ammonium acetate buffer solution were quickly added for color development of only $Fe^{2+}$. The color developer was diluted with deionized water for a certain amount, and the absorbance at a wavelength of 522 nm was measured by an absorptiometer. And, from an analytical curve prepared by using a standard solution, the concentration was calculated and the FeO amount was calculated. FeO in Tables is the FeO amount as calculated as $Fe_2O_3$.

(13) Radio Transmittance

The radio transmittance with 18 mm thickness at 100 GHz, the exponential approximation formula of relation between frequency and radio transmittance (as calculated as 18 mm thickness) constant 1, and the exponential approximation formula of relation between frequency and radio transmittance (as calculated as 18 mm thickness) constant 2 were calculated from the above-described methods. The radio transmittance with 18 mm thickness at 100 GHz was obtained by carrying out exponential approximation as described above. The dielectric constant and the dielectric loss of the glass used for calculation were measured by cavity resonator method.

(14) Radio Transmitted Amount of Laminated Glass

Both surfaces of the glass plate were further polished to obtain a glass plate having a thickness of 2.0 mm. Two such glass plates having a thickness of 2.0 mm were laminated by means of a polyvinyl butyral (interlayer; PVB) adhesive layer and pre-bonded with vacuum suction, and the laminate was heated and pressurized by an autoclave chamber to obtain a laminated glass. The thickness of the adhesive layer in the obtained laminated glass was 0.7 mm.

The radio transmitted amount of the obtained laminated glass was measured by free space method. Antennas were disposed to face each other, the obtained laminated glass was disposed between them, and the radio transmitted amount of the laminated glass was measured based on a case where there is no laminated glass at an opening part having a diameter of 100 mm being 0 dB. The radio transmitted amount was measured at a frequency within a range of from 65 to 85 GHz.

Figure 4:
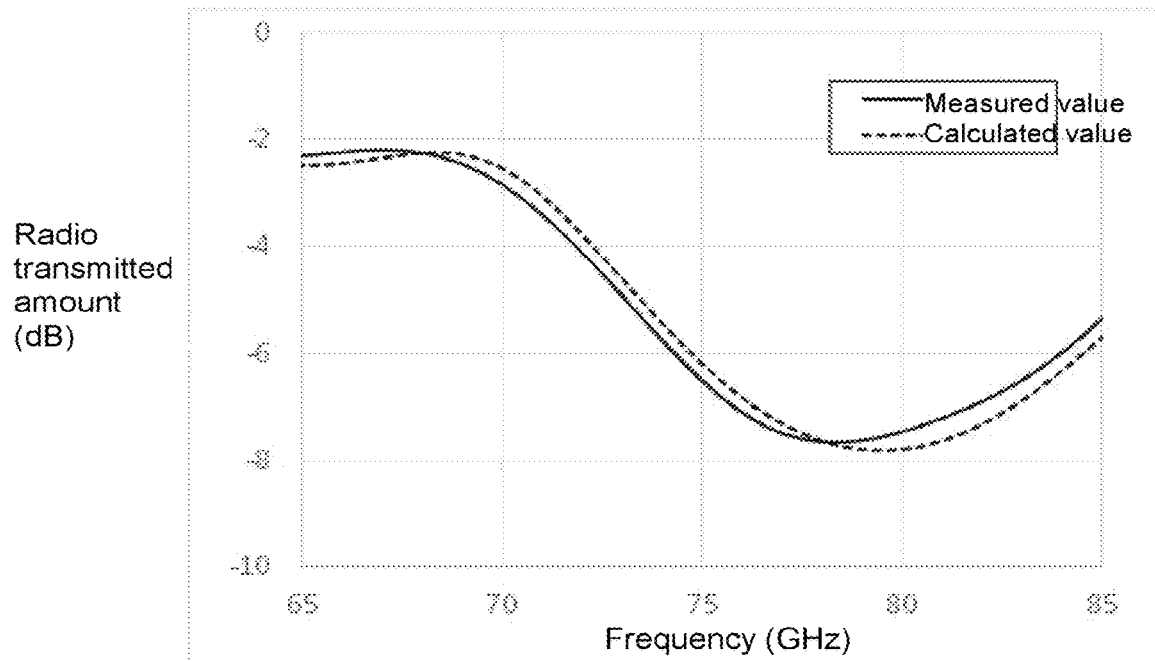
FIG. 4 is a graph illustrating the measured value of the radio transmitted amount and the calculated value of the radio transmitted amount obtained by exponential approximation of the laminated glass in Comparative Example 1.
Figure 5:
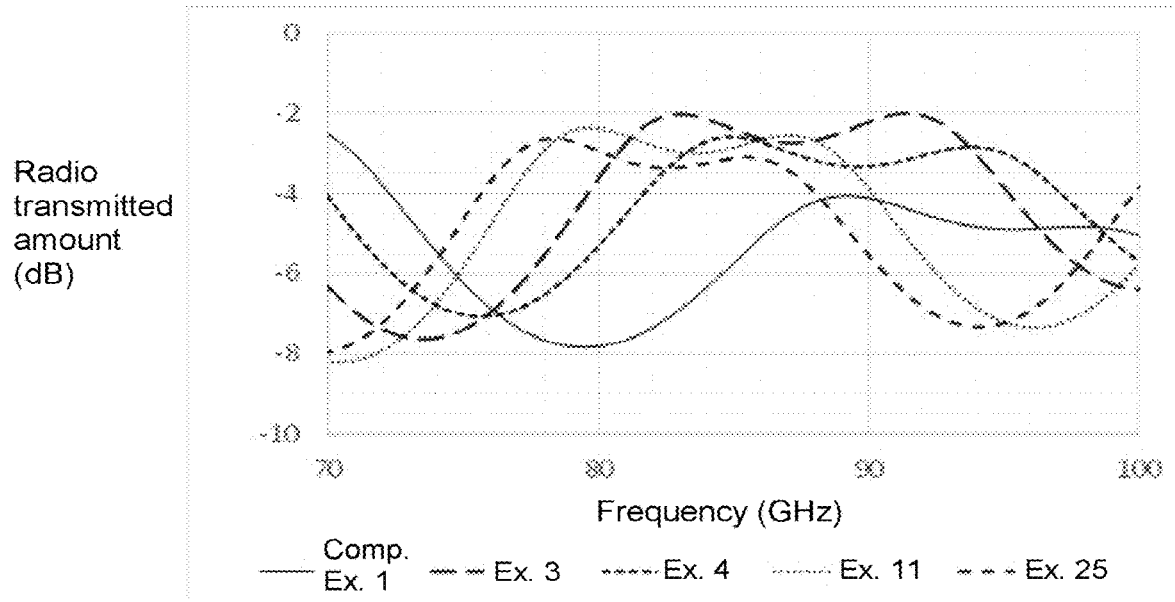
FIG. 5 is a graph illustrating the measured value of the radio transmitted amount and the calculated value of the radio transmitted amount obtained by exponential approximation of the laminated glass in each of Comparative Example 1, Example 3, Example 4, Example 11 and Example 25.

FIG. 4 is a graph illustrating the measured value of the radio transmitted amount and the calculated value of the radio transmitted amount obtained by exponential approximation of the laminated glass in Comparative Example 1. Well agreement between the measured value and the calculated value was confirmed. The same calculation was conducted in Example 3, Example 4, Example 11 and Example 25. FIG. 5 is a graph illustrating the measured value of the radio transmitted amount and the calculated value of the radio transmitted amount obtained by exponential approximation of the laminated glass in each of Comparative Example 1, Example 3, Example 4, Example 11 and Example 25. The frequency at the maximum value can be adjusted by the dielectric constant and the thickness of the glass. Agreement between the measured value and the calculated value was confirmed.

In Tables, "-" means that measurement was not conducted, and values obtained by calculation from the composition were represented in italics

TABLE 1

| Embodiment | Comp. Ex. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| | | 5 | 3 | 4 | 5 | 4 | 1 | 2 | 1 | 3 |
| $SiO_2$ (mol %) | 69.76 | 66.00 | 66.00 | 67.03 | 70.03 | 66.03 | 66.11 | 71.40 | 66.00 | 66.00 |
| $Al_2O_3$ (mol %) | 0.88 | 2.95 | 2.95 | 1.90 | 0.50 | 4.00 | 3.00 | 2.48 | 2.95 | 2.95 |
| $B_2O_3$ (mol %) | 0 | 0.50 | 0.50 | 0 | 0 | 0.50 | 0 | 0 | 0 | 0 |
| MgO (mol %) | 7.08 | 11.98 | 11.98 | 1.50 | 5.00 | 3.40 | 11.00 | 8.10 | 12.48 | 12.48 |
| CaO (mol %) | 9.09 | 0 | 0 | 12.00 | 11.90 | 10.00 | 1.57 | 10.00 | 0 | 0 |
| SrO (mol %) | 0 | 0 | 0 | 1.00 | 0 | 0 | 0 | 0 | 0 | 0 |
| BaO (mol %) | 0 | 0 | 0 | 1.00 | 0 | 0 | 0 | 0 | 0 | 0 |
| $TiO_2$ (mol %) | 0.05 | 0.05 | 0.05 | 0.05 | 0.05 | 0.05 | 0.05 | 0.05 | 0.05 | 0.05 |
| $ZrO_2$ (mol %) | 0 | 0 | 0 | 0 | 0 | 0 | 1.95 | 0 | 0 | 0 |
| $Li_2O$ (mol %) | 0 | 4.00 | 0 | 1.50 | 3.50 | 3.00 | 0 | 0 | 0 | 0 |
| $Na_2O$ (mol %) | 12.55 | 11.00 | 15.00 | 8.00 | 5.50 | 6.00 | 8.30 | 6.05 | 15.00 | 15.00 |
| $K_2O$ (mol %) | 0.57 | 3.50 | 3.50 | 6.00 | 3.50 | 7.00 | 8.00 | 1.90 | 3.50 | 3.50 |
| $Fe_2O_3$ (mol %) | 0.02 | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 | 0.00 |
| RO (mol %) | 16.17 | 12.48 | 12.48 | 15.50 | 16.90 | 13.40 | 12.57 | 18.10 | 12.48 | 12.48 |
| $R_2O$ (mol %) | 13.12 | 18.50 | 18.50 | 15.50 | 12.50 | 16.00 | 16.30 | 7.95 | 18.50 | 18.50 |
| $7Al_2O_3 + 3MgO$ (mol %) | 27.4 | 22.2 | 22.2 | 17.8 | 18.5 | 38.2 | 54.0 | 41.7 | 58.1 | 20.7 |
| $7Al_2O_3 + 3MgO - 4Li_2O$ (mol %) | 27.4 | 6.2 | 22.2 | 11.8 | 4.5 | 26.2 | 54.0 | 41.7 | 58.1 | 20.7 |
| $SiO_2 + Al_2O_3 + MgO + CaO + SrO + BaO + Li_2O + Na_2O + K_2O + Fe_2O_3 + TiO_2$ (mol %) | 100.0 | 100.0 | 100.0 | 100.0 | 100.0 | 99.5 | 98.1 | 100.0 | 100.0 | 100.0 |
| MgO + CaO (mol %) | 16.2 | 12.5 | 12.5 | 13.5 | 16.9 | 13.4 | 12.6 | 18.1 | 12.5 | 12.5 |
| $R_2O \times MgO$ (mol %)$^2$ | 92.9 | 9.3 | 9.3 | 23.3 | 62.5 | 54.4 | 179.3 | 64.4 | 230.9 | 0.0 |
| $Na_2O/R_2O$ | 0.96 | 0.59 | 0.81 | 0.52 | 0.44 | 0.38 | 0.51 | 0.76 | 0.81 | 0.81 |
| $K_2O/R_2O$ | 0.04 | 0.19 | 0.19 | 0.39 | 0.28 | 0.44 | 0.49 | 0.24 | 0.19 | 0.19 |
| $R_2O + B_2O_3$ (mol %) | 13.1 | 18.5 | 18.5 | 15.5 | 12.5 | 16.5 | 16.3 | 8.0 | 18.5 | 18.5 |
| $SiO_2 + Al_2O_3$ (mol %) | 70.6 | 69.0 | 69.0 | 68.9 | 70.5 | 70.0 | 69.1 | 73.9 | 69.0 | 69.0 |
| FeO (mol %) | — | — | — | — | — | — | — | — | — | — |
| Fe-Redox (%) | — | — | — | — | — | — | — | — | — | — |
| Exponential approximation formula of relation between frequency and radio transmittance (as calculated as 18 mm thickness) constant 1 | 0.8619 | 0.8422 | 0.8434 | 0.843 | 0.8567 | 0.8451 | 0.843 | 0.843 | 0.8452 | 0.8426 |
| Exponential approximation formula of relation between frequency and radio transmittance (as calculated as 18 mm thickness) constant 2 | −0.015 | −0.007 | −0.007 | −0.01 | −0.008 | −0.009 | −0.009 | −0.009 | −0.008 | −0.009 |
| Radio transmittance with 18 mm thickness at 100 GHz | 19% | 42% | 42% | 31% | 38% | 34% | 34% | 34% | 38% | 34% |
| d | 2.48 | 2.54 | 2.54 | 2.60 | 2.49 | 2.56 | 2.52 | 2.48 | 2.47 | 2.55 |
| α (×10$^{-7}$/° C.) | 93 | 108 | 109 | 103 | 88 | 97 | 95 | 73 | 105 | 109 |
| E (GPa) | 78 | 78 | 74 | 74 | 80 | 74 | 74 | 80 | 75 | 74 |
| $T_g$ (° C.) | 528 | 487 | 525 | 515 | 513 | 537 | 569 | 628 | 536 | 548 |

TABLE 1-continued

| Property | | | | | | | | | | |
|---|---|---|---|---|---|---|---|---|---|---|
| $T_2$ (°C) | 1450 | 1432 | 1466 | 1474 | 1460 | 1523 | 1551 | 1552 | 1499 | 1464 |
| $T_4$ (°C) | 1019 | 969 | 991 | 1045 | 1063 | 1074 | 1102 | 1176 | 991 | 991 |
| $T_L$ (°C) | — | — | — | — | — | — | — | — | — | — |
| $T_4 - T_L$ (°C) | — | — | — | — | — | — | — | — | — | — |
| Water resistance (mg) | 0.63 | 0.17 | 0.05 | 0.27 | 0.40 | 0.17 | 0.25 | 0.30 | 0.47 | 0.04 |
| Visible light transmittance $T_{VA}$ measured value (%) | ○ | ○ | ○ | ○ | ○ | ○ | ○ | ○ | ○ | ○ |
| Visible light transmittance $T_{VA}$ | — | — | — | — | — | — | — | — | — | — |
| Solar direct transmittance Te measured value (%) | ○ | ○ | ○ | ○ | ○ | ○ | ○ | ○ | ○ | ○ |
| Solar direct transmittance Te | — | — | — | — | — | — | — | — | — | — |
| Ultraviolet transmittance $T_{UV}$ measured value (%) | — | — | — | — | — | — | — | — | — | — |
| A × radio transmittance (area: 0.0009 m²) | 0.0173 | 0.0376 | 0.0377 | 0.0279 | 0.0346 | 0.0282 | 0.0306 | 0.0306 | 0.0342 | 0.0306 |
| Radio transmittance/t (thickness: 3.85 mm) | 5.0 | 10.9 | 10.9 | 8.1 | 10.0 | 8.1 | 8.8 | 8.8 | 9.9 | 8.8 |
| β-OH ($mm^{-1}$) | — | — | — | — | — | — | — | — | — | — |
| Transmittance at wavelength 905 nm (%) | — | — | — | — | — | — | — | — | — | — |
| Transmittance at wavelength 1550 nm (%) | — | — | — | — | — | — | — | — | — | — |
| Maximum radio transmitted amount at 75 to 90 GHz of laminated glass (dB) | −4.1 | — | — | −2.0 | −2.6 | — | — | — | — | — |
| Frequency at maximum radio transmitted amount of laminated glass (GHz) | 89.2 | — | — | 83.0 | 84.9 | — | — | — | — | — |

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Embodiment | 3 | 3 | 3 | 5 | 6 | 3 | 4 | 1 | 1 |
| $SiO_2$ (mol %) | 66.00 | 66.00 | 66.00 | 66.00 | 66.00 | 72.38 | 70.93 | 65.83 | 62.00 |
| $Al_2O_3$ (mol %) | 2.95 | 2.95 | 2.95 | 2.95 | 2.95 | 1.51 | 2.00 | 6.08 | 6.93 |
| $B_2O_3$ (mol %) | 0 | 0 | 0 | 0 | 0 | 0 | 0 | 0.0 | 0 |
| MgO (mol %) | 0 | 0 | 0.50 | 0.50 | 0.50 | 0.10 | 11.00 | 0.0 | 0.50 |
| CaO (mol %) | 0 | 0 | 11.98 | 11.98 | 11.98 | 11.57 | 2.00 | 10.86 | 12.00 |
| SrO (mol %) | 12.48 | 12.48 | 0 | 0 | 0 | 0 | 0 | 0 | 0 |
| BaO (mol %) | 0.05 | 0.05 | 0.05 | 0.05 | 0.05 | 0.05 | 0.05 | 0.05 | 0.05 |
| $TiO_2$ (mol %) | 0 | 0 | 0 | 0 | 0 | 0 | 0 | 0 | 0 |
| $ZrO_2$ (mol %) | 0 | 0 | 0 | 0 | 0 | 0 | 0 | 0 | 0 |
| $Li_2O$ (mol %) | 0 | 0 | 0 | 6.17 | 18.5 | 0 | 5 | 0 | 15.00 |
| $Na_2O$ (mol %) | 15.00 | 15.00 | 11.00 | 6.17 | 0.0 | 10.05 | 5.00 | 13.11 | 3.50 |
| $K_2O$ (mol %) | 3.50 | 3.50 | 7.50 | 6.17 | 0.0 | 4.32 | 4.00 | 4.05 | 0.02 |
| $Fe_2O_3$ (mol %) | 0.02 | 0.02 | 0.02 | 0.02 | 0.02 | 0.02 | 0.02 | 0.02 | 0.00 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 12.48 | 12.48 | 12.48 | 12.48 | 12.48 | 11.67 | 13.00 | 10.86 | 12.50 |
| $R_2O$ (mol %) | 18.50 | 18.50 | 18.50 | 18.51 | 18.50 | 14.37 | 14.00 | 17.16 | 18.50 |
| $7Al_2O_3 + 3MgO$ (mol %) | 20.7 | 20.7 | 22.2 | 22.2 | 22.2 | 10.9 | 47.0 | 42.6 | 50.0 |
| $7Al_2O_3 + 3MgO - 4Li_2O$ (mol %) | 20.7 | 20.7 | 22.2 | −2.5 | −51.9 | 10.9 | 27.0 | 42.6 | 50.0 |
| $SiO2 + Al_2O_3 + MgO + CaO + SrO + BaO + Li_2O + Na_2O + K_2O + Fe_2O_3 + TiO_2$ (mol %) | 100.0 | 100.0 | 100.0 | 100.0 | 100.0 | 100.0 | 100.0 | 100.0 | 100.0 |
| MgO + CaO (mol %) | 0.0 | 0.0 | 12.5 | 12.5 | 12.5 | 11.7 | 13.0 | 10.9 | 12.5 |
| $R_2O \times MgO$ $(mol \%)^2$ | 0.0 | 0.0 | 9.3 | 9.3 | 9.3 | 1.4 | 154.0 | 0.0 | 9.3 |
| $Na_2O/R_2O$ | 0.81 | 0.81 | 0.59 | 0.33 | 0.00 | 0.70 | 0.36 | 0.76 | 0.81 |
| $K_2O/R_2O$ | 0.19 | 0.19 | 0.41 | 0.33 | 0.00 | 0.30 | 0.29 | 0.24 | 0.19 |

TABLE 1-continued

| | Ex. 19 | Ex. 20 | Ex. 21 | Ex. 22 | Ex. 23 | Ex. 24 | Comp. Ex. 2 | Ex. 25 | Ex. 26 |
|---|---|---|---|---|---|---|---|---|---|
| $R_2O + B_2O_3$ (mol %) | 18.5 | 18.5 | 18.5 | 18.5 | 18.5 | 14.4 | 14.0 | 17.2 | 18.5 |
| $SiO_2 + Al_2O_3$ (mol %) | 69.0 | 69.0 | 69.0 | 69.0 | 69.0 | 73.9 | 72.9 | 71.9 | 68.9 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | 0.8426 | 0.8437 | 0.8425 | 0.8435 | 0.8468 | 0.8462 | 0.8625 | 0.8433 | 0.8428 |
| Exponential approximation formula of relation between frequency and radio transmittance (as calculated as 18 mm thickness) constant 2 | −0.009 | −0.009 | −0.008 | −0.006 | −0.008 | −0.007 | −0.008 | −0.01 | −0.012 |
| Radio transmittance with 18 mm thickness at 100 GHz | 34% | 34% | 38% | 46% | 38% | 42% | 39% | 31% | 25% |
| d | 2.74 | 2.93 | 2.54 | 2.52 | 2.49 | 2.49 | 2.47 | 2.52 | 2.55 |
| α (×10⁻⁷/° C.) | 116 | 120 | 112 | 103 | 83 | 95 | 80 | 101 | 113 |
| E (GPa) | 72 | 68 | 70 | 77 | 91 | 74 | 80 | 75 | 75 |
| $T_g$ (° C.) | 510 | 484 | 537 | 498 | 494 | 547 | 550 | 570 | 557 |
| $T_2$ (° C.) | 1464 | 1464 | 1514 | 1315 | 1267 | 1444 | 1548 | 1554 | 1489 |
| $T_4$ (° C.) | 913 | 991 | 1048 | 931 | 839 | 1031 | 1079 | 1091 | 1048 |
| $T_L$ (° C.) | — | — | — | 1020 | — | 1000 | — | — | — |
| $T_4 − T_L$ (° C.) | — | — | — | −89 | — | 31 | — | — | — |
| Water resistance (mg) | 0.04 | 0.04 | 0.17 | 0.24 | 0.20 | 0.29 | 0.32 | — | — |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0306 | 0.0306 | 0.0333 | 0.0414 | 0.0342 | 0.0378 | 0.0342 | 0.0279 | 0.0225 |
| Radio transmittance/t (thickness: 3.85 mm) | 8.8 | 8.8 | 9.6 | 11.9 | 9.9 | 10.9 | 9.9 | 8.1 | 6.5 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | −2.4 | — | — | — | — | — | — | — |
| Maximum radio transmitted amount | — | 79.7 | — | — | — | — | — | — | — |
| Frequency at maximum radio transmitted amount of laminated glass (GHz) | — | — | — | — | — | — | — | — | — |

| | Ex. 19 | Ex. 20 | Ex. 21 | Ex. 22 | Ex. 23 | Ex. 24 | Comp. Ex. 2 | Ex. 25 | Ex. 26 |
|---|---|---|---|---|---|---|---|---|---|
| Embodiment | 4 | 4 | 6 | 3 | 6 | 1 | | 1 | 1 |
| $SiO_2$ (mol %) | 68.96 | 69.96 | 66.00 | 66.00 | 66.00 | 62.00 | 68.28 | 61.96 | 61.96 |
| $Al_2O_3$ (mol %) | 8.99 | 7.50 | 2.96 | 2.96 | 2.96 | 6.96 | 0.92 | 5.00 | 5.00 |
| $B_2O_3$ (mol %) | 0 | 0 | 0.00 | 0.00 | 0.00 | 0.00 | 0.00 | 0.00 | 0.00 |
| MgO (mol %) | 6.00 | 7.00 | 0.50 | 0.50 | 0.50 | 0.50 | 6.36 | 2.50 | 3.50 |
| CaO (mol %) | 0 | 0.20 | 11.98 | 11.98 | 11.98 | 11.98 | 9.20 | 11.99 | 10.99 |
| SrO (mol %) | 0 | 0 | 0.00 | 0.00 | 0.00 | 0.00 | 0.00 | 0.00 | 0.00 |
| BaO (mol %) | 0.04 | 0.04 | 0.04 | 0.04 | 0.04 | 0.04 | 0.04 | 0.05 | 0.05 |
| $TiO_2$ (mol %) | 1.00 | 1.00 | 0.00 | 0.00 | 0.00 | 0.00 | 0.00 | 0.00 | 0.00 |
| $ZrO_2$ (mol %) | 9.49 | 8.00 | 9.25 | 9.25 | 9.25 | 9.25 | 12.61 | 9.24 | 9.24 |
| $Li_2O$ (mol %) | 4.50 | 5.30 | 0.00 | 0.00 | 0.00 | 0.00 | 0.39 | 0.00 | 0.00 |
| $Na_2O$ (mol %) | 1.00 | 1.00 | 9.25 | 9.25 | 9.25 | 9.25 | | 9.24 | 9.24 |
| $K_2O$ (mol %) | | | 0.00 | | | | | | |

TABLE 1-continued

| | | | | | | | | |
|---|---|---|---|---|---|---|---|---|
| Fe₂O₃ (mol %) | 0.02 | 0.02 | 0.02 | 0.02 | 0.02 | 2.20 | 0.02 | 0.02 |
| CeO₂ (mol %) | 0.00 | 0.00 | 0.00 | 0.00 | 0.00 | 0.00 | 0.00 | 0.00 |
| Cr₂O₃ (mol %) | 0.00 | 0.00 | 0.00 | 0.00 | 0.00 | 0.00 | 0.00 | 0.00 |
| SnO₂ (mol %) | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 |
| RO (mol %) | 6.00 | 7.20 | 12.48 | 12.48 | 12.48 | 15.56 | 14.49 | 14.49 |
| R₂O (mol %) | 14.99 | 14.30 | 18.50 | 18.50 | 18.50 | 13.00 | 18.48 | 18.48 |
| 7Al₂O₃ + 3MgO (mol %) | 80.9 | 73.5 | 22.2 | 22.2 | 50.2 | 25.5 | 42.5 | 45.5 |
| 7Al₂O₃ + 3MgO − 4Li₂O (mol %) | 43.0 | 41.5 | −14.8 | 22.2 | 50.2 | 25.5 | 42.5 | 45.5 |
| SiO₂ + Al₂O₃ + MgO + CaO + SrO + BaO + Li₂O + Na₂O + K₂O + Fe₂O₃ + TiO₂ (mol %) | 99.0 | 99.0 | 100.0 | 100.0 | 100.0 | 100.0 | 100.0 | 100.0 |
| MgO + CaO (mol %) | 6.0 | 7.2 | 12.5 | 12.5 | 12.5 | 15.6 | 14.5 | 14.5 |
| R₂O × MgO (mol %)² | 89.9 | 100.1 | 9.3 | 9.3 | 9.3 | 82.7 | 46.2 | 64.7 |
| Na₂O/R₂O | 0.30 | 0.37 | 0.50 | 0.00 | 0.50 | 0.97 | 0.50 | 0.50 |
| K₂O/R₂O | 0.07 | 0.07 | 0.00 | 0.50 | 0.50 | 0.03 | 0.50 | 0.50 |
| R₂O + B₂O₃ (mol %) | 15.0 | 14.3 | 18.5 | 18.5 | 18.5 | 13.0 | 18.5 | 18.5 |
| SiO₂ + Al₂O₃ (mol %) | 78.0 | 77.5 | 69.0 | 69.0 | 69.0 | 69.2 | 67.0 | 67.0 |
| FeO (mol %) | — | — | — | — | — | 0.660 | — | — |
| Fe-Redox (%) | — | — | — | — | — | 30 | — | — |
| Exponential approximation formula of relation between frequency and radio transmittance (as calculated as 18 mm thickness) constant 1 | 0.8599 | 0.8807 | — | — | — | — | — | — |
| Exponential approximation formula of relation between frequency and radio transmittance (as calculated as 18 mm thickness) constant 2 | −0.011 | −0.010 | — | — | — | — | — | — |
| Radio transmittance with 18 mm thickness at 100 GHz | 29% | 32% | 35% | 39% | 32% | 36% | 19% | 38% | 37% |
| d | 2.44 | 2.44 | 2.52 | 2.52 | 2.49 | 2.54 | 2.52 | 2.53 | 2.53 |
| α (×10⁻⁷/° C.) | 70 | 72 | 96 | 113 | 100 | 111 | 93 | 112 | 111 |
| E (GPa) | 84 | 83 | 86 | 67 | 75 | 69 | 78 | 69 | 69 |
| $T_g$ (° C.) | 552 | 548 | 482 | 542 | 554 | 573 | 528 | 542 | 546 |
| $T_2$ (° C.) | 1664 | 1640 | 1344 | 1534 | 1456 | 1447 | 1450 | 1393 | 1407 |
| $T_4$ (° C.) | 1163 | 1159 | 889 | 1073 | 1022 | 1044 | 1019 | 1011 | 1018 |
| $T_L$ (° C.) | — | — | — | — | — | 1100 | — | 1040 | — |
| $T_4 - T_L$ (° C.) | — | — | — | — | — | −56 | — | −29 | — |
| Water resistance (mg) | — | — | 0.21 | 0.21 | 0.20 | 0.07 | 0.61 | 0.07 | 0.05 |
| Visible light transmittance $T_{VA}$ | — | ○ | ○ | ○ | ○ | ○ | X | ○ | ○ |
| Visible light transmittance $T_{av}$ measured value (%) | — | — | — | — | — | — | 27.4 | — | — |
| Solar direct transmittance Te | ○ | ○ | ○ | ○ | ○ | ○ | X | ○ | ○ |
| Solar direct transmittance Te measured value (%) | — | — | — | — | — | — | 11.6 | — | — |
| Ultraviolet transmittance $T_{uv}$ measured value (%) | — | — | — | — | — | — | 1.3 | — | — |
| A × radio transmittance (area: 0.0009 m²) | 0.0261 | 0.0288 | 0.0313 | 0.0354 | 0.0287 | 0.0321 | 0.0171 | 0.0340 | 0.0335 |
| Radio transmittance/t (thickness: 3.85 mm) | 7.5 | 8.3 | 9.0 | 10.2 | 8.3 | 9.3 | 4.9 | 9.8 | 9.7 |
| β-OH (mm⁻¹) | — | — | — | — | — | — | — | — | — |

TABLE 1-continued

| | Ex. 27 | Ex. 28 | Ex. 29 | Ex. 30 | Ex. 31 | Ex. 32 | Ex. 33 | Ex. 34 | Ex. 35 |
|---|---|---|---|---|---|---|---|---|---|
| Transmittance at wavelength 905 nm (%) | — | — | — | — | — | — | — | — | — |
| Transmittance at wavelength 1550 nm (%) | — | — | — | — | — | — | 0.001 | — | — |
| Maximum radio transmitted amount at 75 to 90 GHz of laminated glass (dB) | — | — | — | — | — | — | 0.04 | −2.6 | — |
| Frequency at maximum radio transmitted amount of laminated glass (GHz) | — | — | — | — | — | — | — | 78.4 | — |
| Embodiment | 1 | 1 | 1 | 1 | 1 | 1 | 1 | 1 | 1 |
| $SiO_2$ (mol %) | 61.96 | 62.75 | 68.75 | 62.00 | 61.94 | 62.00 | 60.50 | 61.90 | 61.90 |
| $Al_2O_3$ (mol %) | 5.00 | 4.50 | 4.50 | 6.96 | 5.00 | 6.96 | 6.96 | 6.99 | 6.99 |
| $B_2O_3$ (mol %) | 0.00 | 0.00 | 0.00 | 0.00 | 0.00 | 0.00 | 1.50 | 0.00 | 0.00 |
| MgO (mol %) | 3.50 | 3.70 | 3.70 | 0.50 | 8.50 | 0.50 | 0.50 | 0.50 | 0.50 |
| CaO (mol %) | 13.49 | 10.98 | 10.98 | 11.98 | 8.50 | 11.98 | 11.98 | 11.98 | 11.98 |
| SrO (mol %) | 0.00 | 0.00 | 0.00 | 1.50 | 0.00 | 1.50 | 1.50 | 0.00 | 0.00 |
| BaO (mol %) | 0.00 | 0.00 | 0.05 | 0.00 | 0.00 | 0.00 | 3.00 | 0.00 | 0.00 |
| $TiO_2$ (mol %) | 0.05 | 0.05 | 0.05 | 0.04 | 0.04 | 0.04 | 0.04 | 0.04 | 0.04 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 7.99 | 9.00 | 6.00 | 8.50 | 8.00 | 7.00 | 7.00 | 9.24 | 9.24 |
| $K_2O$ (mol %) | 7.99 | 9.00 | 6.00 | 8.50 | 8.00 | 7.00 | 7.00 | 9.23 | 9.23 |
| $Fe_2O_3$ (mol %) | 0.02 | 0.02 | 0.02 | 0.02 | 0.02 | 0.02 | 0.02 | 0.12 | 0.12 |
| $CeO_2$ (mol %) | 0.00 | 0.00 | 0.00 | 0.00 | 0.00 | 0.00 | 0.00 | 0.00 | 0.00 |
| $Cr2O3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 16.99 | 14.68 | 14.68 | 13.98 | 17.00 | 16.98 | 16.98 | 12.48 | 12.48 |
| $R_2O$ (mol %) | 15.98 | 18.00 | 12.00 | 17.00 | 16.00 | 14.00 | 14.00 | 18.47 | 18.47 |
| $7Al_2O_3 + 3MgO$ (mol %) | 45.5 | 42.6 | 42.6 | 50.2 | 60.5 | 50.2 | 50.2 | 50.4 | 50.4 |
| $7Al_2O_3 + 3MgO − 4Li_2O$ (mol %) | 45.5 | 42.6 | 42.6 | 50.2 | 60.5 | 50.2 | 50.2 | 50.4 | 50.4 |
| $SiO2 + Al_2O_3 + MgO + CaO + SrO + BaO + Li_2O + Na_2O + K_2O + Fe_2O_3 + TiO_2$ (mol %) | 100.0 | 100.0 | 100.0 | 100.0 | 100.0 | 100.0 | 98.5 | 100.0 | 100.0 |
| MgO + CaO (mol %) | 17.0 | 14.7 | 14.7 | 12.5 | 17.0 | 12.5 | 12.5 | 12.5 | 12.5 |
| $R_2O \times MgO$ (mol %)$^2$ | 55.9 | 66.6 | 44.4 | 8.5 | 136.0 | 7.0 | 7.0 | 9.2 | 9.2 |
| $Na_2O/R_2O$ | 0.50 | 0.50 | 0.50 | 0.50 | 0.50 | 0.50 | 0.50 | 0.50 | 0.50 |
| $K_2O/R_2O$ | 0.50 | 0.50 | 0.50 | 0.50 | 0.50 | 0.50 | 0.50 | 0.50 | 0.50 |
| $R_2O + B_2O_3$ (mol %) | 16.0 | 18.0 | 12.0 | 17.0 | 16.0 | 14.0 | 15.5 | 18.5 | 18.5 |
| $SiO_2 + Al_2O_3$ (mol %) | 67.0 | 67.3 | 73.3 | 69.0 | 66.9 | 69.0 | 67.5 | 68.9 | 68.9 |
| FeO (mol %) | — | — | — | — | — | — | — | 0.0382 | 0.0691 |
| Fe-Redox (%) | — | — | — | — | — | — | — | 31 | 56 |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 35% | 37% | 31% | 34% | 32% | 33% | 37% | 36% | 36% |
| d | 2.55 | 2.53 | 2.50 | 2.58 | 2.53 | 2.68 | 2.68 | 2.54 | 2.54 |
| $\alpha$ (×$10^{-7}$/° C.) | 105 | 110 | 88 | 106 | 101 | 101 | 99 | 111 | 111 |

TABLE 1-continued

|  | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|
| E (GPa) | 73 | 70 | 75 | 71 | 73 | 73 | 72 | 69 | 69 |
| $T_g$ (°C.) | 578 | 547 | 612 | 579 | 562 | 588 | 574 | 573 | 573 |
| $T_2$ (°C.) | 1403 | 1405 | 1529 | 1438 | 1441 | 1433 | 1405 | 1447 | 1447 |
| $T_4$ (°C.) | 1026 | 1015 | 1114 | 1051 | 1060 | 1054 | 1038 | 1044 | 1044 |
| $T_L$ (°C.) | — | — | — | — | 1060 | — | — | 1100 | 1100 |
| $T_4 - T_L$ (°C.) | — | — | — | — | 0 | — | — | −56 | −56 |
| Water resistance (ng) | 0.07 | 0.09 | 0.18 | 0.11 | 0.02 | 0.17 | 0.15 | 0.07 | 0.07 |
| Visible light transmittance $T_{VA}$ | ○ | ○ | ○ | ○ | ○ | ○ | — | ○ | ○ |
| Visible light transmittance $T_{VA}$ measured value (%) | — | — | — | — | — | — | — | 84.7 | 80.3 |
| Solar direct transmittance Te | ○ | — | ○ | ○ | ○ | ○ | ○ | ○ | ○ |
| Solar direct transmittance Te measured value (%) | — | — | — | — | — | — | — | 67.3 | 55.7 |
| Ultraviolet transmittance $T_{uv}$ measured value (%) | — | — | — | — | — | — | — | 41.5 | 45.8 |
| A × radio transmittance (area: 0.0009 m²) | 0.0311 | 0.0330 | 0.0275 | 0.0308 | 0.0292 | 0.0299 | 0.0333 | 0.0320 | 0.0320 |
| Radio transmittance/t (thickness: 3.85 mm) | 9.0 | 9.5 | 7.9 | 8.9 | 8.4 | 8.6 | 9.6 | 9.2 | 9.2 |
| β-OH (mm⁻¹) | — | — | — | — | — | — | — | 0.18 | 0.25 |
| Transmittance at wavelength 905 nm (%) | — | — | — | — | — | — | — | 49.4 | 29.2 |
| Transmittance at wavelength 1550 nm (%) | — | — | — | — | — | — | — | 60.5 | 41.5 |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

|  | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|
| Embodiment | 1 | 1 | 1 | 1 | 1 | 1 | 1 | 2 | 2 |
| SiO₂ (mol %) | 68.75 | 68.75 | 64.46 | 62.46 | 62.46 | 63.26 | 64.06 | 69.60 | 71.10 |
| Al₂O₃ (mol %) | 6.00 | 6.00 | 7.00 | 9.00 | 6.00 | 7.00 | 7.00 | 2.48 | 2.78 |
| B₂O₃ (mol %) | 0.00 | 0.00 | 0.00 | 0.00 | 0.00 | 0.00 | 0.00 | 1.80 | 0.00 |
| MgO (mol %) | 2.20 | 2.20 | 1.50 | 0.80 | 0.50 | 3.50 | 1.00 | 8.10 | 7.00 |
| CaO (mol %) | 10.98 | 10.98 | 6.98 | 6.68 | 6.98 | 2.00 | 10.48 | 10.00 | 11.10 |
| SrO (mol %) | 0.00 | 0.00 | 1.00 | 2.00 | 0.00 | 7.98 | 2.00 | 0.00 | 0.00 |
| BaO (mol %) | 0.00 | 0.00 | 7.00 | 5.00 | 9.00 | 6.40 | 6.40 | 0.00 | 0.00 |
| TiO₂ (mol %) | 0.05 | 0.05 | 0.04 | 0.04 | 0.04 | 0.04 | 0.04 | 0.05 | 0.05 |
| ZrO₂ (mol %) | 0.00 | 0.00 | 2.00 | 0.00 | 1.00 | 1.80 | 1.00 | 0.00 | 0.00 |
| Li₂O (mol %) | 0.00 | 0.00 | 0.00 | 0.00 | 0.00 | 0.00 | 0.00 | 0.00 | 0.00 |
| Na₂O (mol %) | 8.20 | 3.20 | 5.00 | 7.00 | 7.00 | 4.00 | 4.00 | 6.05 | 4.28 |
| K₂O (mol %) | 3.80 | 8.80 | 5.00 | 7.00 | 7.00 | 4.00 | 4.00 | 1.90 | 3.68 |
| Fe₂O₃ (mol %) | 0.02 | 0.02 | 0.02 | 0.02 | 0.02 | 0.02 | 0.02 | 0.02 | 0.02 |
| CeO₂ (mol %) | 0.00 | 0.00 | 0.00 | 0.00 | 0.00 | 0.00 | 0.00 | 0.00 | 0.00 |
| Cr₂O₃ (mol %) | 0.00 | 0.00 | 0.00 | 0.00 | 0.00 | 0.00 | 0.00 | 0.00 | 0.00 |
| SnO₂ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 13.18 | 13.18 | 16.48 | 14.48 | 16.48 | 19.88 | 19.88 | 18.10 | 18.10 |
| R₂O (mol %) | 12.00 | 12.00 | 10.00 | 14.00 | 14.00 | 8.00 | 8.00 | 7.95 | 7.96 |
| 7Al₂O₃ + 3MgO (mol %) | 48.6 | 48.6 | 53.5 | 65.4 | 43.5 | 59.5 | 52.0 | 41.7 | 40.5 |
| 7Al₂O₃ + 3MgO − 4Li₂O (mol %) | 48.6 | 48.6 | 53.5 | 65.4 | 43.5 | 59.5 | 52.0 | 41.7 | 40.5 |
| SiO2 + Al₂O₃ + MgO + CaO + SrO + BaO + Li₂O + Na₂O + K₂O + Fe₂O₃ + TiO₂ (mol %) | 100.0 | 100.0 | 98.0 | 100.0 | 99.0 | 98.2 | 99.0 | 98.2 | 100.0 |
| MgO + CaO (mol %) | 13.2 | 13.2 | 8.5 | 7.5 | 7.5 | 5.5 | 11.5 | 18.1 | 18.1 |
| R₂O × MgO (mol %)² | 26.4 | 26.4 | 15.0 | 11.2 | 7.0 | 28.0 | 8.0 | 64.4 | 55.7 |

TABLE 1-continued

| | Ex. 45 | Ex. 46 | Ex. 47 | Ex. 48 | Ex. 49 | Ex. 50 | Ex. 51 | Ex. 52 | Ex. 53 |
|---|---|---|---|---|---|---|---|---|---|
| $Na_2O/R_2O$ | 0.68 | 0.27 | 0.50 | 0.50 | 0.50 | 0.50 | 0.50 | 0.76 | 0.54 |
| $K_2O/R_2O$ | 0.32 | 0.73 | 0.50 | 0.50 | 0.50 | 0.50 | 0.50 | 0.24 | 0.46 |
| $R_2O + B_2O_3$ (mol %) | 12.0 | 12.0 | 10.0 | 14.0 | 14.0 | 8.0 | 8.0 | 9.8 | 8.0 |
| $SiO_2 + Al_2O_3$ (mol %) | 74.8 | 74.8 | 71.5 | 71.5 | 68.5 | 70.3 | 71.1 | 72.1 | 73.9 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 27% | 30% | 30% | 31% | 34% | 32% | 32% | 33% | 32% |
| d | 2.50 | 2.49 | 2.68 | 2.72 | 2.77 | 2.79 | 2.76 | 2.50 | 2.49 |
| $\alpha$ ($\times 10^{-7}/°C$) | 84 | 88 | 83 | 98 | 102 | 81 | 81 | 69 | 73 |
| E (GPa) | 76 | 71 | 77 | 72 | 72 | 79 | 79 | 78 | 79 |
| $T_g$ (°C) | 616 | 647 | 637 | 593 | 569 | 653 | 644 | 606 | 635 |
| $T_2$ (°C) | 1555 | 1567 | 1571 | 1501 | 1470 | 1553 | 1519 | 1514 | 1563 |
| $T_4$ (°C) | 1130 | 1164 | 1144 | 1109 | 1041 | 1157 | 1125 | 1096 | 1137 |
| $T_L$ (°C) | — | — | — | — | — | — | — | — | — |
| $T_4 - T_L$ (°C) | — | — | — | — | — | — | — | — | — |
| Water resistance (mg) | 0.14 | 0.22 | 0.19 | 0.13 | 0.18 | 0.04 | 0.25 | 0.28 | 0.21 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0243 | 0.0271 | 0.0269 | 0.0282 | 0.0306 | 0.0284 | 0.0291 | 0.0299 | 0.0286 |
| Radio transmittance/t (thickness: 3.85 mm) | 7.0 | 7.8 | 7.8 | 8.1 | 8.8 | 8.2 | 8.4 | 8.6 | 8.3 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 2 | 2 | 2 | 2 | 2 | 2 | 2 | 2 | 2 |
| $SiO_2$ (mol %) | 71.10 | 71.40 | 71.40 | 71.40 | 71.40 | 71.40 | 71.10 | 68.21 | 66.71 |
| $Al_2O_3$ (mol %) | 2.78 | 2.48 | 2.48 | 2.48 | 2.48 | 0.00 | 2.78 | 2.38 | 2.38 |
| $B_2O_3$ (mol %) | 0.00 | 0.00 | 0.00 | 0.00 | 0.00 | 0.00 | 0.00 | 0.00 | 1.50 |
| MgO (mol %) | 4.00 | 8.10 | 8.10 | 8.10 | 8.10 | 7.05 | 3.05 | 2.89 | 2.89 |
| CaO (mol %) | 14.10 | 3.50 | 3.50 | 3.70 | 3.70 | 10.00 | 14.00 | 13.30 | 13.30 |
| SrO (mol %) | 0.00 | 6.50 | 6.50 | 3.50 | 3.50 | 0.00 | 0.00 | 0.00 | 0.00 |
| BaO (mol %) | 0.00 | 0.00 | 0.00 | 2.80 | 2.80 | 0.00 | 0.00 | 0.00 | 0.00 |
| $TiO_2$ (mol %) | 0.05 | 0.05 | 0.05 | 0.05 | 0.05 | 0.05 | 0.05 | 0.05 | 0.05 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 4.28 | 6.05 | 4.28 | 6.05 | 4.28 | 4.50 | 4.50 | 9.50 | 9.50 |

TABLE 1-continued

| | | | | | | | | | |
|---|---|---|---|---|---|---|---|---|---|
| K₂O (mol %) | 3.68 | 1.90 | 3.68 | 1.90 | 3.68 | 4.50 | 4.50 | 3.65 | 3.65 |
| Fe₂O₃ (mol %) | 0.02 | 0.02 | 0.02 | 0.02 | 0.02 | 0.02 | 0.02 | 0.02 | 0.02 |
| CeO₂ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO₂ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 18.10 | 18.10 | 18.10 | 18.10 | 18.10 | 17.05 | 17.05 | 16.19 | 16.19 |
| R₂O (mol %) | 7.96 | 7.95 | 7.96 | 7.95 | 7.96 | 9.00 | 9.00 | 13.15 | 13.15 |
| 7Al₂O₃ + 3MgO (mol %) | 31.5 | 41.7 | 41.7 | 41.7 | 41.7 | 38.5 | 28.6 | 25.3 | 25.3 |
| 7Al₂O₃ + 3MgO − 4Li₂O (mol %) | 31.5 | 41.7 | 41.7 | 41.7 | 41.7 | 38.5 | 28.6 | 25.3 | 25.3 |
| SiO2 + Al₂O₃ + MgO + CaO + SrO + BaO + Li₂O + Na₂O + K₂O + Fe₂O₃ + TiO₂ (mol %) | 100.0 | 100.0 | 100.0 | 100.0 | 100.0 | 100.0 | 100.0 | 100.0 | 98.5 |
| MgO + CaO | 18.1 | 11.6 | 11.6 | 11.8 | 11.8 | 17.1 | 17.1 | 16.2 | 16.2 |
| R₂O × MgO (mol %)² | 31.8 | 64.4 | 64.5 | 64.4 | 64.5 | 63.5 | 27.5 | 38.0 | 38.0 |
| Na₂O/R₂O | 0.54 | 0.76 | 0.54 | 0.76 | 0.54 | 0.50 | 0.50 | 0.72 | 0.72 |
| K₂O/R₂O | 0.46 | 0.24 | 0.46 | 0.24 | 0.46 | 0.50 | 0.50 | 0.28 | 0.28 |
| R₂O + B₂O₃ (mol %) | 8.0 | 8.0 | 8.0 | 8.0 | 8.0 | 9.0 | 9.0 | 13.2 | 14.7 |
| SiO₂ + Al₂O₃ (mol %) | 73.9 | 73.9 | 73.9 | 73.9 | 73.9 | 73.9 | 73.9 | 70.6 | 69.1 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 31% | 32% | 35% | 32% | 35% | 32% | 31% | 30% | 33% |
| d | 2.50 | 2.62 | 2.61 | 2.66 | 2.65 | 2.48 | 2.50 | 2.53 | 2.54 |
| α (×10⁻⁷/° C.) | 75 | 73 | 75 | 74 | 76 | 77 | 79 | 94 | 94 |
| E (GPa) | 79 | 79 | 78 | 78 | 78 | 78 | 77 | 76 | 75 |
| T_g (° C.) | 640 | 611 | 616 | 595 | 602 | 623 | 632 | 573 | 560 |
| T₂ (° C.) | 1546 | 1543 | 1554 | 1549 | 1559 | 1558 | 1536 | 1435 | 1408 |
| T₄ (° C.) | 1134 | 1104 | 1112 | 1093 | 1101 | 1128 | 1126 | 1028 | 1004 |
| T_L (° C.) | — | — | — | — | — | — | — | — | — |
| T₄ − T_L (° C.) | — | — | — | — | — | — | — | — | — |
| Water resistance (mg) | 0.25 | 0.30 | 0.23 | 0.30 | 0.23 | 0.25 | 0.27 | 0.28 | 0.27 |
| Visible light transmittance T_V4 | ◯ | ◯ | ◯ | ◯ | ◯ | ◯ | ◯ | ◯ | ◯ |
| Visible light transmittance T_V4 measured value (%) | — | — | — | — | — | — | — | — | — |
| Solar direct transmittance Te | ◯ | ◯ | ◯ | ◯ | ◯ | ◯ | ◯ | ◯ | ◯ |
| Solar direct transmittance Te measured value (%) | — | — | — | — | — | — | — | — | — |
| Ultraviolet transmittance T_uv measured value (%) | — | — | — | — | — | — | — | — | — |
| A × radio transmittance (area: 0.0009 m²) | 0.0282 | 0.0286 | 0.0313 | 0.0291 | 0.0316 | 0.0286 | 0.0280 | 0.0270 | 0.0301 |
| Radio transmittance/t (thickness: 3.85 mm) | 8.1 | 8.3 | 9.0 | 8.4 | 9.1 | 8.3 | 8.1 | 7.8 | 8.7 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount | — | — | — | — | — | — | — | — | — |

TABLE 1-continued

| Embodiment of laminated glass (GHz) | Ex. 54 | Ex. 55 | Ex. 56 | Ex. 57 | Ex. 58 | Ex. 59 | Ex. 60 | Ex. 61 | Ex. 62 |
|---|---|---|---|---|---|---|---|---|---|
|  | 2 | 2 | 2 | 2 | 2 | 2 | 2 | 2 | 2 |
| SiO$_2$ (mol %) | 68.21 | 68.21 | 68.21 | 68.21 | 68.21 | 68.21 | 70.45 | 70.45 | 70.45 |
| Al$_2$O$_3$ (mol %) | 2.38 | 4.88 | 4.88 | 4.88 | 4.88 | 2.38 | 4.00 | 4.00 | 2.90 |
| B$_2$O$_3$ (mol %) | 0.00 | 0.00 | 0.00 | 0.00 | 0.00 | 0.00 | 0.00 | 0.00 | 0.00 |
| MgO (mol %) | 2.89 | 0.39 | 0.39 | 0.39 | 0.39 | 2.89 | 0.00 | 0.00 | 0.00 |
| CaO (mol %) | 13.30 | 13.30 | 10.30 | 10.80 | 15.45 | 13.30 | 17.49 | 15.49 | 15.49 |
| SrO (mol %) | 0.00 | 0.00 | 3.00 | 0.00 | 0.00 | 0.00 | 0.00 | 0.00 | 0.00 |
| BaO (mol %) | 0.00 | 0.00 | 0.00 | 2.50 | 0.00 | 0.00 | 0.00 | 0.00 | 0.00 |
| TiO$_2$ (mol %) | 0.05 | 0.05 | 0.05 | 0.05 | 0.05 | 0.05 | 0.05 | 0.05 | 0.05 |
| ZrO$_2$ (mol %) | 0.00 | 0.00 | 0.00 | 0.00 | 0.00 | 0.00 | 0.00 | 0.00 | 0.00 |
| Li$_2$O (mol %) | 0.00 | 0.00 | 0.00 | 0.00 | 0.00 | 0.00 | 0.00 | 0.00 | 0.00 |
| Na$_2$O (mol %) | 6.57 | 6.57 | 6.57 | 6.57 | 5.50 | 4.07 | 4.00 | 5.00 | 5.55 |
| K$_2$O (mol %) | 6.57 | 6.57 | 6.57 | 6.57 | 5.50 | 9.07 | 4.00 | 5.00 | 5.55 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 16.19 | 13.69 | 13.69 | 13.69 | 15.84 | 16.19 | 17.49 | 15.49 | 15.49 |
| R$_2$O (mol %) | 13.14 | 13.14 | 13.14 | 13.14 | 11.00 | 13.14 | 8.00 | 10.00 | 11.10 |
| 7Al$_2$O$_3$ + 3MgO (mol %) | 25.3 | 35.3 | 35.3 | 35.3 | 35.3 | 25.3 | 28.0 | 28.0 | 20.3 |
| 7Al$_2$O$_3$ + 3MgO − 4Li$_2$O (mol %) | 25.3 | 35.3 | 35.3 | 35.3 | 35.3 | 25.3 | 28.0 | 28.0 | 20.3 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 100.0 | 100.0 | 100.0 | 100.0 | 100.0 | 100.0 | 100.0 | 100.0 | 100.0 |
| MgO + CaO (mol %) | 16.2 | 13.7 | 10.7 | 11.2 | 15.8 | 16.2 | 17.5 | 15.5 | 15.5 |
| R$_2$O × MgO (mol %)$^2$ | 38.0 | 5.1 | 5.1 | 5.1 | 4.3 | 38.0 | 0.0 | 0.0 | 0.0 |
| Na$_2$O/R$_2$O | 0.50 | 0.50 | 0.50 | 0.50 | 0.50 | 0.31 | 0.50 | 0.50 | 0.50 |
| K$_2$O/R$_2$O | 0.50 | 0.50 | 0.50 | 0.50 | 0.50 | 0.69 | 0.50 | 0.50 | 0.50 |
| R$_2$O + B$_2$O$_3$ (mol %) | 13.1 | 13.1 | 13.1 | 13.1 | 11.0 | 13.1 | 8.0 | 10.0 | 11.1 |
| SiO$_2$ + Al$_2$O$_3$ (mol %) | 70.6 | 73.1 | 73.1 | 73.1 | 73.1 | 70.6 | 74.5 | 74.5 | 73.4 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 33% | 31% | 32% | 32% | 30% | 32% | 31% | 30% | 31% |
| d | 2.52 | 2.51 | 2.58 | 2.59 | 2.53 | 2.52 | 2.52 | 2.51 | 2.52 |
| α (×10$^{-7}$/° C.) | 96 | 93 | 94 | 94 | 87 | 96 | 77 | 83 | 88 |
| E (GPa) | 74 | 73 | 73 | 72 | 76 | 71 | 78 | 76 | 75 |
| T$_g$ (° C.) | 583 | 607 | 595 | 582 | 634 | 600 | 650 | 636 | 615 |
| T$_2$ (° C.) | 1441 | 1497 | 1492 | 1497 | 1503 | 1445 | 1547 | 1526 | 1488 |
| T$_4$ (° C.) | 1045 | 1093 | 1086 | 1077 | 1108 | 1061 | 1147 | 1126 | 1091 |
| T$_L$ (° C.) | — | — | — | — | — | — | — | — | — |

TABLE 1-continued

| | Ex. 63 | Ex. 64 | Ex. 65 | Ex. 66 | Ex. 67 | Ex. 68 | Ex. 69 | Ex. 70 | Ex. 71 |
|---|---|---|---|---|---|---|---|---|---|
| $T_4 - T_L$ (° C.) | — | — | — | — | — | — | — | — | — |
| Water resistance (mg) | 0.27 | 0.26 | 0.26 | 0.26 | 0.28 | 0.24 | 0.32 | 0.31 | 0.29 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0294 | 0.0279 | 0.0286 | 0.0289 | 0.0274 | 0.0284 | 0.0276 | 0.0273 | 0.0279 |
| Radio transmittance/t (thickness: 3.85 mm) | 8.5 | 8.0 | 8.2 | 8.4 | 7.9 | 8.2 | 8.0 | 7.9 | 8.0 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| at 75 to 90 GHz of laminated glass (dB) | — | — | — | — | — | — | — | — | — |
| Frequency at maximum radio transmitted amount of laminated glass (GHz) | — | — | — | — | — | — | — | — | — |

| | Ex. 63 | Ex. 64 | Ex. 65 | Ex. 66 | Ex. 67 | Ex. 68 | Ex. 69 | Ex. 70 | Ex. 71 |
|---|---|---|---|---|---|---|---|---|---|
| Embodiment | 2 | 2 | 2 | 2 | 2 | 2 | 2 | 2 | 2 |
| $SiO_2$ (mol %) | 70.45 | 70.45 | 70.45 | 70.45 | 70.45 | 70.45 | 70.43 | 70.43 | 70.45 |
| $Al_2O_3$ (mol %) | 4.00 | 4.00 | 4.00 | 4.00 | 4.00 | 4.00 | 5.60 | 5.00 | 4.00 |
| $B_2O_3$ (mol %) | 0.00 | 0.00 | 0.00 | 0.00 | 0.00 | 0.00 | 0.00 | 0.00 | 0.00 |
| MgO (mol %) | 0.00 | 0.00 | 0.00 | 0.00 | 0.00 | 0.00 | 0.00 | 1.50 | 0.00 |
| CaO (mol %) | 17.49 | 17.49 | 10.99 | 10.99 | 14.49 | 15.89 | 8.90 | 7.00 | 17.49 |
| SrO (mol %) | 0.00 | 0.00 | 6.50 | 0.00 | 0.00 | 0.00 | 0.00 | 0.00 | 0.00 |
| BaO (mol %) | 0.00 | 0.00 | 0.00 | 6.50 | 3.00 | 0.00 | 0.00 | 0.00 | 0.00 |
| $TiO_2$ (mol %) | 0.05 | 0.05 | 0.05 | 0.05 | 0.05 | 0.05 | 0.05 | 0.05 | 0.05 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 4.20 | 5.00 | 4.00 | 4.00 | 4.00 | 4.80 | 7.50 | 8.00 | 5.89 |
| $K_2O$ (mol %) | 3.80 | 3.00 | 4.00 | 4.00 | 4.00 | 4.80 | 7.50 | 8.00 | 2.10 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 17.49 | 17.49 | 17.49 | 17.49 | 17.49 | 15.89 | 8.90 | 8.50 | 17.49 |
| $R_2O$ (mol %) | 8.00 | 8.00 | 8.00 | 8.00 | 8.00 | 9.60 | 15.00 | 16.00 | 7.99 |
| $7Al_2O_3 + 3MgO$ (mol %) | 28.0 | 28.0 | 28.0 | 28.0 | 28.0 | 28.0 | 39.2 | 39.5 | 28.0 |
| $7Al_2O_3 + 3MgO - 4Li_2O$ (mol %) | 28.0 | 28.0 | 28.0 | 28.0 | 28.0 | 28.0 | 39.2 | 39.5 | 28.0 |
| $SiO2 + Al_2O_3 + MgO + CaO + SrO + BaO + Li_2O +$ | 100.0 | 100.0 | 100.0 | 100.0 | 100.0 | 100.0 | 100.0 | 100.0 | 100.0 |
| $Na_2O + K_2O + Fe_2O_3 + TiO_2$ (mol %) | | | | | | | | | |
| MgO + CaO (mol %) | 17.5 | 17.5 | 11.0 | 11.0 | 14.5 | 15.9 | 8.9 | 8.5 | 17.5 |
| $R_2O \times MgO$ (mol %)² | 0.0 | 0.0 | 0.0 | 0.0 | 0.0 | 0.0 | 0.0 | 24.0 | 0.0 |
| $Na_2O/R_2O$ | 0.53 | 0.63 | 0.50 | 0.50 | 0.50 | 0.50 | 0.50 | 0.50 | 0.74 |
| $K_2O/R_2O$ | 0.48 | 0.38 | 0.50 | 0.50 | 0.50 | 0.50 | 0.50 | 0.50 | 0.26 |
| $R_2O + B_2O_3$ (mol %) | 8.0 | 8.0 | 8.0 | 8.0 | 8.0 | 9.6 | 15.0 | 16.0 | 8.0 |
| $SiO_2 + Al_2O_3$ (mol %) | 74.5 | 74.5 | 74.5 | 74.5 | 74.5 | 74.5 | 76.0 | 75.4 | 74.5 |
| FeO (mol %) | — | — | — | — | — | — | — | — | — |

TABLE 1-continued

| | Ex. 72 | Ex. 73 | Ex. 74 | Ex. 75 | Ex. 76 | Ex. 77 | Ex. 78 | Ex. 79 | Ex. 80 |
|---|---|---|---|---|---|---|---|---|---|
| Fe-Redox (%) | 31% | 30% | 33% | 34% | 32% | 30% | 31% | 32% | 29% |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | — | — | — | — | — | — | — | — | — |
| d | 2.52 | 2.52 | 2.65 | 2.73 | 2.62 | 2.51 | 2.48 | 2.47 | 2.53 |
| α (×$10^{-7}$/°C) | 76 | 75 | 79 | 81 | 79 | 81 | 94 | 98 | 74 |
| E (GPa) | 78 | 79 | 77 | 75 | 77 | 77 | 70 | 69 | 79 |
| $T_g$ (°C) | 661 | 657 | 634 | 608 | 630 | 642 | 587 | 569 | 653 |
| $T_2$ (°C) | 1534 | 1530 | 1523 | 1535 | 1535 | 1528 | 1552 | 1545 | 1526 |
| $T_4$ (°C) | 1142 | 1135 | 1124 | 1097 | 1122 | 1130 | 1121 | 1107 | 1128 |
| $T_L$ (°C) | — | — | — | — | — | — | — | — | — |
| $T_4 - T_L$ (°C) | — | — | — | — | — | — | — | — | — |
| Water resistance (mg) | 0.32 | 0.31 | 0.32 | 0.32 | 0.32 | 0.32 | 0.27 | 0.22 | 0.30 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0275 | 0.0269 | 0.0297 | 0.0305 | 0.0289 | 0.0273 | 0.0278 | 0.0288 | 0.0255 |
| Radio transmittance/t (thickness: 3.85 mm) | 7.9 | 7.8 | 8.6 | 8.8 | 8.3 | 7.9 | 8.0 | 8.3 | 7.4 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 2 | 3 | 3 | 3 | 3 | 3 | 3 | 3 | 3 |
| $SiO_2$ (mol %) | 70.45 | 72.38 | 72.38 | 72.38 | 72.27 | 72.27 | 72.38 | 71.90 | 71.90 |
| $Al_2O_3$ (mol %) | 4.00 | 1.51 | 1.51 | 1.51 | 1.51 | 1.51 | 1.51 | 1.70 | 1.70 |
| $B_2O_3$ (mol %) | 0.00 | 0.00 | 0.00 | 0.00 | 0.00 | 0.00 | 0.00 | 0.00 | 0.00 |
| MgO (mol %) | 0.00 | 0.10 | 0.10 | 0.10 | 0.10 | 0.10 | 0.10 | 0.10 | 0.10 |
| CaO (mol %) | 15.99 | 11.56 | 11.56 | 11.56 | 11.54 | 11.54 | 11.56 | 11.52 | 11.52 |
| SrO (mol %) | 0.00 | 0.00 | 0.00 | 0.00 | 0.00 | 0.00 | 0.00 | 0.00 | 0.00 |
| BaO (mol %) | 0.00 | 0.00 | 0.00 | 0.00 | 0.00 | 0.00 | 0.00 | 0.00 | 0.00 |
| $TiO_2$ (mol %) | 0.05 | 0.05 | 0.05 | 0.05 | 0.04 | 0.04 | 0.04 | 0.04 | 0.04 |
| $ZrO_2$ (mol %) | 1.50 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 5.89 | 10.56 | 8.04 | 7.19 | 7.18 | 7.18 | 7.19 | 7.16 | 7.16 |
| $K_2O$ (mol %) | 2.10 | 3.81 | 6.33 | 7.19 | 7.18 | 7.18 | 7.19 | 7.16 | 7.16 |
| $Fe_2O_3$ (mol %) | 0.02 | 0.02 | 0.02 | 0.02 | 0.19 | 0.19 | 0.04 | 0.11 | 0.11 |
| $CeO_2$ (mol %) | 0.00 | 0.00 | 0.00 | 0.00 | 0.00 | 0.00 | 0.00 | 0.22 | 0.22 |
| $Cr2O3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.09 | 0.09 |

TABLE 1-continued

| | | | | | | | | | |
|---|---|---|---|---|---|---|---|---|---|
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 15.99 | 11.66 | 11.66 | 11.66 | 11.64 | 11.64 | 11.66 | 11.62 | 11.62 |
| $R_2O$ (mol %) | 7.99 | 14.37 | 14.37 | 14.38 | 14.36 | 14.36 | 14.38 | 14.32 | 14.32 |
| $7Al_2O_3 + 3MgO$ (mol %) | 28.0 | 10.9 | 10.9 | 10.9 | 10.9 | 10.9 | 10.9 | 12.2 | 12.2 |
| $7Al_2O_3 + 3MgO - 4Li_2O$ (mol %) | 28.0 | 10.9 | 10.9 | 10.9 | 10.9 | 10.9 | 10.9 | 12.2 | 12.2 |
| $SiO_2 + Al_2O_3 + MgO + CaO + SrO + BaO + Li_2O + Na_2O + K_2O + Fe_2O_3 + TiO_2$ (mol %) | 98.5 | 100.0 | 100.0 | 100.0 | 100.0 | 100.0 | 100.0 | 99.7 | 99.7 |
| $MgO + CaO$ (mol %) | 16.0 | 11.7 | 11.7 | 11.7 | 11.6 | 11.6 | 11.7 | 11.6 | 11.6 |
| $R_2O \times MgO$ (mol %)² | 0.0 | 1.4 | 1.4 | 1.4 | 1.4 | 1.4 | 1.4 | 1.4 | 1.4 |
| $Na_2O/R_2O$ | 0.74 | 0.73 | 0.56 | 0.50 | 0.50 | 0.50 | 0.50 | 0.50 | 0.50 |
| $K_2O/R_2O$ | 0.26 | 0.27 | 0.44 | 0.50 | 0.50 | 0.50 | 0.50 | 0.50 | 0.50 |
| $R_2O + B_2O_3$ (mol %) | 8.0 | 14.4 | 14.4 | 14.4 | 14.4 | 14.4 | 14.4 | 14.3 | 14.3 |
| $SiO_2 + Al_2O_3$ (mol %) | 74.5 | 73.9 | 73.9 | 73.9 | 73.8 | 73.8 | 73.9 | 73.6 | 73.6 |
| FeO (mol %) | — | — | — | 0.0042 | 0.0512 | 0.0872 | 0.0123 | 0.0761 | 0.0607 |
| Fe-Redox (%) | — | — | — | 21 | 27 | 46 | 31 | 69 | 55 |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 27% | 30% | 33% | 33% | 33% | 33% | 33% | 33% | 33% |
| d | 2.56 | 2.49 | 2.49 | 2.49 | 2.49 | 2.49 | 2.49 | 2.49 | 2.49 |
| $\alpha$ (×10⁻⁷/°C) | 70 | 96 | 95 | 97 | 97 | 97 | 97 | 98 | 98 |
| E (GPa) | 80 | 73 | 71 | 70 | 71 | 71 | 70 | 71 | 71 |
| $T_g$ (°C) | 669 | 545 | 556 | 560 | 560 | 560 | 560 | 561 | 561 |
| $T_2$ (°C) | 1536 | 1448 | 1466 | 1464 | 1464 | 1464 | 1464 | 1469 | 1469 |
| $T_4$ (°C) | 1147 | 1037 | 1052 | 1050 | 1050 | 1050 | 1050 | 1055 | 1055 |
| $T_L$ (°C) | — | — | — | 990 | 990 | 990 | 990 | — | — |
| $T_4 - T_L$ (°C) | — | — | — | 60 | 60 | 60 | 60 | — | — |
| Water resistance (mg) | 0.30 | 0.28 | 0.30 | 0.30 | 0.30 | 0.30 | 0.30 | 0.30 | 0.30 |
| Visible light transmittance $T_{VA}$ | ○ | ○ | ○ | ○ | ○ | ○ | ○ | ○ | ○ |
| Visible light transmittance $T_{av}$ measured value (%) | — | — | — | 91.6 | 83.7 | 79.6 | 89.8 | 81.3 | 82.8 |
| Solar direct transmittance $T_e$ | ○ | ○ | ○ | ○ | ○ | ○ | ○ | ○ | ○ |
| Solar direct transmittance $T_e$ measured value (%) | — | — | — | 91.4 | 62.7 | 52.1 | 82.6 | 55.4 | 59.7 |
| Ultraviolet transmittance $T_{uv}$ measured value (%) | — | — | — | 85.2 | 41.5 | 44.7 | 69.4 | 32.5 | 31.8 |
| A × radio transmittance (area: 0.0009 m²) | 0.0239 | 0.0272 | 0.0298 | 0.0301 | 0.0301 | 0.0301 | 0.0301 | 0.0299 | 0.0299 |
| Radio transmittance/t (thickness: 3.85 mm) | 6.9 | 7.9 | 8.6 | 8.7 | 8.7 | 8.7 | 8.7 | 8.6 | 8.6 |
| β-OH (mm⁻¹) | — | — | — | 0.17 | 0.19 | 0.15 | 0.3 | 0.27 | 0.18 |
| Transmittance at wavelength 905 nm (%) | — | — | — | 91.8 | 42.1 | 24.1 | 76.0 | 27.7 | 35.0 |
| Transmittance at wavelength 1550 nm (%) | — | — | — | 92.0 | 49.3 | 31.0 | 78.8 | 40.4 | 48.0 |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | Ex. 81 | Ex. 82 | Ex. 83 | Ex. 84 | Ex. 85 | Ex. 86 | Ex. 87 | Ex. 88 | Ex. 89 |
|---|---|---|---|---|---|---|---|---|---|
| Embodiment | 3 | 3 | 3 | 3 | 3 | 3 | 3 | 3 | 3 |
| $SiO_2$ (mol %) | 72.33 | 72.33 | 72.24 | 71.35 | 71.75 | 71.75 | 72.25 | 69.58 | 70.88 |
| $Al_2O_3$ (mol %) | 1.51 | 1.51 | 1.51 | 2.20 | 2.00 | 2.20 | 2.50 | 2.51 | 3.01 |
| $B_2O_3$ (mol %) | 0.00 | 0.00 | 0.00 | 0.00 | 0 | 0.80 | 0 | 1.80 | 0.00 |
| MgO (mol %) | 0.10 | 0.10 | 0.10 | 0.00 | 0.50 | 0 | 0.30 | 0.10 | 0.10 |
| CaO (mol %) | 11.55 | 11.55 | 11.54 | 10.00 | 11.85 | 10.80 | 8.90 | 11.56 | 9.56 |
| SrO (mol %) | 0.00 | 0.00 | 0.00 | 0.00 | 0 | 0 | 0 | 0.00 | 0.00 |
| BaO (mol %) | 0.00 | 0.00 | 0.00 | 0.00 | 0 | 0 | 0 | 0.00 | 0.00 |
| $TiO_2$ (mol %) | 0.04 | 0.04 | 0.04 | 0.05 | 0.05 | 0.05 | 0.05 | 0.05 | 0.05 |
| $ZrO_2$ (mol %) | 0.00 | 0.00 | 0.00 | 0.00 | 0 | 0 | 0 | 0.00 | 0.00 |
| $Li_2O$ (mol %) | 0.00 | 0.00 | 0.00 | 0.00 | 0 | 0 | 0 | 0.00 | 0.00 |
| $Na_2O$ (mol %) | 7.18 | 7.18 | 7.17 | 7.19 | 6.80 | 7.00 | 7.70 | 6.69 | 8.19 |
| $K_2O$ (mol %) | 7.18 | 7.18 | 7.17 | 7.19 | 6.80 | 7.00 | 7.70 | 6.69 | 8.19 |
| $Fe_2O_3$ (mol %) | 0.11 | 0.11 | 0.04 | 0.02 | 0.25 | 0.40 | 0.60 | 0.02 | 0.02 |
| $CeO_2$ (mol %) | 0.00 | 0.00 | 0.18 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 1.00 | 0.00 |
| $R_2O$ (mol %) | 11.65 | 11.65 | 11.64 | 12.00 | 12.35 | 11.60 | 9.20 | 11.66 | 9.66 |
| $7Al_2O_3 + 3MgO$ (mol %) | 14.36 | 14.36 | 14.34 | 14.38 | 13.60 | 14.00 | 15.40 | 13.38 | 16.38 |
| $7Al_2O_3 + 3MgO - 4Li_2O$ (mol %) | 10.9 | 10.9 | 10.9 | 21.4 | 15.5 | 17.8 | 18.4 | 17.9 | 21.4 |
| $SiO2 + Al_2O_3 + MgO + CaO + SrO + BaO + Li_2O +$ | 10.9 | 10.9 | 10.9 | 21.4 | 15.5 | 17.8 | 18.4 | 17.9 | 21.4 |
| $Na_2O + K_2O + Fe_2O_3 + TiO_2$ (mol %) | 100.0 | 100.0 | 99.8 | 100.0 | 100.0 | 100.0 | 100.0 | 97.2 | 100.0 |
| MgO + CaO (mol %) | 11.7 | 11.7 | 11.6 | 12.0 | 12.4 | 11.6 | 9.2 | 11.7 | 9.7 |
| $R_2O \times MgO$ (mol %)$^2$ | 1.4 | 1.4 | 1.4 | 28.8 | 6.8 | 11.2 | 4.6 | 1.3 | 1.6 |
| $Na_2O/R_2O$ | 0.50 | 0.50 | 0.50 | 0.50 | 0.50 | 0.50 | 0.50 | 0.50 | 0.50 |
| $K_2O/R_2O$ | 0.50 | 0.50 | 0.50 | 0.50 | 0.50 | 0.50 | 0.50 | 0.50 | 0.50 |
| $R_2O + B_2O_3$ (mol %) | 14.4 | 14.4 | 14.3 | 14.4 | 13.6 | 14.0 | 15.4 | 15.2 | 16.4 |
| $SiO_2 + Al_2O_3$ (mol %) | 73.8 | 73.8 | 73.8 | 73.6 | 73.8 | 74.0 | 74.8 | 72.1 | 73.9 |
| FeO (mol %) | 0.0620 | 0.0476 | 0.0008 | — | 0.0963 | 0.0900 | 0.1500 | — | — |
| Fe-Redox (%) | 56 | 43 | 2 | — | 38.5 | 22.5 | 25 | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 33% | 33% | 33% | 33% | 33% | 33% | 34% | 36% | 34% |
| d | 2.49 | 2.49 | 2.49 | 2.48 | 2.49 | 2.49 | 2.47 | 2.51 | 2.48 |
| $\alpha$ (×$10^{-7}$/° C.) | 97 | 97 | 97 | 97 | 95 | 96 | 100 | 93 | 103 |
| E (GPa) | 71 | 71 | 71 | 71 | 72 | 72 | 70 | 69 | 71 |
| $T_g$ (° C.) | 560 | 560 | 560 | 563 | 572 | 568 | 553 | 562 | 547 |
| $T_2$ (° C.) | 1464 | 1464 | 1464 | 1490 | 1483 | 1490 | 1498 | 1449 | 1480 |
| $T_4$ (° C.) | 1050 | 1050 | 1050 | 1068 | 1068 | 1070 | 1067 | 1039 | 1056 |
| $T_L$ (° C.) | — | — | — | — | — | — | — | — | — |
| $T_4 - T_L$ (° C.) | — | — | — | — | — | — | — | — | — |
| Water resistance (mg) | 0.30 | 0.30 | 0.30 | 0.31 | 0.30 | 0.30 | 0.30 | 0.27 | 0.29 |

TABLE 1-continued

| | Ex. 90 | Ex. 91 | Ex. 92 | Ex. 93 | Ex. 94 | Ex. 95 | Ex. 96 | Ex. 97 | Ex. 98 |
|---|---|---|---|---|---|---|---|---|---|
| Visible light transmittance $T_{VA}$ | ○ | ○ | ○ | ○ | ○ | ○ | ○ | ○ | ○ |
| Visible light transmittance $T_{VA}$ measured value (%) | 82.8 | 84.6 | 91.2 | — | 77.5 | 76.5 | 68.6 | — | — |
| Solar direct transmittance Te | ○ | ○ | ○ | ○ | ○ | ○ | ○ | ○ | ○ |
| Solar direct transmittance Te measured value (%) | 59.8 | 64.8 | 88.9 | — | 49.5 | 49.1 | 37.4 | — | — |
| Ultraviolet transmittance $T_{uv}$ measured value (%) | 58.8 | 55.2 | 32.7 | — | 38.5 | 25.5 | 18.0 | — | — |
| A × radio transmittance (area: 0.0009 m²) | 0.0301 | 0.0301 | 0.0301 | 0.0297 | 0.0293 | 0.0294 | 0.0302 | 0.0328 | 0.0310 |
| Radio transmittance/t (thickness: 3.85 mm) | 8.7 | 8.7 | 8.7 | 8.6 | 8.4 | 8.5 | 8.7 | 9.5 | 8.9 |
| β-OH (mm⁻¹) | 0.25 | 0.35 | 0.12 | — | — | — | — | — | — |
| Transmittance at wavelength 905 nm (%) | 33.5 | 42.0 | 90.9 | — | 19.8 | 22.3 | 8.7 | — | — |
| Transmittance at wavelength 1550 nm (%) | 46.4 | 54.4 | 91.4 | — | 32.8 | 35.3 | 18.6 | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

| | Ex. 90 | Ex. 91 | Ex. 92 | Ex. 93 | Ex. 94 | Ex. 95 | Ex. 96 | Ex. 97 | Ex. 98 |
|---|---|---|---|---|---|---|---|---|---|
| Embodiment | 3 | 3 | 3 | 3 | 3 | 3 | 3 | 3 | 3 |
| $SiO_2$ (mol %) | 70.50 | 70.88 | 70.68 | 72.38 | 72.38 | 72.38 | 71.58 | 72.38 | 72.38 |
| $Al_2O_3$ (mol %) | 1.83 | 3.01 | 3.31 | 1.51 | 2.01 | 2.01 | 1.31 | 1.51 | 1.31 |
| $B_2O_3$ (mol %) | 0.00 | 0.00 | 0.00 | 0.00 | 0.00 | 0.00 | 0.00 | 0.00 | 1.00 |
| MgO (mol %) | 0.10 | 0.10 | 0.00 | 2.60 | 2.60 | 0.10 | 0.10 | 0.10 | 3.00 |
| CaO (mol %) | 10.00 | 9.56 | 2.56 | 9.06 | 12.56 | 15.06 | 16.56 | 17.56 | 10.86 |
| SrO (mol %) | 0.00 | 2.00 | 1.00 | 0.00 | 0.00 | 0.00 | 0.00 | 0.00 | 0.00 |
| BaO (mol %) | 0.00 | 0.00 | 8.00 | 0.00 | 0.00 | 0.00 | 0.00 | 0.00 | 0.00 |
| $TiO_2$ (mol %) | 0.05 | 0.05 | 0.05 | 0.05 | 0.05 | 0.05 | 0.00 | 0.05 | 0.05 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 8.75 | 7.19 | 7.19 | 7.19 | 5.19 | 5.19 | 5.19 | 4.19 | 4.19 |
| $K_2O$ (mol %) | 8.75 | 7.19 | 7.19 | 7.19 | 5.19 | 5.19 | 5.19 | 4.19 | 4.19 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 3.00 |
| RO (mol %) | 10.10 | 11.66 | 11.56 | 11.66 | 15.16 | 15.16 | 16.66 | 17.66 | 13.86 |
| $R_2O$ (mol %) | 17.50 | 14.38 | 14.38 | 14.38 | 10.38 | 10.38 | 10.38 | 8.38 | 8.38 |
| $7Al_2O_3 + 3MgO$ (mol %) | 13.1 | 21.4 | 23.2 | 18.4 | 21.9 | 14.4 | 9.5 | 10.9 | 18.2 |
| $7Al_2O_3 + 3MgO - 4Li_2O$ (mol %) | 13.1 | 21.4 | 23.2 | 18.4 | 21.9 | 14.4 | 9.5 | 10.9 | 18.2 |
| $SiO2 + Al_2O_3 + MgO + CaO + SrO + BaO + Li_2O + Na_2O + K_2O + Fe_2O_3 + TiO_2$ (mol %) | 100.0 | 100.0 | 100.0 | 100.0 | 100.0 | 100.0 | 100.0 | 100.0 | 96.0 |
| MgO + CaO (mol %) | 10.1 | 9.7 | 2.6 | 11.7 | 15.2 | 15.2 | 16.7 | 17.7 | 13.9 |
| $R_2O \times MgO$ (mol %)² | 1.8 | 1.4 | 0.0 | 37.4 | 27.0 | 1.0 | 1.0 | 0.8 | 25.1 |
| $Na_2O/R_2O$ | 0.50 | 0.50 | 0.50 | 0.50 | 0.50 | 0.50 | 0.50 | 0.50 | 0.50 |
| $K_2O/R_2O$ | 0.50 | 0.50 | 0.50 | 0.50 | 0.50 | 0.50 | 0.50 | 0.50 | 0.50 |
| $R_2O + B_2O_3$ (mol %) | 17.5 | 14.4 | 14.4 | 14.4 | 10.4 | 10.4 | 10.4 | 8.4 | 9.4 |
| $SiO_2 + Al_2O_3$ (mol %) | 72.3 | 73.9 | 74.0 | 73.9 | 74.4 | 74.4 | 72.9 | 73.9 | 73.7 |

TABLE 1-continued

| | Ex. 99 | Ex. 100 | Ex. 101 | Ex. 102 | Ex. 103 | Ex. 104 | Ex. 105 | Ex. 106 | Ex. 107 |
|---|---|---|---|---|---|---|---|---|---|
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 37% | 33% | 38% | 33% | 31% | 31% | 31% | 31% | 34% |
| d | 2.49 | 2.54 | 2.73 | 2.47 | 2.49 | 2.50 | 2.52 | 2.51 | 2.49 |
| α (×$10^{-7}$/° C.) | 109 | 98 | 103 | 97 | 83 | 85 | 87 | 79 | 77 |
| E (GPa) | 71 | 71 | 67 | 71 | 75 | 75 | 76 | 77 | 76 |
| $T_g$ (° C.) | 523 | 564 | 528 | 556 | 608 | 613 | 610 | 636 | 609 |
| $T_2$ (° C.) | 1430 | 1485 | 1491 | 1495 | 1533 | 1510 | 1468 | 1504 | 1524 |
| $T_4$ (° C.) | 1015 | 1066 | 1015 | 1067 | 1113 | 1107 | 1078 | 1115 | 1095 |
| $T_L$ (° C.) | — | — | — | — | — | — | — | — | — |
| $T_4 - T_L$ (° C.) | — | — | — | — | — | — | — | — | — |
| Water resistance (mg) | 0.29 | 0.29 | 0.28 | 0.36 | 0.31 | 0.30 | 0.28 | 0.29 | 0.31 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 $m^2$) | 0.0336 | 0.0299 | 0.0341 | 0.0301 | 0.0281 | 0.0278 | 0.0281 | 0.0278 | 0.0308 |
| Radio transmittance/t (thickness: 3.85 mm) | 9.7 | 8.6 | 9.8 | 8.7 | 8.1 | 8.0 | 8.1 | 8.0 | 8.9 |
| β-OH ($mm^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 3 | 3 | 3 | 3 | 3 | 3 | 3 | 3 | 3 |
| $SiO_2$ (mol %) | 72.36 | 71.98 | 72.38 | 71.34 | 71.34 | 71.34 | 72.40 | 72.40 | 72.40 |
| $Al_2O_3$ (mol %) | 1.31 | 1.51 | 1.51 | 2.10 | 2.10 | 2.10 | 1.51 | 1.51 | 1.51 |
| $B_2O_3$ (mol %) | 1.90 | 0.00 | 0.00 | 0.00 | 0.00 | 0.00 | 0.00 | 0.00 | 0.00 |
| MgO (mol %) | 4.50 | 1.50 | 0.10 | 1.00 | 1.00 | 1.00 | 0.10 | 0.10 | 0.10 |
| CaO (mol %) | 11.48 | 13.56 | 11.56 | 10.99 | 10.99 | 10.99 | 11.56 | 11.56 | 11.56 |
| SrO (mol %) | 0.00 | 0.00 | 0.00 | 0.00 | 0.00 | 0.00 | 0.00 | 0.00 | 0.00 |
| BaO (mol %) | 2.00 | 0.00 | 0.00 | 0.00 | 0.00 | 0.00 | 0.00 | 0.00 | 0.00 |
| $TiO_2$ (mol %) | 0.05 | 0.05 | 0.05 | 0.05 | 0.05 | 0.05 | 0.04 | 0.04 | 0.04 |
| $ZrO_2$ (mol %) | 0.00 | 0.50 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 0.00 | 0.00 | 0.00 | 0.00 |
| $Na_2O$ (mol %) | 3.19 | 5.19 | 2.31 | 10.50 | 7.25 | 4.50 | 10.06 | 10.06 | 10.06 |
| $K_2O$ (mol %) | 3.19 | 5.19 | 12.06 | 4.00 | 7.25 | 9.99 | 4.32 | 4.32 | 4.32 |
| $Fe_2O_3$ (mol %) | 0.02 | 0.02 | 0.02 | 0.02 | 0.02 | 0.02 | 0.004 | 0.004 | 0.004 |
| $CeO_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.0020 | 0.0041 |

TABLE 1-continued

| | | | | | | | |
|---|---|---|---|---|---|---|---|
| SnO$_2$ (mol %) | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 |
| ZnO (mol %) | 0.00 | 0.50 | 0.00 | 0.00 | 0.00 | 0.00 | 0.00 |
| RO (mol %) | 17.98 | 15.06 | 11.66 | 11.99 | 11.99 | 11.66 | 11.66 |
| R$_2$O (mol %) | 6.38 | 10.38 | 14.37 | 14.50 | 14.49 | 14.38 | 14.38 |
| 7Al$_2$O$_3$ + 3MgO (mol %) | 22.7 | 15.1 | 10.9 | 17.7 | 17.7 | 10.9 | 10.9 |
| 7Al$_2$O$_3$ + 3MgO − 4Li$_2$O (mol %) | 22.7 | 15.1 | 10.9 | 17.7 | 17.7 | 10.9 | 10.9 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 98.1 | 99.0 | 100.0 | 100.0 | 100.0 | 100.0 | 100.0 |
| MgO + CaO (mol %) | 16.0 | 15.1 | 11.7 | 12.0 | 12.0 | 11.7 | 11.7 |
| R$_2$O × MgO (mol %)$^2$ | 28.7 | 15.6 | 1.4 | 14.5 | 14.5 | 1.4 | 1.4 |
| Na$_2$O/R$_2$O | 0.50 | 0.50 | 0.16 | 0.72 | 0.50 | 0.70 | 0.70 |
| K$_2$O/R$_2$O | 0.50 | 0.50 | 0.84 | 0.28 | 0.69 | 0.30 | 0.30 |
| R$_2$O + B$_2$O$_3$ (mol %) | 8.3 | 10.4 | 14.4 | 14.5 | 14.5 | 14.4 | 14.4 |
| SiO$_2$ + Al$_2$O$_3$ (mol %) | 73.7 | 73.5 | 73.9 | 73.4 | 73.4 | 73.9 | 73.9 |
| FeO (mol %) | — | — | — | — | — | 0.0009 | 0.0001 |
| Fe-Redox (%) | — | — | — | — | — | 22 | 2 | 3 |
| Exponential approximation formula of relation between frequency and radio transmittance (as calculated as 18 mm thickness) constant 1 | — | — | — | — | — | — | — |
| Exponential approximation formula of relation between frequency and radio transmittance (as calculated as 18 mm thickness) constant 2 | — | — | — | — | — | — | — |
| Radio transmittance with 18 mm thickness at 100 GHz | 37% | 31% | 28% | 30% | 33% | 32% | 31% | 31% |
| d | 2.57 | 2.51 | 2.48 | 2.49 | 2.49 | 2.48 | 2.49 | 2.49 |
| α (×10$^{-7}$/° C.) | 69 | 84 | 95 | 96 | 98 | 99 | 95 | 95 |
| E (GPa) | 76 | 76 | 62 | 74 | 71 | 67 | 73 | 73 |
| T$_g$ (° C.) | 604 | 612 | 603 | 549 | 562 | 583 | 547 | 547 |
| T$_2$ (° C.) | 1545 | 1499 | 1495 | 1458 | 1478 | 1494 | 1444 | 1444 |
| T$_4$ (° C.) | 1110 | 1096 | 1089 | 1041 | 1061 | 1081 | 1031 | 1031 |
| T$_L$ (° C.) | — | — | 940 | — | — | — | 1000 | 1000 |
| T$_4$ − T$_L$ (° C.) | — | — | 149 | — | — | — | 31 | 31 |
| Water resistance (mg) | 0.29 | 0.31 | 0.26 | 0.28 | 0.30 | 0.29 | 0.29 | 0.29 |
| Visible light transmittance T$_{V4}$ | ○ | ○ | ○ | ○ | ○ | ○ | ○ | ○ |
| Visible light transmittance T$_{V4}$ measured value (%) | — | — | — | — | — | — | 90.7 | 89.9 |
| Solar direct transmittance Te | ○ | ○ | ○ | ○ | ○ | ○ | ○ | ○ |
| Solar direct transmittance Te measured value (%) | — | — | — | — | — | — | 91.0 | 87.6 |
| Ultraviolet transmittance T$_{uv}$ measured value (%) | — | — | — | — | — | — | 86.6 | 40.0 |
| A × radio transmittance (area: 0.0009 m$^2$) | 0.0337 | 0.0277 | 0.0254 | 0.0270 | 0.0299 | 0.0286 | 0.0279 | 0.0279 |
| Radio transmittance/t (thickness: 3.85 mm) | 9.7 | 8.0 | 7.3 | 7.8 | 8.6 | 8.3 | 8.1 | 8.1 |
| β-OH (mm$^{-1}$) | — | — | — | — | — | — | 0.18 | 0.16 |
| Transmittance at wavelength 905 nm (%) | — | — | — | — | — | — | 90.8 | 91.9 |
| Transmittance at wavelength 1550 nm (%) | — | — | — | — | — | — | 91.3 | 92.3 |
| Maximum radio transmitted amount at 75 to 90 GHz of laminated glass (dB) | — | — | — | — | — | — | — | — |
| Frequency at maximum radio transmitted amount of laminated glass (GHz) | — | — | — | — | — | — | — | — |

TABLE 1-continued

| | Ex. 108 | Ex. 109 | Ex. 110 | Ex. 111 | Ex. 112 | Ex. 113 | Ex. 114 | Ex. 115 | Ex. 116 |
|---|---|---|---|---|---|---|---|---|---|
| Embodiment | 3 | 3 | 3 | 3 | 3 | 4 | 4 | 4 | 4 |
| $SiO_2$ (mol %) | 72.40 | 72.40 | 72.40 | 72.39 | 72.38 | 66.00 | 65.94 | 61.94 | 65.94 |
| $Al_2O_3$ (mol %) | 1.51 | 1.51 | 1.51 | 1.51 | 1.51 | 3.00 | 3.00 | 7.00 | 3.00 |
| $B_2O_3$ (mol %) | 0.00 | 0.00 | 0.00 | 0.00 | 0.00 | 4.70 | 0.00 | 0.00 | 0.00 |
| MgO (mol %) | 0.10 | 0.10 | 0.10 | 0.10 | 0.10 | 0.00 | 6.25 | 0.50 | 7.00 |
| CaO (mol %) | 11.56 | 11.56 | 11.56 | 11.56 | 11.56 | 7.74 | 6.25 | 12.00 | 12.00 |
| SrO (mol %) | 0.00 | 0.00 | 0.00 | 0.00 | 0.00 | 0.00 | 0.00 | 0.00 | 0.00 |
| BaO (mol %) | 0.00 | 0.00 | 0.00 | 0.00 | 0.00 | 0.00 | 0.00 | 0.00 | 0.00 |
| $TiO_2$ (mol %) | 0.04 | 0.04 | 0.04 | 0.04 | 0.04 | 0.04 | 0.04 | 0.04 | 0.04 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 0.00 | 0.00 | 0.00 | 0.00 | 0.00 | 6.17 | 6.17 | 6.17 | 4.00 |
| $Na_2O$ (mol %) | 10.06 | 10.06 | 10.06 | 10.05 | 10.05 | 6.17 | 6.17 | 6.17 | 4.00 |
| $K_2O$ (mol %) | 4.32 | 4.32 | 4.32 | 4.32 | 4.32 | 6.17 | 6.17 | 6.17 | 4.00 |
| $Fe_2O_3$ (mol %) | 0.004 | 0.004 | 0.004 | 0.004 | 0.004 | 0.02 | 0.02 | 0.02 | 0.02 |
| $CeO_2$ (mol %) | 0.00 | 0.0036 | 0.0108 | 0.0180 | 0.0359 | 0.00 | 0.00 | 0.00 | 0.00 |
| $Cr2O3$ (mol %) | 0.0061 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 11.66 | 11.66 | 11.66 | 11.66 | 11.66 | 12.44 | 12.50 | 12.50 | 19.00 |
| $R_2O$ (mol %) | 14.38 | 14.38 | 14.38 | 14.37 | 14.37 | 18.51 | 18.51 | 18.51 | 12.00 |
| $7Al_2O_3 + 3MgO$ (mol %) | 10.9 | 10.9 | 10.9 | 10.9 | 10.9 | 35.1 | 39.8 | 50.5 | 42.0 |
| $7Al_2O_3 + 3MgO - 4Li_2O$ (mol %) | 10.9 | 10.9 | 10.9 | 10.9 | 10.9 | 10.4 | 15.1 | 25.8 | 26.0 |
| $SiO2 + Al_2O_3 + MgO + CaO + SrO + BaO + Li_2O + Na_2O + K_2O + Fe_2O_3 + TiO_2$ (mol %) | 100.0 | 100.0 | 100.0 | 100.0 | 100.0 | 100.0 | 100.0 | 100.0 | 100.0 |
| MgO + CaO | 11.7 | 11.7 | 11.7 | 11.7 | 11.7 | 12.4 | 12.5 | 12.5 | 19.0 |
| $R_2O \times MgO$ (mol %)$^2$ | 1.4 | 1.4 | 1.4 | 1.4 | 1.4 | 87.0 | 115.7 | 9.3 | 84.0 |
| $Na_2O/R_2O$ | 0.70 | 0.70 | 0.70 | 0.70 | 0.70 | 0.33 | 0.33 | 0.33 | 0.33 |
| $K_2O/R_2O$ | 0.30 | 0.30 | 0.30 | 0.30 | 0.30 | 0.33 | 0.33 | 0.33 | 0.33 |
| $R_2O + B_2O_3$ (mol %) | 14.4 | 14.4 | 14.4 | 14.4 | 14.4 | 18.5 | 18.5 | 18.5 | 12.0 |
| $SiO_2 + Al_2O_3$ (mol %) | 73.9 | 73.9 | 73.9 | 73.9 | 73.9 | 69.0 | 68.9 | 68.9 | 68.9 |
| Fe-Redox (%) | 0.0002 | 0.0007 | 0.0003 | 0.0003 | 0.0003 | — | — | — | — |
| Exponential approximation formula of relation between frequency and radio transmittance (as calculated as 18 mm thickness) constant 1 | 4 | 18 | 6.5 | 7 | 9 | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 31% | 31% | 31% | 31% | 31% | 38% | 39% | 36% | 36% |
| d | 2.49 | 2.49 | 2.49 | 2.49 | 2.49 | 2.53 | 2.53 | 2.53 | 2.53 |
| $\alpha$ (×$10^{-7}$/° C.) | 95 | 95 | 95 | 95 | 95 | 101 | 104 | 104 | 85 |
| E (GPa) | 73 | 73 | 73 | 73 | 73 | 78 | 78 | 78 | 83 |
| $T_g$ (° C.) | 547 | 547 | 547 | 547 | 547 | 473 | 469 | 502 | 533 |
| $T_2$ (° C.) | 1444 | 1444 | 1444 | 1444 | 1444 | 1363 | 1362 | 1363 | 1398 |
| $T_4$ (° C.) | 1031 | 1031 | 1031 | 1031 | 1031 | 952 | 956 | 967 | 1015 |
| $T_L$ (° C.) | 1000 | 1000 | 1000 | 1000 | 1000 | — | 920 | 1100 | — |
| $T_4 - T_L$ (° C.) | 31 | 31 | 31 | 31 | 31 | — | 36 | −133 | — |
| Water resistance (mg) | 0.29 | 0.29 | 0.29 | 0.29 | 0.29 | 0.21 | 0.20 | 0.20 | 0.13 |

TABLE 1-continued

| | Ex. 117 | Ex. 118 | Ex. 119 | Ex. 120 | Ex. 121 | Ex. 122 | Ex. 123 | Ex. 124 | Ex. 125 |
|---|---|---|---|---|---|---|---|---|---|
| Visible light transmittance $T_{VA}$ | ◯ | ◯ | ◯ | ◯ | ◯ | ◯ | ◯ | ◯ | ◯ |
| Visible light transmittance $T_{VA}$ measured value (%) | 88.9 | 91.9 | 91.9 | 91.8 | 91.9 | — | — | — | — |
| Solar direct transmittance $T_e$ | ◯ | ◯ | ◯ | ◯ | ◯ | ◯ | ◯ | ◯ | ◯ |
| Solar direct transmittance $T_e$ measured value (%) | 86.5 | 91.0 | 91.0 | 90.8 | 90.7 | — | — | — | — |
| Ultraviolet transmittance $T_{uv}$ measured value (%) | 33.2 | 77.8 | 68.0 | 62.4 | 54.8 | — | — | — | — |
| A × radio transmittance (area: 0.0009 m²) | 0.0279 | 0.0279 | 0.0279 | 0.0279 | 0.0279 | 0.0345 | 0.0349 | 0.0324 | 0.0323 |
| Radio transmittance/t (thickness: 3.85 mm) | 8.1 | 8.1 | 8.1 | 8.1 | 8.1 | 9.9 | 10.1 | 9.4 | 9.3 |
| β-OH (mm⁻¹) | 0.19 | 0.17 | 0.08 | 0.25 | 0.23 | — | — | — | — |
| Transmittance at wavelength 905 nm (%) | 92.0 | 91.2 | 91.8 | 91.8 | 91.8 | — | — | — | — |
| Transmittance at wavelength 1550 nm (%) | 92.3 | 91.6 | 92.1 | 92.1 | 92.1 | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 4 | 4 | 4 | 4 | 4 | 4 | 4 | 4 | 4 |
| $SiO_2$ (mol %) | 65.94 | 67.03 | 67.03 | 64.73 | 66.03 | 66.03 | 66.03 | 66.53 | 66.53 |
| $Al_2O_3$ (mol %) | 3.00 | 1.90 | 3.90 | 4.00 | 7.50 | 7.50 | 8.50 | 4.50 | 5.50 |
| $B_2O_3$ (mol %) | 0.00 | 0.00 | 0.00 | 1.80 | 0.00 | 0.00 | 0.00 | 0.00 | 0.50 |
| MgO (mol %) | 9.50 | 1.50 | 0.00 | 3.40 | 4.30 | 4.30 | 4.30 | 3.80 | 4.30 |
| CaO (mol %) | 9.50 | 12.00 | 13.50 | 10.00 | 9.10 | 12.10 | 12.10 | 14.10 | 10.60 |
| SrO (mol %) | 0.00 | 2.00 | 0.00 | 0.00 | 0.00 | 0.00 | 0.00 | 1.50 | 4.00 |
| BaO (mol %) | 0.00 | 1.00 | 1.00 | 0.00 | 0.00 | 0.00 | 0.00 | 0.50 | 1.00 |
| $TiO_2$ (mol %) | 0.04 | 0.05 | 0.05 | 0.05 | 0.05 | 0.05 | 0.05 | 0.05 | 0.05 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 4.00 | 1.50 | 1.70 | 3.00 | 2.00 | 2.00 | 2.00 | 2.00 | 1.50 |
| $Na_2O$ (mol %) | 4.00 | 7.00 | 6.50 | 6.00 | 5.00 | 3.40 | 3.40 | 3.40 | 2.00 |
| $K_2O$ (mol %) | 4.00 | 6.00 | 5.80 | 7.00 | 6.00 | 4.60 | 3.60 | 3.60 | 2.00 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 19.00 | 16.50 | 14.50 | 13.40 | 13.40 | 16.40 | 16.40 | 19.90 | 19.90 |
| $R_2O$ (mol %) | 12.00 | 14.50 | 14.00 | 16.00 | 13.00 | 10.00 | 9.00 | 9.00 | 6.00 |
| $7Al_2O_3 + 3MgO$ (mol %) | 49.5 | 17.8 | 27.3 | 38.2 | 65.4 | 65.4 | 72.4 | 42.9 | 51.4 |
| $7Al_2O_3 + 3MgO - 4Li_2O$ (mol %) | 33.5 | 11.8 | 20.5 | 26.2 | 57.4 | 57.4 | 64.4 | 34.9 | 43.4 |
| $SiO_2 + Al_2O_3 + MgO + CaO + SrO + BaO + Li_2O + Na_2O + K_2O + Fe_2O_3 + TiO_2$ (mol %) | 100.0 | 100.0 | 99.5 | 98.2 | 100.0 | 100.0 | 100.0 | 100.0 | 98.0 |
| MgO + CaO (mol %) | 19.0 | 13.5 | 13.5 | 13.4 | 13.4 | 16.4 | 16.4 | 17.9 | 14.9 |
| $R_2O × MgO$ (mol %)² | 114.0 | 21.8 | 0.0 | 54.4 | 55.9 | 43.0 | 38.7 | 34.2 | 25.8 |
| $Na_2O/R_2O$ | 0.33 | 0.48 | 0.46 | 0.38 | 0.38 | 0.34 | 0.38 | 0.38 | 0.33 |
| $K_2O/R_2O$ | 0.33 | 0.41 | 0.41 | 0.44 | 0.46 | 0.46 | 0.40 | 0.40 | 0.33 |
| $R_2O + B_2O_3$ (mol %) | 12.0 | 14.5 | 14.0 | 17.8 | 13.0 | 10.0 | 9.0 | 9.0 | 6.5 |
| $SiO_2 + Al_2O_3$ (mol %) | 68.9 | 68.9 | 70.9 | 68.7 | 73.5 | 73.5 | 74.5 | 71.0 | 72.0 |

TABLE 1-continued

|  | Ex. 126 | Ex. 127 | Ex. 128 | Ex. 129 | Ex. 130 | Ex. 131 | Ex. 132 | Ex. 133 | Ex. 134 |
|---|---|---|---|---|---|---|---|---|---|
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 34% | 36% | 32% | 39% | 30% | 31% | 30% | 32% | 34% |
| d | 2.53 | 2.61 | 2.56 | 2.52 | 2.50 | 2.51 | 2.51 | 2.59 | 2.67 |
| α (×10$^{-7}$/° C.) | 84 | 102 | 95 | 97 | 86 | 78 | 74 | 79 | 64 |
| E (GPa) | 83 | 75 | 76 | 73 | 77 | 80 | 82 | 82 | 83 |
| $T_g$ (° C.) | 576 | 524 | 561 | 510 | 599 | 630 | 645 | 606 | 642 |
| $T_2$ (° C.) | 1411 | 1366 | 1435 | 1384 | 1538 | 1541 | 1569 | 1463 | 1540 |
| $T_4$ (° C.) | 1024 | 977 | 1034 | 996 | 1138 | 1156 | 1184 | 1084 | 1155 |
| $T_L$ (° C.) | 1170 | — | — | — | — | — | — | — | — |
| $T_4 - T_L$ (° C.) | −146 | — | — | — | — | — | — | — | — |
| Water resistance (mg) | 0.09 | 0.26 | 0.26 | 0.16 | — | — | — | 0.13 | 0.09 |
| Visible light transmittance $T_{VA}$ | ○ | — | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0305 | 0.0321 | 0.0292 | 0.0349 | 0.0272 | 0.0277 | 0.0274 | 0.0289 | 0.0326 |
| Radio transmittance/t (thickness: 3.85 mm) | 8.8 | 9.3 | 8.4 | 10.1 | 7.9 | 8.0 | 7.9 | 8.3 | 9.4 |
| β-OH (mm$^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| Frequency at maximum radio transmitted amount at 75 to 90 GHz of laminated glass (GHz) | — | — | — | — | — | — | — | — | — |

|  | Ex. 126 | Ex. 127 | Ex. 128 | Ex. 129 | Ex. 130 | Ex. 131 | Ex. 132 | Ex. 133 | Ex. 134 |
|---|---|---|---|---|---|---|---|---|---|
| Embodiment | 4 | 4 | 4 | 4 | 4 | 4 | 4 | 4 | 4 |
| $SiO_2$ (mol %) | 67.03 | 67.03 | 66.03 | 67.03 | 67.03 | 67.63 | 70.43 | 70.43 | 70.93 |
| $Al_2O_3$ (mol %) | 6.00 | 6.00 | 8.00 | 5.00 | 3.00 | 1.20 | 0.00 | 4.00 | 4.00 |
| $B_2O_3$ (mol %) | 1.00 | 0.50 | 0.50 | 2.00 | 1.80 | 8.00 | 0.00 | 0.00 | 0.00 |
| MgO (mol %) | 10.00 | 5.50 | 5.50 | 12.00 | 14.00 | 5.10 | 17.50 | 17.50 | 4.00 |
| CaO (mol %) | 2.40 | 13.60 | 7.60 | 4.90 | 2.10 | 0.00 | 0.00 | 0.00 | 7.00 |
| SrO (mol %) | 0.00 | 1.00 | 3.00 | 0.00 | 0.00 | 0.00 | 0.00 | 0.00 | 0.00 |
| BaO (mol %) | 0.00 | 0.30 | 0.30 | 0.05 | 0.05 | 0.05 | 0.05 | 0.05 | 0.05 |
| $TiO_2$ (mol %) | 0.05 | 0.05 | 0.05 | 0.00 | 0.00 | 0.00 | 0.00 | 0.00 | 0.00 |
| $ZrO_2$ (mol %) | 0.00 | 0.00 | 0.00 | 0.00 | 0.00 | 0.00 | 0.00 | 0.00 | 0.00 |
| $Li_2O$ (mol %) | 4.50 | 2.00 | 3.00 | 3.00 | 4.00 | 5.00 | 4.00 | 4.00 | 5.00 |
| $Na_2O$ (mol %) | 4.50 | 2.00 | 3.00 | 3.00 | 4.00 | 5.00 | 0.00 | 3.10 | 5.00 |
| $K_2O$ (mol %) | 4.50 | 2.00 | 3.00 | 3.00 | 4.00 | 5.00 | 4.00 | 0.90 | 4.00 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |

TABLE 1-continued

| | | | | | | | | | |
|---|---|---|---|---|---|---|---|---|---|
| SnO₂ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 12.40 | 20.40 | 16.40 | 16.90 | 16.10 | 13.10 | 17.50 | 17.50 | 11.00 |
| R₂O (mol %) | 13.50 | 6.00 | 9.00 | 9.00 | 12.00 | 15.00 | 8.00 | 8.00 | 14.00 |
| 7Al₂O₃ + 3MgO (mol %) | 72.0 | 58.5 | 72.5 | 71.0 | 63.0 | 45.0 | 28.0 | 28.0 | 40.0 |
| 7Al₂O₃ + 3MgO − 4Li₂O (mol %) | 54.0 | 50.5 | 60.5 | 59.0 | 47.0 | 25.0 | 12.0 | 12.0 | 20.0 |
| SiO2 + Al₂O₃ + MgO + CaO + SrO + BaO + Li₂O + Na₂O + K₂O + Fe₂O₃ + TiO₂ (mol %) | 99.0 | 99.5 | 99.5 | 98.0 | 98.2 | 98.8 | 100.0 | 100.0 | 100.0 |
| MgO + CaO | 12.4 | 19.1 | 13.1 | 16.9 | 16.1 | 13.1 | 17.5 | 17.5 | 11.0 |
| R₂O × MgO (mol %)² | 135.0 | 33.0 | 49.5 | 108.0 | 168.0 | 120.0 | 0.0 | 0.0 | 56.0 |
| Na₂O/R₂O | 0.33 | 0.33 | 0.33 | 0.33 | 0.33 | 0.33 | 0.00 | 0.39 | 0.36 |
| K₂O/R₂O | 0.33 | 0.33 | 0.33 | 0.33 | 0.33 | 0.33 | 0.50 | 0.11 | 0.29 |
| R₂O + B₂O₃ (mol %) | 14.5 | 6.5 | 9.5 | 11.0 | 13.8 | 16.2 | 8.0 | 8.0 | 14.0 |
| SiO₂ + Al₂O₃ (mol %) | 73.0 | 73.0 | 74.0 | 72.0 | 70.0 | 70.6 | 74.4 | 74.4 | 74.9 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 33% | 34% | 32% | 36% | 36% | 36% | 31% | 30% | 32% |
| d | 2.46 | 2.56 | 2.58 | 2.48 | 2.47 | 2.48 | 2.51 | 2.52 | 2.46 |
| α (×10⁻⁷/°C.) | 79 | 65 | 72 | 66 | 76 | 88 | 71 | 68 | 83 |
| E (GPa) | 80 | 84 | 82 | 81 | 80 | 78 | 82 | 84 | 79 |
| $T_g$ (°C.) | 543 | 641 | 612 | 577 | 530 | 497 | 610 | 596 | 524 |
| $T_2$ (°C.) | 1524 | 1538 | 1549 | 1516 | 1439 | 1437 | 1529 | 1515 | 1540 |
| $T_4$ (°C.) | 1097 | 1153 | 1159 | 1106 | 1032 | 1015 | 1153 | 1123 | 1093 |
| $T_L$ (°C.) | — | — | — | — | — | — | — | — | — |
| $T_4 - T_L$ (°C.) | — | — | — | — | — | — | — | — | — |
| Water resistance (mg) | — | — | — | — | 0.02 | 0.17 | 0.32 | 0.33 | 0.21 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | 0.0300 | 0.0308 | 0.0291 | 0.0320 | 0.0323 | 0.0328 | 0.0276 | 0.0267 | 0.0292 |
| A × radio transmittance (area: 0.0009 m²) | ○ | ○ | ○ | ○ | ○ | ○ | ○ | ○ | ○ |
| Radio transmittance/t (thickness: 3.85 mm) | — | — | — | — | — | — | — | — | — |
| β-OH (mm⁻¹) | 8.7 | 8.9 | 8.4 | 9.2 | 9.3 | 9.5 | 8.0 | 7.7 | 8.4 |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | Ex. 135 | Ex. 136 | Ex. 137 | Ex. 138 | Ex. 139 | Ex. 140 | Ex. 141 | Ex. 142 | Ex. 143 |
|---|---|---|---|---|---|---|---|---|---|
| Embodiment | 5 | 5 | 5 | 5 | 5 | 5 | 5 | 5 | 5 |
| SiO$_2$ (mol %) | 65.50 | 66.00 | 66.00 | 68.45 | 68.45 | 66.00 | 66.00 | 66.00 | 66.00 |
| Al$_2$O$_3$ (mol %) | 3.45 | 2.95 | 2.95 | 5.00 | 7.00 | 1.00 | 2.95 | 3.85 | 2.95 |
| B$_2$O$_3$ (mol %) | 0.00 | 0.00 | 0.00 | 0.00 | 0.00 | 0.00 | 0.50 | 1.00 | 1.90 |
| MgO (mol %) | 0.50 | 0.50 | 6.00 | 0.50 | 0.00 | 7.00 | 0.00 | 0.10 | 3.50 |
| CaO (mol %) | 11.98 | 11.98 | 6.48 | 8.98 | 8.98 | 6.43 | 11.98 | 12.38 | 8.98 |
| SrO (mol %) | 0.00 | 0.00 | 0.00 | 0.00 | 0.00 | 0.00 | 0.00 | 0.00 | 0.00 |
| BaO (mol %) | 0.05 | 0.05 | 0.05 | 0.05 | 0.05 | 0.05 | 0.05 | 0.05 | 0.05 |
| TiO$_2$ (mol %) | 0.00 | 0.00 | 0.00 | 0.00 | 0.00 | 1.00 | 0.00 | 0.00 | 0.00 |
| ZrO$_2$ (mol %) | 0.00 | 0.00 | 0.00 | 0.00 | 0.00 | 0.00 | 0.00 | 0.00 | 0.00 |
| Li$_2$O (mol %) | 4.37 | 3.07 | 7.37 | 6.87 | 9.87 | 7.37 | 3.17 | 5.47 | 5.47 |
| Na$_2$O (mol %) | 8.97 | 8.97 | 8.97 | 7.97 | 3.47 | 2.17 | 2.17 | 7.97 | 7.97 |
| K$_2$O (mol %) | 5.17 | 6.47 | 2.17 | 2.17 | 2.17 | 8.97 | 13.17 | 3.17 | 3.17 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| R$_2$O (mol %) | 12.48 | 12.48 | 12.48 | 9.48 | 8.98 | 13.43 | 11.98 | 12.48 | 12.48 |
| RO (mol %) | 18.51 | 18.51 | 18.51 | 17.01 | 15.51 | 18.51 | 18.51 | 16.61 | 16.61 |
| 7Al$_2$O$_3$ + 3MgO (mol %) | 25.7 | 22.2 | 38.7 | 36.5 | 49.0 | 28.0 | 20.7 | 27.3 | 31.2 |
| 7Al$_2$O$_3$ + 3MgO − 4Li$_2$O (mol %) | 8.2 | 9.9 | 9.2 | 9.0 | 9.5 | −1.5 | 8.0 | 5.4 | 9.3 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 100.0 | 100.0 | 100.0 | 100.0 | 100.0 | 99.0 | 99.5 | 99.0 | 98.1 |
| MgO + CaO (mol %) | 12.5 | 12.5 | 12.5 | 9.5 | 9.0 | 13.4 | 12.0 | 12.5 | 12.5 |
| R$_2$O × MgO (mol %)$^2$ | 9.3 | 9.3 | 111.1 | 8.5 | 0.0 | 129.6 | 0.0 | 1.7 | 58.1 |
| Na$_2$O/R$_2$O | 0.48 | 0.48 | 0.48 | 0.47 | 0.22 | 0.12 | 0.12 | 0.48 | 0.48 |
| K$_2$O/R$_2$O | 0.28 | 0.35 | 0.12 | 0.13 | 0.14 | 0.48 | 0.71 | 0.19 | 0.19 |
| R$_2$O + B$_2$O$_3$ (mol %) | 18.5 | 18.5 | 18.5 | 17.0 | 15.5 | 18.5 | 19.0 | 17.6 | 18.5 |
| SiO$_2$ + Al$_2$O$_3$ (mol %) | 69.0 | 69.0 | 69.0 | 73.5 | 75.5 | 67.0 | 69.0 | 69.9 | 69.0 |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 39% | 40% | 35% | 32% | 33% | 35% | 31% | 37% | 39% |
| d | 2.52 | 2.52 | 2.49 | 2.49 | 2.47 | 2.51 | 2.51 | 2.52 | 2.51 |
| α (×10$^{-7}$/° C.) | 106 | 108 | 97 | 90 | 80 | 100 | 106 | 96 | 94 |
| E (GPa) | 77 | 74 | 83 | 81 | 85 | 76 | 61 | 79 | 79 |
| T$_g$ (° C.) | 484 | 490 | 467 | 491 | 503 | 475 | 524 | 488 | 470 |
| T$_2$ (° C.) | 1349 | 1354 | 1364 | 1453 | 1507 | 1336 | 1340 | 1362 | 1363 |
| T$_4$ (° C.) | 935 | 947 | 929 | 1010 | 1068 | 940 | 995 | 946 | 944 |
| T$_L$ (° C.) | — | — | — | — | — | — | — | — | — |
| T$_4$ − T$_L$ (° C.) | — | — | — | — | — | — | — | — | — |
| Water resistance (mg) | 0.19 | 0.21 | 0.25 | 0.23 | 0.39 | 0.20 | 0.24 | 0.22 | 0.23 |

TABLE 1-continued

| | Ex. 144 | Ex. 145 | Ex. 146 | Ex. 147 | Ex. 148 | Ex. 149 | Ex. 150 | Ex. 151 | Ex. 152 |
|---|---|---|---|---|---|---|---|---|---|
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | — | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m$^2$) | 0.0349 | 0.0357 | 0.0317 | 0.0290 | 0.0294 | 0.0314 | 0.0277 | 0.0330 | 0.0348 |
| Radio transmittance/t (thickness: 3.85 mm) | 10.1 | 10.3 | 9.1 | 8.4 | 8.5 | 9.1 | 8.0 | 9.5 | 10.1 |
| β-OH (mm$^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| Frequency at maximum radio transmitted amount of laminated glass (GHz) | — | — | — | — | — | — | — | — | — |
| Embodiment | 5 | 5 | 5 | 5 | 5 | 5 | 5 | 6 | 6 |
| SiO$_2$ (mol %) | 69.00 | 70.50 | 69.50 | 69.00 | 69.00 | 69.50 | 69.03 | 66.00 | 67.95 |
| Al$_2$O$_3$ (mol %) | 2.95 | 2.50 | 2.95 | 2.95 | 3.20 | 2.95 | 3.50 | 5.50 | 5.50 |
| B$_2$O$_3$ (mol %) | 0.00 | 0.00 | 0.00 | 0.00 | 0.00 | 0.00 | 0.00 | 1.95 | 0.00 |
| MgO (mol %) | 0.00 | 2.00 | 0.10 | 1.50 | 1.00 | 4.50 | 0.90 | 0.50 | 0.50 |
| CaO (mol %) | 2.50 | 9.43 | 5.50 | 2.00 | 11.98 | 10.48 | 8.00 | 11.98 | 11.98 |
| SrO (mol %) | 9.48 | 0.00 | 5.48 | 11.98 | 0.00 | 0.00 | 0.00 | 0.00 | 0.00 |
| BaO (mol %) | 0.00 | 0.00 | 0.90 | 0.00 | 0.00 | 0.00 | 0.00 | 0.00 | 0.00 |
| TiO$_2$ (mol %) | 0.05 | 0.05 | 0.05 | 0.05 | 0.05 | 0.05 | 0.05 | 0.05 | 0.05 |
| ZrO$_2$ (mol %) | 0.50 | 0.00 | 0.00 | 0.00 | 0.00 | 0.00 | 0.00 | 0.00 | 0.00 |
| Li$_2$O (mol %) | 5.17 | 5.17 | 5.17 | 4.17 | 8.08 | 8.33 | 6.17 | 13.00 | 13.00 |
| Na$_2$O (mol %) | 5.17 | 5.17 | 5.17 | 4.17 | 4.17 | 0.80 | 6.17 | 1.00 | 1.00 |
| K$_2$O (mol %) | 5.17 | 5.17 | 5.17 | 4.17 | 2.50 | 3.37 | 0.02 | 0.02 | 0.02 |
| Fe$_2$O$_3$ (mol %) | 0.02 | 0.02 | 0.02 | 0.02 | 0.02 | 0.02 | 0.00 | 0.00 | 0.00 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 11.98 | 11.43 | 11.98 | 15.48 | 12.98 | 14.98 | 8.90 | 12.48 | 12.48 |
| R$_2$O (mol %) | 15.51 | 15.51 | 15.51 | 12.51 | 14.75 | 12.50 | 18.51 | 14.00 | 14.00 |
| 7Al$_2$O$_3$ + 3MgO (mol %) | 20.7 | 23.5 | 21.0 | 25.2 | 25.4 | 34.2 | 27.2 | 40.0 | 40.0 |
| 7Al$_2$O$_3$ + 3MgO − 4Li$_2$O (mol %) | 0.0 | 2.8 | 0.3 | 8.5 | −6.9 | 0.8 | 2.5 | −12.0 | −12.0 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 99.5 | 100.0 | 100.0 | 100.0 | 100.0 | 100.0 | 100.0 | 98.1 | 100.0 |
| MgO + CaO (mol %) | 2.5 | 11.4 | 5.6 | 3.5 | 13.0 | 15.0 | 8.9 | 12.5 | 12.5 |
| R$_2$O × MgO (mol %)$^2$ | 0.0 | 31.0 | 1.6 | 18.8 | 14.8 | 56.3 | 16.7 | 7.0 | 7.0 |
| Na$_2$O/R$_2$O | 0.33 | 0.33 | 0.33 | 0.33 | 0.28 | 0.06 | 0.33 | 0.07 | 0.07 |
| K$_2$O/R$_2$O | 0.33 | 0.33 | 0.33 | 0.33 | 0.17 | 0.27 | 0.33 | 0.00 | 0.00 |
| R$_2$O + B$_2$O$_3$ (mol %) | 15.5 | 15.5 | 15.5 | 12.5 | 14.8 | 12.5 | 18.5 | 16.0 | 14.0 |
| SiO$_2$ + Al$_2$O$_3$ (mol %) | 72.0 | 73.0 | 72.5 | 72.0 | 72.2 | 72.5 | 72.5 | 71.5 | 73.5 |

TABLE 1-continued

| | Ex. 153 | Ex. 154 | Ex. 155 | Ex. 156 | Ex. 157 | Ex. 158 | Ex. 159 | Ex. 160 | Ex. 161 |
|---|---|---|---|---|---|---|---|---|---|
| Embodiment | 6 | 6 | 6 | 6 | 6 | 6 | 6 | 6 | 6 |
| SiO₂ (mol %) | 66.85 | 66.85 | 66.85 | 69.95 | 70.75 | 70.75 | 70.75 | 70.75 | 70.75 |
| Al₂O₃ (mol %) | 5.00 | 4.00 | 3.00 | 2.00 | 1.00 | 1.00 | 1.00 | 1.00 | 1.00 |
| B₂O₃ (mol %) | 0.00 | 0.00 | 0.00 | 0.00 | 0.00 | 0.00 | 0.00 | 0.00 | 0.00 |
| MgO (mol %) | 0.50 | 1.00 | 0.50 | 0.50 | 0.20 | 10.00 | 8.00 | 6.00 | 4.00 |
| CaO (mol %) | 13.58 | 13.58 | 11.58 | 13.48 | 13.48 | 3.68 | 3.68 | 4.68 | 6.68 |
| SrO (mol %) | 0.00 | 0.00 | 1.00 | 0.00 | 0.00 | 0.00 | 0.00 | 0.00 | 0.00 |
| BaO (mol %) | 0.00 | 0.00 | 1.00 | 0.00 | 0.00 | 0.00 | 0.00 | 0.00 | 2.00 |
| TiO₂ (mol %) | 0.05 | 0.05 | 0.05 | 0.05 | 0.05 | 0.05 | 0.05 | 0.05 | 0.05 |
| ZrO₂ (mol %) | 0.00 | 0.00 | 0.00 | 0.00 | 0.00 | 0.00 | 0.00 | 0.00 | 0.00 |
| Li₂O (mol %) | 14.00 | 13.00 | 10.00 | 14.00 | 14.50 | 13.50 | 12.50 | 9.50 | 7.50 |
| Na₂O (mol %) | 0.00 | 0.75 | 3.00 | 0.00 | 0.00 | 0.50 | 2.00 | 4.00 | 4.00 |
| K₂O (mol %) | 0.00 | 0.75 | 3.00 | 0.00 | 0.00 | 0.50 | 2.00 | 4.00 | 4.00 |
| Fe₂O₃ (mol %) | 0.02 | 0.02 | 0.02 | 0.02 | 0.02 | 0.02 | 0.02 | 0.02 | 0.02 |
| CeO₂ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 37% | 35% | 37% | 36% | 33% | 32% | 39% | 33% | 31% |
| d | 2.68 | 2.48 | 2.62 | 2.71 | 2.50 | 2.48 | 2.48 | 2.50 | 2.49 |
| α (×10⁻⁷/° C.) | 96 | 92 | 96 | 90 | 85 | 77 | 99 | 72 | 72 |
| E (GPa) | 78 | 78 | 77 | 79 | 84 | 85 | 85 | 90 | 92 |
| Tg (° C.) | 486 | 500 | 479 | 511 | 494 | 509 | 473 | 479 | 500 |
| T₂ (° C.) | 1408 | 1462 | 1421 | 1422 | 1427 | 1478 | 1431 | 1383 | 1458 |
| T₄ (° C.) | 996 | 1036 | 1000 | 1017 | 1006 | 1054 | 1001 | 959 | 1019 |
| T_L (° C.) | — | — | — | — | — | — | — | — | — |
| T₄ − T_L (° C.) | — | — | — | — | — | — | — | — | — |
| Water resistance (mg) | 0.28 | 0.28 | 0.28 | 0.26 | 0.27 | 0.13 | 0.23 | 0.31 | 0.33 |
| Visible light transmittance T_VA | ○ | ○ | ○ | ○ | ○ | ○ | ○ | ○ | ○ |
| Visible light transmittance T_VA measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance T_uv, measured value (%) | — | — | — | — | — | — | — | — | — |
| A × radio transmittance (area: 0.0009 m²) | 0.0331 | 0.0311 | 0.0331 | 0.0322 | 0.0297 | 0.0291 | 0.0347 | 0.0301 | 0.0283 |
| Radio transmittance/t (thickness: 3.85 mm) | 9.5 | 9.0 | 9.5 | 9.3 | 8.6 | 8.4 | 10.0 | 8.7 | 8.2 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| Frequency at maximum radio transmitted amount of laminated glass (GHz) | — | — | — | — | — | — | — | — | — |

TABLE 1-continued

| | | | | | | | | | |
|---|---|---|---|---|---|---|---|---|---|
| SnO₂ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 14.08 | 14.58 | 14.08 | 13.98 | 13.68 | 13.68 | 11.68 | 10.68 | 12.68 |
| R₂O (mol %) | 14.00 | 14.50 | 16.00 | 14.00 | 14.50 | 14.50 | 16.50 | 17.50 | 15.50 |
| 7Al₂O₃ + 3MgO (mol %) | 36.5 | 31.0 | 22.5 | 15.5 | 7.6 | 37.0 | 31.0 | 25.0 | 19.0 |
| 7Al₂O₃ + 3MgO − 4Li₂O (mol %) | −19.5 | −21.0 | −17.5 | −40.5 | −50.4 | −17.0 | −19.0 | −13.0 | −11.0 |
| SiO₂ + Al₂O₃ + MgO + CaO + SrO + BaO + Li₂O + Na₂O + K₂O + Fe₂O₃ + TiO₂ (mol %) | 100.0 | 100.0 | 100.0 | 100.0 | 100.0 | 100.0 | 100.0 | 100.0 | 100.0 |
| MgO + CaO (mol %) | 14.1 | 14.6 | 12.1 | 14.0 | 13.7 | 13.7 | 11.7 | 10.7 | 10.7 |
| R₂O × MgO (mol %)² | 7.0 | 14.5 | 8.0 | 7.0 | 2.9 | 145.0 | 132.0 | 105.0 | 62.0 |
| Na₂O/R₂O | 0.00 | 0.05 | 0.19 | 0.00 | 0.00 | 0.03 | 0.12 | 0.23 | 0.26 |
| K₂O/R₂O | 0.00 | 0.05 | 0.19 | 0.00 | 0.00 | 0.03 | 0.12 | 0.23 | 0.26 |
| R₂O + B₂O₃ (mol %) | 14.0 | 14.5 | 16.0 | 14.0 | 14.5 | 14.5 | 16.5 | 17.5 | 15.5 |
| SiO₂ + Al₂O₃ (mol %) | 71.9 | 70.9 | 69.9 | 72.0 | 71.8 | 71.8 | 71.8 | 71.8 | 71.8 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 31% | 32% | 35% | 31% | 31% | 35% | 37% | 39% | 37% |
| d | 2.50 | 2.50 | 2.56 | 2.49 | 2.48 | 2.44 | 2.44 | 2.45 | 2.53 |
| α (×10⁻⁷/°C.) | 73 | 78 | 91 | 72 | 73 | 68 | 79 | 90 | 90 |
| E (GPa) | 94 | 93 | 85 | 93 | 93 | 92 | 92 | 83 | 81 |
| $T_g$ (°C.) | 499 | 491 | 466 | 490 | 487 | 480 | 469 | 458 | 459 |
| $T_2$ (°C.) | 1400 | 1374 | 1338 | 1434 | 1433 | 1486 | 1466 | 1442 | 1435 |
| $T_4$ (°C.) | 974 | 953 | 928 | 994 | 989 | 989 | 980 | 983 | 989 |
| $T_L$ (°C.) | — | — | — | — | — | — | — | — | — |
| $T_4 − T_L$ (°C.) | — | — | — | — | — | — | — | — | — |
| Water resistance (mg) | 0.30 | 0.26 | 0.25 | 0.20 | 0.17 | 0.15 | 0.19 | 0.33 | 0.31 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0281 | 0.0287 | 0.0317 | 0.0276 | 0.0277 | 0.0318 | 0.0337 | 0.0350 | 0.0329 |
| Radio transmittance/t (thickness: 3.85 mm) | 8.1 | 8.3 | 9.1 | 8.0 | 8.0 | 9.2 | 9.7 | 10.1 | 9.5 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | Ex. 162 | Ex. 163 | Ex. 164 | Ex. 165 | Ex. 166 | Ex. 167 | Ex. 168 | Ex. 169 | Ex. 170 |
|---|---|---|---|---|---|---|---|---|---|
| Embodiment | 6 | 6 | 6 | 6 | 6 | 6 | 6 | 6 | 6 |
| SiO$_2$ (mol %) | 70.75 | 69.95 | 69.95 | 69.95 | 70.85 | 70.85 | 71.35 | 69.85 | 70.85 |
| Al$_2$O$_3$ (mol %) | 1.00 | 2.00 | 2.00 | 2.00 | 1.00 | 1.00 | 0.50 | 1.00 | 1.00 |
| B$_2$O$_3$ (mol %) | 0.00 | 0.00 | 0.00 | 0.00 | 0.00 | 0.00 | 0.00 | 0.00 | 0.00 |
| MgO (mol %) | 2.00 | 0.50 | 0.50 | 0.50 | 0.20 | 0.20 | 0.10 | 0.20 | 0.20 |
| CaO (mol %) | 6.18 | 13.48 | 13.48 | 13.48 | 14.38 | 14.38 | 12.38 | 1.00 | 1.00 |
| SrO (mol %) | 2.00 | 0.00 | 0.00 | 0.00 | 0.00 | 0.00 | 0.00 | 13.38 | 0.00 |
| BaO (mol %) | 0.00 | 0.00 | 0.00 | 0.00 | 0.00 | 0.00 | 2.10 | 0.05 | 0.05 |
| TiO$_2$ (mol %) | 0.05 | 0.05 | 0.05 | 0.05 | 0.05 | 0.05 | 0.05 | 0.05 | 0.05 |
| ZrO$_2$ (mol %) | 0.00 | 0.00 | 0.00 | 0.00 | 0.00 | 0.00 | 0.00 | 0.00 | 0.00 |
| Li$_2$O (mol %) | 6.00 | 7.00 | 7.00 | 7.00 | 4.50 | 4.50 | 4.50 | 4.50 | 4.50 |
| Na$_2$O (mol %) | 6.00 | 0.00 | 0.00 | 3.50 | 4.50 | 4.50 | 4.50 | 4.50 | 4.50 |
| K$_2$O (mol %) | 6.00 | 7.00 | 7.00 | 3.50 | 4.50 | 4.50 | 4.50 | 4.50 | 4.50 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| R$_2$O (mol %) | 10.18 | 13.98 | 13.98 | 13.98 | 14.58 | 14.58 | 14.58 | 14.58 | 14.58 |
| RO (mol %) | 18.00 | 14.00 | 14.00 | 14.00 | 13.50 | 13.50 | 13.50 | 13.50 | 13.50 |
| 7Al$_2$O$_3$ + 3MgO (mol %) | 13.0 | 15.5 | 15.5 | 15.5 | 7.6 | 7.6 | 3.8 | 7.6 | 7.6 |
| 7Al$_2$O$_3$ + 3MgO − 4Li$_2$O (mol %) | −11.0 | −12.5 | −12.5 | −12.5 | −10.4 | −10.4 | −14.2 | −10.4 | −10.4 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 100.0 | 100.0 | 100.0 | 100.0 | 100.0 | 100.0 | 100.0 | 99.0 | 100.0 |
| MgO + CaO | 8.2 | 14.0 | 14.0 | 14.0 | 14.6 | 14.6 | 12.5 | 1.2 | 1.2 |
| R$_2$O × MgO (mol %)$^2$ | 36.0 | 7.0 | 7.0 | 7.0 | 2.7 | 2.7 | 1.4 | 2.7 | 2.7 |
| Na$_2$O/R$_2$O | 0.33 | 0.50 | 0.00 | 0.25 | 0.33 | 0.33 | 0.33 | 0.33 | 0.33 |
| K$_2$O/R$_2$O | 0.33 | 0.00 | 0.50 | 0.25 | 0.33 | 0.33 | 0.33 | 0.33 | 0.33 |
| R$_2$O + B$_2$O$_3$ (mol %) | 18.0 | 14.0 | 14.0 | 14.0 | 13.5 | 13.5 | 13.5 | 14.5 | 13.5 |
| SiO$_2$ + Al$_2$O$_3$ (mol %) | 71.8 | 72.0 | 72.0 | 72.0 | 71.9 | 71.9 | 71.9 | 70.9 | 71.9 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 40% | 30% | 30% | 33% | 33% | 33% | 34% | 40% | 41% |
| d | 2.52 | 2.51 | 2.49 | 2.50 | 2.50 | 2.50 | 2.56 | 2.72 | 2.93 |
| α (×10$^{-7}$/° C.) | 101 | 83 | 88 | 86 | 90 | 90 | 92 | 95 | 101 |
| E (GPa) | 76 | 84 | 78 | 82 | 79 | 79 | 78 | 77 | 73 |
| T$_g$ (° C.) | 454 | 501 | 517 | 501 | 518 | 518 | 493 | 462 | 478 |
| T$_2$ (° C.) | 1405 | 1405 | 1434 | 1420 | 1415 | 1415 | 1411 | 1362 | 1415 |
| T$_4$ (° C.) | 976 | 988 | 1048 | 1015 | 1021 | 1021 | 1003 | 959 | 924 |
| T$_L$ (° C.) | — | — | — | — | — | — | — | — | — |
| T$_4$ − T$_L$ (° C.) | — | — | — | — | — | — | — | — | — |
| Water resistance (mg) | 0.32 | 0.28 | 0.20 | 0.26 | 0.27 | 0.27 | 0.26 | 0.25 | 0.27 |

TABLE 1-continued

| | Ex. 171 | Ex. 172 | Ex. 173 | Ex. 174 | Ex. 175 | Ex. 176 | Ex. 177 | Ex. 178 | Ex. 179 |
|---|---|---|---|---|---|---|---|---|---|
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0363 | 0.0269 | 0.0268 | 0.0295 | 0.0296 | 0.0296 | 0.0308 | 0.0364 | 0.0370 |
| Radio transmittance/t (thickness: 3.85 mm) | 10.5 | 7.8 | 7.7 | 8.5 | 8.5 | 8.5 | 8.9 | 10.5 | 10.7 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 6 | 6 | 6 | 6 | 6 | 6 | 1 | 1 | 1 |
| SiO₂ (mol %) | 70.85 | 70.85 | 67.35 | 69.95 | 69.95 | 69.95 | 68.06 | 65.06 | 65.06 |
| Al₂O₃ (mol %) | 1.20 | 1.00 | 1.00 | 2.00 | 2.00 | 2.00 | 6.00 | 6.00 | 5.00 |
| B₂O₃ (mol %) | 0.00 | 0.00 | 0.50 | 0.00 | 0.00 | 0.00 | 4.00 | 7.00 | 5.00 |
| MgO (mol %) | 0.00 | 0.20 | 0.20 | 0.50 | 0.50 | 0.50 | 0.10 | 5.10 | 9.10 |
| CaO (mol %) | 0.00 | 10.38 | 9.38 | 13.48 | 13.48 | 13.48 | 0.00 | 2.60 | 0.00 |
| SrO (mol %) | 7.19 | 2.00 | 4.00 | 0.00 | 0.00 | 0.00 | 7.60 | 0.00 | 2.60 |
| BaO (mol %) | 7.19 | 2.00 | 4.00 | 0.00 | 0.00 | 0.00 | 0.00 | 0.00 | 0.00 |
| TiO₂ (mol %) | 0.05 | 0.05 | 0.05 | 0.05 | 0.05 | 0.05 | 0.05 | 0.05 | 0.05 |
| ZrO₂ (mol %) | 0.00 | 0.00 | 0.00 | 0.00 | 0.00 | 0.00 | 0.00 | 0.00 | 0.00 |
| Li₂O (mol %) | 5.00 | 0.00 | 0.00 | 12.00 | 10.00 | 8.00 | 0.00 | 0.00 | 0.00 |
| Na₂O (mol %) | 4.25 | 4.50 | 4.50 | 1.00 | 2.00 | 3.00 | 10.52 | 9.02 | 4.02 |
| K₂O (mol %) | 4.25 | 4.50 | 4.50 | 1.00 | 2.00 | 3.00 | 3.65 | 5.15 | 9.15 |
| Fe₂O₃ (mol %) | 0.02 | 0.02 | 0.02 | 0.02 | 0.02 | 0.02 | 0.02 | 0.02 | 0.02 |
| CeO₂ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO₂ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 14.38 | 14.58 | 17.58 | 13.98 | 13.98 | 13.98 | 7.70 | 7.70 | 11.70 |
| R₂O (mol %) | 13.50 | 13.50 | 13.50 | 14.00 | 14.00 | 14.00 | 14.17 | 14.17 | 13.17 |
| 7Al₂O₃ + 3MgO (mol %) | 8.4 | 7.6 | 7.6 | 15.5 | 15.5 | 15.5 | 42.3 | 57.3 | 62.3 |
| 7Al₂O₃ + 3MgO − 4Li₂O (mol %) | −11.6 | −10.4 | −10.4 | −32.5 | −24.5 | −16.5 | 42.3 | 57.3 | 62.3 |
| SiO2 + Al₂O₃ + MgO + CaO + SrO + BaO + Li₂O + Na₂O + K₂O + Fe₂O₃ + TiO₂ (mol %) | 100.0 | 100.0 | 99.5 | 100.0 | 100.0 | 100.0 | 96.0 | 93.0 | 95.0 |
| MgO + CaO (mol %) | 0.0 | 10.6 | 9.6 | 14.0 | 14.0 | 14.0 | 0.1 | 7.7 | 9.1 |
| R₂O × MgO (mol %)² | 0.0 | 2.7 | 2.7 | 7.0 | 7.0 | 7.0 | 1.4 | 72.3 | 119.8 |
| Na₂O/R₂O | 0.31 | 0.33 | 0.33 | 0.07 | 0.14 | 0.21 | 0.74 | 0.64 | 0.31 |
| K₂O/R₂O | 0.31 | 0.33 | 0.33 | 0.07 | 0.14 | 0.21 | 0.26 | 0.36 | 0.69 |
| R₂O + B₂O₃ (mol %) | 13.5 | 13.5 | 14.0 | 14.0 | 14.0 | 14.0 | 18.2 | 21.2 | 18.2 |
| SiO₂ + Al₂O₃ (mol %) | 72.1 | 71.9 | 68.4 | 72.0 | 72.0 | 72.0 | 74.1 | 71.1 | 70.1 |

TABLE 1-continued

| | Ex. 180 | Ex. 181 | Ex. 182 | Ex. 183 | Ex. 184 | Ex. 185 | Ex. 186 | Ex. 187 | Ex. 188 |
|---|---|---|---|---|---|---|---|---|---|
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 40% | 35% | 38% | 31% | 32% | 33% | 34% | 42% | 41% |
| d | 2.77 | 2.60 | 2.73 | 2.49 | 2.49 | 2.50 | 2.64 | 2.49 | 2.54 |
| α (×10⁻⁷/° C.) | 98 | 93 | 99 | 76 | 80 | 84 | 87 | 81 | 84 |
| E (GPa) | 76 | 78 | 78 | 90 | 87 | 84 | 69 | 66 | 65 |
| $T_g$ (° C.) | 452 | 489 | 462 | 487 | 489 | 496 | 550 | 531 | 572 |
| $T_2$ (° C.) | 1406 | 1411 | 1306 | 1426 | 1421 | 1420 | 1502 | 1507 | 1480 |
| $T_4$ (° C.) | 948 | 1000 | 920 | 1000 | 1005 | 1012 | 1058 | 1079 | 1097 |
| $T_L$ (° C.) | — | — | — | — | — | — | — | — | — |
| $T_4 - T_L$ (° C.) | — | — | — | — | — | — | — | — | — |
| Water resistance (mg) | 0.26 | 0.27 | 0.23 | 0.22 | 0.24 | 0.26 | 0.13 | — | — |
| Visible light transmittance $T_{VA}$ | ○ | ○ | ○ | ○ | ○ | ○ | ○ | — | — |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0360 | 0.0313 | 0.0339 | 0.0283 | 0.0289 | 0.0293 | 0.0308 | 0.0377 | 0.0367 |
| Radio transmittance/t (thickness: 3.85 mm) | 10.4 | 9.0 | 9.8 | 8.2 | 8.3 | 8.5 | 8.9 | 10.9 | 10.6 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| Frequency at maximum radio transmitted amount of laminated glass (GHz) | — | — | — | — | — | — | — | — | — |
| Embodiment | 1 | 1 | 1 | 2 | 2 | 2 | 2 | 2 | 2 |
| SiO₂ (mol %) | 62.06 | 65.80 | 65.80 | 70.45 | 67.45 | 69.45 | 69.45 | 67.45 | 70.03 |
| Al₂O₃ (mol %) | 9.00 | 7.00 | 7.00 | 4.00 | 3.50 | 5.00 | 5.80 | 5.00 | 5.80 |
| B₂O₃ (mol %) | 7.00 | 10.00 | 12.00 | 4.00 | 5.00 | 6.00 | 8.00 | 10.00 | 5.00 |
| MgO (mol %) | 0.00 | 1.13 | 5.00 | 0.00 | 0.00 | 0.00 | 0.00 | 1.80 | 0.00 |
| CaO (mol %) | 0.00 | 8.00 | 4.63 | 11.99 | 8.99 | 9.99 | 7.69 | 5.69 | 0.00 |
| SrO (mol %) | 0.00 | 0.00 | 0.00 | 0.00 | 3.50 | 0.00 | 0.00 | 0.00 | 2.00 |
| BaO (mol %) | 7.70 | 0.00 | 0.00 | 0.00 | 0.00 | 0.00 | 1.00 | 0.00 | 0.00 |
| TiO₂ (mol %) | 0.05 | 0.05 | 0.05 | 0.05 | 0.05 | 0.05 | 0.05 | 0.05 | 0.05 |
| ZrO₂ (mol %) | 0.00 | 0.00 | 0.00 | 1.50 | 0.50 | 1.50 | 0.00 | 0.00 | 0.00 |
| Li₂O (mol %) | 0.00 | 0.00 | 0.00 | 0.00 | 0.00 | 0.00 | 0.00 | 0.00 | 0.00 |
| Na₂O (mol %) | 5.02 | 4.00 | 1.50 | 5.49 | 4.20 | 4.20 | 6.10 | 7.20 | 4.10 |
| K₂O (mol %) | 9.15 | 4.00 | 4.00 | 2.50 | 6.80 | 3.80 | 1.90 | 2.80 | 13.00 |
| Fe₂O₃ (mol %) | 0.02 | 0.02 | 0.02 | 0.02 | 0.02 | 0.02 | 0.02 | 0.02 | 0.02 |
| CeO₂ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |

TABLE 1-continued

| | | | | | | | | | |
|---|---|---|---|---|---|---|---|---|---|
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 7.70 | 9.13 | 9.63 | 11.99 | 12.49 | 9.99 | 8.69 | 7.49 | 2.00 |
| R$_2$O (mol %) | 14.17 | 8.00 | 5.50 | 7.99 | 11.00 | 8.00 | 8.00 | 10.00 | 17.10 |
| 7Al$_2$O$_3$ + 3MgO (mol %) | 63.0 | 52.4 | 64.0 | 28.0 | 24.5 | 35.0 | 40.6 | 40.4 | 40.6 |
| 7Al$_2$O$_3$ + 3MgO − 4Li$_2$O (mol %) | 63.0 | 52.4 | 64.0 | 28.0 | 24.5 | 35.0 | 40.6 | 40.4 | 40.6 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 93.0 | 90.0 | 88.0 | 94.5 | 94.5 | 92.5 | 92.0 | 90.0 | 95.0 |
| MgO + CaO (mol %) | 0.0 | 9.1 | 9.6 | 12.0 | 9.0 | 10.0 | 7.7 | 7.5 | 0.0 |
| R$_2$O × MgO (mol %)$^2$ | 0.0 | 9.0 | 27.5 | 0.0 | 0.0 | 0.0 | 0.0 | 18.0 | 0.0 |
| Na$_2$O/R$_2$O | 0.35 | 0.50 | 0.27 | 0.69 | 0.38 | 0.53 | 0.76 | 0.72 | 0.24 |
| K$_2$O/R$_2$O | 0.65 | 0.50 | 0.73 | 0.31 | 0.62 | 0.48 | 0.24 | 0.28 | 0.76 |
| R$_2$O + B$_2$O$_3$ (mol %) | 21.2 | 18.0 | 17.5 | 12.0 | 16.0 | 14.0 | 16.0 | 20.0 | 22.1 |
| SiO$_2$ + Al$_2$O$_3$ (mol %) | 71.1 | 72.8 | 72.8 | 74.5 | 71.0 | 74.5 | 75.3 | 72.5 | 75.8 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 47% | 53% | 54% | 40% | 44% | 49% | 47% | 53% | 41% |
| d | 2.71 | 2.51 | 2.49 | 2.54 | 2.61 | 2.53 | 2.52 | 2.49 | 2.48 |
| α (×10$^{-7}$/° C.) | 87 | 59 | 47 | 63 | 81 | 60 | 59 | 64 | 93 |
| E (GPa) | 59 | 67 | 66 | 75 | 68 | 72 | 68 | 65 | 52 |
| T$_g$ (° C.) | 540 | 576 | 588 | 624 | 567 | 618 | 568 | 531 | 557 |
| T$_2$ (° C.) | 1477 | 1522 | 1552 | 1538 | 1448 | 1556 | 1555 | 1503 | 1557 |
| T$_4$ (° C.) | 1098 | 1127 | 1163 | 1132 | 1060 | 1148 | 1114 | 1067 | 1111 |
| T$_L$ (° C.) | — | — | — | — | — | — | — | — | — |
| T$_4$ − T$_L$ (° C.) | — | — | — | — | — | — | — | — | — |
| Water resistance (mg) | 0.30 | 0.25 | — | 0.30 | 0.28 | 0.33 | 0.31 | 0.19 | 0.36 |
| Visible light transmittance T$_{VA}$ | ○ | ○ | ○ | ○ | ○ | ○ | ○ | ○ | ○ |
| Visible light transmittance T$_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance T$_{uv}$ measured value (%) | — | — | — | — | — | — | — | — | — |
| A × radio transmittance (area: 0.0009 m$^2$) | 0.0423 | 0.0478 | 0.0483 | 0.0350 | 0.0397 | 0.0439 | 0.0424 | 0.0474 | 0.0372 |
| Radio transmittance/t (thickness: 3.85 mm) | 12.2 | 13.8 | 14.0 | 10.1 | 11.4 | 12.7 | 12.2 | 13.7 | 10.7 |
| β-OH (mm$^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | Ex. 189 | Ex. 190 | Ex. 191 | Ex. 192 | Ex. 193 | Ex. 194 | Ex. 195 | Ex. 196 | Ex. 197 |
|---|---|---|---|---|---|---|---|---|---|
| Embodiment | 2 | 2 | 2 | 2 | 3 | 3 | 3 | 3 | 3 |
| SiO$_2$ (mol %) | 66.03 | 66.03 | 68.13 | 69.13 | 72.01 | 67.01 | 72.01 | 69.41 | 70.41 |
| Al$_2$O$_3$ (mol %) | 5.80 | 4.00 | 2.80 | 3.80 | 2.80 | 1.50 | 2.00 | 2.00 | 2.00 |
| B$_2$O$_3$ (mol %) | 12.00 | 9.00 | 7.00 | 6.00 | 6.00 | 10.00 | 5.00 | 7.00 | 7.00 |
| MgO (mol %) | 0.00 | 1.80 | 3.00 | 2.00 | 1.00 | 3.00 | 3.00 | 1.00 | 3.00 |
| CaO (mol %) | 0.00 | 0.00 | 0.00 | 5.00 | 0.00 | 6.56 | 5.56 | 5.73 | 0.00 |
| SrO (mol %) | 0.00 | 0.00 | 0.00 | 0.00 | 3.56 | 0.00 | 2.00 | 0.00 | 0.00 |
| BaO (mol %) | 0.00 | 0.00 | 0.00 | 0.00 | 2.00 | 0.00 | 0.00 | 0.00 | 3.71 |
| TiO$_2$ (mol %) | 0.05 | 0.05 | 0.05 | 0.05 | 0.04 | 0.04 | 0.04 | 0.04 | 0.04 |
| ZrO$_2$ (mol %) | 0.00 | 0.00 | 0.00 | 0.00 | 0.20 | 0.00 | 0.00 | 0.00 | 0.00 |
| Li$_2$O (mol %) | 0.00 | 0.00 | 0.00 | 0.00 | 0.00 | 0.00 | 0.00 | 0.00 | 0.00 |
| Na$_2$O (mol %) | 12.00 | 15.00 | 10.00 | 7.00 | 9.55 | 8.65 | 7.15 | 11.80 | 10.00 |
| K$_2$O (mol %) | 4.10 | 4.10 | 9.00 | 7.00 | 2.82 | 3.22 | 3.22 | 3.00 | 3.82 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 1.80 | 0.00 | 0.00 | 0.00 | 0.00 | 0.00 | 0.00 | 0.00 |
| FeO (mol %) | 16.10 | 19.10 | 3.00 | 7.00 | 6.56 | 9.56 | 10.56 | 6.73 | 6.71 |
| R$_2$O (mol %) | 40.6 | 33.4 | 19.00 | 14.00 | 12.37 | 11.87 | 10.37 | 14.80 | 13.82 |
| 7Al$_2$O$_3$ + 3MgO (mol %) | 40.6 | 33.4 | 28.6 | 32.6 | 22.6 | 19.5 | 23.0 | 17.0 | 23.0 |
| 7Al$_2$O$_3$ + 3MgO − 4Li$_2$O (mol %) | 88.0 | 91.0 | 28.6 | 32.6 | 22.6 | 19.5 | 23.0 | 17.0 | 23.0 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | | | 93.0 | 94.0 | 93.8 | 90.0 | 95.0 | 93.0 | 93.0 |
| MgO + CaO | 0.0 | 1.8 | 3.0 | 7.0 | 1.0 | 9.6 | 8.6 | 6.7 | 3.0 |
| R$_2$O × MgO (mol %)$^2$ | 0.0 | 34.4 | 57.0 | 28.0 | 12.4 | 35.6 | 31.1 | 14.8 | 41.5 |
| Na$_2$O/R$_2$O | 0.75 | 0.79 | 0.53 | 0.50 | 0.77 | 0.73 | 0.69 | 0.80 | 0.72 |
| K$_2$O/R$_2$O | 0.25 | 0.21 | 0.47 | 0.50 | 0.23 | 0.27 | 0.31 | 0.20 | 0.28 |
| R$_2$O + B$_2$O$_3$ (mol %) | 28.1 | 28.1 | 26.0 | 20.0 | 18.4 | 21.9 | 15.4 | 21.8 | 20.8 |
| SiO$_2$ + Al$_2$O$_3$ (mol %) | 71.8 | 70.0 | 70.9 | 72.9 | 74.8 | 68.5 | 74.0 | 71.4 | 72.4 |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 44% | 31% | 56% | 47% | 44% | 56% | 42% | 40% | 48% |
| d | 2.48 | 2.48 | 2.46 | 2.48 | 2.58 | 2.51 | 2.52 | 2.49 | 2.57 |
| α (×10$^{-7}$/° C.) | 78 | 94 | 99 | 84 | 78 | 76 | 73 | 86 | 84 |
| E (GPa) | 58 | 61 | 57 | 64 | 66 | 65 | 70 | 64 | 63 |
| T$_g$ (° C.) | 461 | 440 | 454 | 525 | 505 | 479 | 542 | 477 | 468 |
| T$_2$ (° C.) | 1477 | 1436 | 1438 | 1496 | 1495 | 1386 | 1510 | 1417 | 1460 |
| T$_4$ (° C.) | 1012 | 972 | 990 | 1056 | 1023 | 969 | 1062 | 977 | 985 |
| T$_L$ (° C.) | — | — | — | — | — | — | — | — | — |
| T$_4$ − T$_L$ (° C.) | — | — | — | — | — | — | — | — | — |
| Water resistance (mg) | 0.04 | 0.02 | 0.26 | 0.24 | 0.28 | 0.31 | 0.34 | 0.23 | 0.28 |

TABLE 1-continued

| | Ex. 198 | Ex. 199 | Ex. 200 | Ex. 201 | Ex. 202 | Ex. 203 | Ex. 204 | Ex. 205 | Ex. 206 |
|---|---|---|---|---|---|---|---|---|---|
| Visible light transmittance $T_{VA}$ | ◯ | ◯ | ◯ | ◯ | ◯ | ◯ | ◯ | ◯ | ◯ |
| Visible light transmittance $T_{VA}$ measured value (%) | — | — | — | — | — | — | — | — | — |
| Solar direct transmittance Te | ◯ | ◯ | ◯ | ◯ | ◯ | ◯ | ◯ | ◯ | ◯ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m$^2$) | 0.0398 | 0.0283 | 0.0505 | 0.0421 | 0.0394 | 0.0499 | 0.0381 | 0.0351 | 0.0398 |
| Radio transmittance/t (thickness: 3.85 mm) | 11.5 | 8.2 | 14.6 | 12.1 | 11.4 | 14.4 | 11.0 | 10.1 | 11.5 |
| β-OH (mm$^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 3 | 7 | 7 | 7 | 7 | 7 | 7 | 7 | 7 |
| SiO$_2$ (mol %) | 70.71 | 67.03 | 67.93 | 67.93 | 67.93 | 66.93 | 65.93 | 65.93 | 60.93 |
| Al$_2$O$_3$ (mol %) | 3.00 | 1.90 | 3.00 | 2.00 | 3.00 | 3.00 | 3.00 | 3.00 | 8.70 |
| B$_2$O$_3$ (mol %) | 6.50 | 4.00 | 3.00 | 3.00 | 3.00 | 4.00 | 5.00 | 7.00 | 7.00 |
| MgO (mol %) | 0.20 | 1.50 | 1.50 | 12.00 | 8.00 | 6.00 | 1.50 | 1.50 | 1.50 |
| CaO (mol %) | 10.71 | 8.00 | 5.00 | 3.00 | 6.00 | 6.50 | 2.00 | 6.00 | 6.00 |
| SrO (mol %) | 0.00 | 2.00 | 6.00 | 0.00 | 0.00 | 0.00 | 8.00 | 0.00 | 0.00 |
| BaO (mol %) | 0.00 | 1.00 | 0.00 | 0.00 | 0.00 | 0.00 | 1.00 | 1.00 | 0.00 |
| TiO$_2$ (mol %) | 0.04 | 0.05 | 0.05 | 0.05 | 0.05 | 0.05 | 0.05 | 0.05 | 0.05 |
| ZrO$_2$ (mol %) | 0.00 | 0.00 | 0.00 | 0.00 | 0.00 | 0.00 | 0.00 | 0.00 | 0.00 |
| Li$_2$O (mol %) | 0.00 | 1.50 | 1.00 | 4.00 | 4.00 | 4.50 | 1.00 | 2.00 | 13.50 |
| Na$_2$O (mol %) | 5.00 | 7.00 | 6.50 | 4.00 | 4.00 | 4.50 | 0.50 | 11.50 | 1.30 |
| K$_2$O (mol %) | 3.82 | 6.00 | 6.00 | 4.00 | 4.00 | 4.50 | 12.00 | 2.00 | 1.00 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr$_2$O$_3$ (mol %) | 0.00 | 0.00 | 0.00 | 0.00 | 0.00 | 0.00 | 0.00 | 0.00 | 0.00 |
| SnO$_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| RO (mol %) | 10.91 | 12.50 | 12.50 | 15.00 | 14.00 | 12.50 | 12.50 | 8.50 | 7.50 |
| R$_2$O (mol %) | 8.82 | 14.50 | 13.50 | 12.00 | 12.00 | 13.50 | 13.50 | 15.50 | 15.80 |
| 7Al$_2$O$_3$ + 3MgO (mol %) | 21.6 | 17.8 | 25.5 | 50.0 | 45.0 | 39.0 | 25.5 | 25.5 | 65.4 |
| 7Al$_2$O$_3$ + 3MgO − 4Li$_2$O (mol %) | 21.6 | 11.8 | 21.5 | 34.0 | 29.0 | 21.0 | 21.5 | 17.5 | 11.4 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 93.5 | 96.0 | 97.0 | 97.0 | 97.0 | 96.0 | 95.0 | 93.0 | 93.0 |
| MgO + CaO (mol %) | 10.9 | 9.5 | 6.5 | 15.0 | 14.0 | 12.5 | 3.5 | 7.5 | 7.5 |
| R$_2$O × MgO (mol %)$^2$ | 1.8 | 21.8 | 20.3 | 144.0 | 96.0 | 81.0 | 20.3 | 23.3 | 23.7 |
| Na$_2$O/R$_2$O | 0.57 | 0.48 | 0.48 | 0.33 | 0.33 | 0.33 | 0.04 | 0.74 | 0.08 |
| K$_2$O/R$_2$O | 0.43 | 0.41 | 0.44 | 0.33 | 0.33 | 0.33 | 0.89 | 0.13 | 0.06 |
| R$_2$O + B$_2$O$_3$ (mol %) | 15.3 | 18.5 | 16.5 | 15.0 | 15.0 | 17.5 | 18.5 | 22.5 | 22.8 |
| SiO$_2$ + Al$_2$O$_3$ (mol %) | 73.7 | 68.9 | 70.9 | 69.9 | 70.9 | 69.9 | 68.9 | 68.9 | 69.6 |

TABLE 1-continued

| | Ex. 207 | Ex. 208 | Ex. 209 | Ex. 210 | Ex. 211 | Ex. 212 | Ex. 213 | Ex. 214 | Ex. 215 |
|---|---|---|---|---|---|---|---|---|---|
| Embodiment | 7 | 7 | 7 | 7 | 7 | 7 | 7 | 7 | 7 |
| SiO$_2$ (mol %) | 60.93 | 64.63 | 65.93 | 65.93 | 65.93 | 60.93 | 66.03 | 66.03 | 66.53 |
| Al$_2$O$_3$ (mol %) | 8.70 | 6.00 | 6.00 | 5.00 | 5.00 | 8.70 | 8.50 | 6.50 | 4.00 |
| B$_2$O$_3$ (mol %) | 7.00 | 5.00 | 2.00 | 0.50 | 1.00 | 7.00 | 6.00 | 6.00 | 8.00 |
| MgO (mol %) | 1.50 | 1.50 | 3.00 | 3.00 | 3.00 | 5.00 | 4.30 | 4.30 | 4.80 |
| CaO (mol %) | 6.00 | 8.00 | 8.00 | 9.50 | 10.00 | 0.50 | 6.10 | 6.60 | 6.10 |
| SrO (mol %) | 0.00 | 0.00 | 0.00 | 0.00 | 0.00 | 0.00 | 0.00 | 0.00 | 0.00 |
| BaO (mol %) | 0.05 | 0.05 | 0.05 | 0.05 | 0.05 | 0.05 | 0.05 | 0.05 | 0.50 |
| TiO$_2$ (mol %) | 0.00 | 0.00 | 0.00 | 1.00 | 0.00 | 0.00 | 0.00 | 0.05 | 0.05 |
| ZrO$_2$ (mol %) | 0.00 | 0.00 | 0.00 | 0.00 | 0.00 | 0.00 | 0.00 | 1.50 | 0.00 |
| Li$_2$O (mol %) | 11.50 | 7.50 | 5.00 | 5.00 | 5.00 | 14.30 | 2.00 | 2.00 | 3.00 |
| Na$_2$O (mol %) | 2.30 | 4.30 | 5.00 | 5.00 | 5.00 | 0.50 | 3.40 | 3.40 | 3.40 |
| K$_2$O (mol %) | 2.00 | 3.00 | 5.00 | 5.00 | 5.00 | 2.00 | 3.60 | 3.60 | 3.60 |
| Fe$_2$O$_3$ (mol %) | 0.02 | 0.02 | 0.02 | 0.02 | 0.02 | 0.02 | 0.02 | 0.02 | 0.02 |
| CeO$_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 46% | 46% | 41% | 39% | 38% | 41% | 32% | 41% | 41% |
| d | 2.50 | 2.59 | 2.63 | 2.47 | 2.48 | 2.49 | 2.67 | 2.54 | 2.49 |
| α (×10$^{-7}$/° C.) | 68 | 94 | 92 | 76 | 76 | 81 | 91 | 87 | 72 |
| E (GPa) | 69 | 70 | 71 | 78 | 78 | 76 | 59 | 69 | 84 |
| T$_g$ (° C.) | 565 | 483 | 519 | 509 | 514 | 486 | 522 | 452 | 429 |
| T$_2$ (° C.) | 1506 | 1366 | 1423 | 1432 | 1458 | 1415 | 1367 | 1381 | 1290 |
| T$_4$ (° C.) | 1082 | 965 | 1016 | 1016 | 1039 | 1004 | 1032 | 940 | 899 |
| T$_L$ (° C.) | — | — | — | — | — | — | — | — | — |
| T$_4$ − T$_L$ (° C.) | — | — | — | — | — | — | — | — | — |
| Water resistance (mg) | 0.30 | 0.26 | 0.25 | 0.22 | 0.13 | 0.17 | 0.17 | 0.18 | 0.25 |
| Visible light transmittance T$_{VA}$ | ○ | ○ | ○ | ○ | ○ | ○ | ○ | ○ | ○ |
| Visible light transmittance T$_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance T$_{uv}$ measured value (%) | — | — | — | — | — | — | — | — | — |
| A × radio transmittance (area: 0.0009 m$^2$) | 0.0412 | 0.0411 | 0.0372 | 0.0350 | 0.0344 | 0.0372 | 0.0286 | 0.0366 | 0.0372 |
| Radio transmittance/t (thickness: 3.85 mm) | 11.9 | 11.9 | 10.7 | 10.1 | 9.9 | 10.7 | 8.2 | 10.6 | 10.7 |
| β-OH (mm$^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| Frequency at maximum radio transmitted amount at 75 to 90 GHz of laminated glass (GHz) | — | — | — | — | — | — | — | — | — |
| of laminated glass (dB) | — | — | — | — | — | — | — | — | — |

TABLE 1-continued

| | | | | | | | |
|---|---|---|---|---|---|---|---|
| SnO₂ (mol %) | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 |
| ZnO (mol %) | 0.00 | 0.00 | 0.00 | 0.00 | 1.00 | 0.00 | 0.00 |
| RO (mol %) | 7.50 | 9.50 | 11.00 | 12.50 | 13.00 | 5.50 | 10.40 | 10.90 | 11.40 |
| R₂O (mol %) | 15.80 | 14.80 | 15.00 | 15.00 | 15.00 | 16.80 | 9.00 | 9.00 | 10.00 |
| 7Al₂O₃ + 3MgO (mol %) | 65.4 | 46.5 | 51.0 | 44.0 | 44.0 | 75.9 | 72.4 | 58.4 | 42.4 |
| 7Al₂O₃ + 3MgO − 4Li₂O (mol %) | 19.4 | 16.5 | 31.0 | 24.0 | 24.0 | 18.7 | 64.4 | 50.4 | 30.4 |
| SiO2 + Al₂O₃ + MgO + CaO + SrO + BaO + Li₂O + Na₂O + K₂O + Fe₂O₃ + TiO₂ (mol %) | 93.0 | 95.0 | 98.0 | 98.5 | 99.0 | 92.0 | 94.0 | 92.5 | 92.0 |
| MgO + CaO (mol %) | 7.5 | 9.5 | 11.0 | 12.5 | 13.0 | 5.5 | 10.4 | 10.9 | 10.9 |
| R₂O × MgO (mol %)² | 23.7 | 22.2 | 45.0 | 45.0 | 45.0 | 84.0 | 38.7 | 38.7 | 48.0 |
| Na₂O/R₂O | 0.15 | 0.29 | 0.33 | 0.33 | 0.33 | 0.03 | 0.38 | 0.38 | 0.34 |
| K₂O/R₂O | 0.13 | 0.20 | 0.33 | 0.33 | 0.33 | 0.12 | 0.40 | 0.40 | 0.36 |
| R₂O + B₂O₃ (mol %) | 22.8 | 19.8 | 17.0 | 15.5 | 16.0 | 23.8 | 15.0 | 15.0 | 18.0 |
| SiO₂ + Al₂O₃ (mol %) | 69.6 | 70.6 | 71.9 | 70.9 | 70.9 | 69.6 | 74.5 | 72.5 | 70.5 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 44% | 43% | 37% | 33% | 35% | 41% | 41% | 47% | 48% |
| d | 2.49 | 2.50 | 2.49 | 2.53 | 2.50 | 2.46 | 2.49 | 2.53 | 2.51 |
| α (×10⁻⁷/° C.) | 74 | 78 | 86 | 87 | 89 | 72 | 63 | 60 | 65 |
| E (GPa) | 81 | 78 | 77 | 80 | 79 | 83 | 74 | 75 | 72 |
| T_g (° C.) | 432 | 462 | 510 | 531 | 513 | 431 | 584 | 586 | 498 |
| T₂ (° C.) | 1310 | 1388 | 1455 | 1460 | 1425 | 1305 | 1569 | 1560 | 1446 |
| T₄ (° C.) | 927 | 980 | 1045 | 1046 | 1022 | 909 | 1168 | 1151 | 1040 |
| T_L (° C.) | — | — | — | — | — | — | — | — | — |
| T₄ − T_L (° C.) | — | — | — | — | — | — | — | — | — |
| Water resistance (mg) | 0.23 | 0.21 | 0.12 | 0.15 | 0.15 | 0.02 | 0.05 | 0.03 | 0.11 |
| Visible light transmittance T_V4 | ○ | ○ | ○ | ○ | ○ | ○ | ○ | ○ | ○ |
| Visible light transmittance T_V4 measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance T_uv measured value (%) | — | — | — | — | — | — | — | — | — |
| A × radio transmittance (area: 0.0009 m²) | 0.0395 | 0.0385 | 0.0329 | 0.0296 | 0.0316 | 0.0367 | 0.0372 | 0.0427 | 0.0432 |
| Radio transmittance/t (thickness: 3.85 mm) | 11.4 | 11.1 | 9.5 | 8.5 | 9.1 | 10.6 | 10.7 | 12.3 | 12.5 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | Ex. 216 | Ex. 217 | Ex. 218 | Ex. 219 | Ex. 220 | Ex. 221 | Ex. 222 | Ex. 223 | Ex. 224 |
|---|---|---|---|---|---|---|---|---|---|
| Embodiment | 7 | 7 | 7 | 8 | 8 | 8 | 8 | 8 | 8 |
| $SiO_2$ (mol %) | 67.53 | 62.53 | 62.53 | 66.00 | 66.00 | 66.30 | 66.33 | 66.43 | 67.30 |
| $Al_2O_3$ (mol %) | 4.00 | 7.00 | 5.00 | 2.95 | 3.95 | 4.15 | 7.50 | 5.00 | 5.00 |
| $B_2O_3$ (mol %) | 10.00 | 12.00 | 9.00 | 8.00 | 6.00 | 4.00 | 2.00 | 1.00 | 3.00 |
| MgO (mol %) | 2.80 | 2.80 | 1.00 | 0.50 | 0.50 | 2.98 | 0.10 | 2.00 | 0.10 |
| CaO (mol %) | 6.10 | 2.10 | 1.00 | 6.98 | 7.98 | 5.00 | 8.00 | 5.00 | 5.00 |
| SrO (mol %) | 0.00 | 4.00 | 9.50 | 0.00 | 0.00 | 0.00 | 0.00 | 2.00 | 3.33 |
| BaO (mol %) | 0.00 | 0.00 | 0.00 | 0.00 | 0.00 | 0.50 | 0.00 | 1.00 | 0.00 |
| $TiO_2$ (mol %) | 0.05 | 0.05 | 0.05 | 0.05 | 0.05 | 0.05 | 0.05 | 0.05 | 0.05 |
| $ZrO_2$ (mol %) | 0.00 | 0.00 | 0.50 | 0.00 | 0.00 | 0.00 | 0.00 | 0.00 | 0.50 |
| $Li_2O$ (mol %) | 5.00 | 5.00 | 5.00 | 4.40 | 5.17 | 9.50 | 11.00 | 8.00 | 8.80 |
| $Na_2O$ (mol %) | 1.40 | 1.40 | 2.00 | 2.17 | 7.17 | 5.60 | 2.50 | 6.50 | 5.20 |
| $K_2O$ (mol %) | 3.10 | 3.10 | 4.40 | 8.94 | 3.16 | 1.90 | 2.50 | 3.00 | 1.70 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 | 0.00 | 0.00 |
| $R_2O$ (mol %) | 8.90 | 8.90 | 11.50 | 7.48 | 8.48 | 8.48 | 8.10 | 10.00 | 8.43 |
| RO (mol %) | 9.50 | 9.50 | 11.40 | 15.51 | 15.50 | 17.00 | 16.00 | 17.50 | 15.70 |
| $7Al_2O_3 + 3MgO$ (mol %) | 36.4 | 57.4 | 38.0 | 22.2 | 29.2 | 38.0 | 52.8 | 41.0 | 35.3 |
| $7Al_2O_3 + 3MgO - 4Li_2O$ (mol %) | 16.4 | 37.4 | 18.0 | 4.6 | 8.5 | 0.0 | 8.8 | 9.0 | 0.1 |
| $SiO2 + Al_2O_3 + MgO + CaO + SrO + BaO + Li_2O + Na_2O + K_2O + Fe_2O_3 + TiO_2$ (mol %) | 90.0 | 88.0 | 90.5 | 92.0 | 94.0 | 96.0 | 98.0 | 99.0 | 96.5 |
| MgO + CaO | 8.9 | 4.9 | 2.0 | 7.5 | 8.5 | 8.0 | 8.1 | 7.0 | 5.1 |
| $R_2O \times MgO$ (mol %)$^2$ | 26.6 | 26.6 | 11.4 | 7.8 | 7.8 | 50.7 | 1.6 | 35.0 | 1.6 |
| $Na_2O/R_2O$ | 0.15 | 0.15 | 0.18 | 0.14 | 0.46 | 0.33 | 0.16 | 0.37 | 0.33 |
| $K_2O/R_2O$ | 0.33 | 0.33 | 0.39 | 0.58 | 0.20 | 0.11 | 0.16 | 0.17 | 0.11 |
| $R_2O + B_2O_3$ (mol %) | 19.5 | 21.5 | 20.4 | 23.5 | 21.5 | 21.0 | 18.0 | 18.5 | 18.7 |
| $SiO_2 + Al_2O_3$ (mol %) | 71.5 | 69.5 | 67.5 | 69.0 | 70.0 | 70.5 | 73.8 | 71.4 | 72.3 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 46% | 48% | 50% | 45% | 48% | 44% | 37% | 38% | 40% |
| d | 2.49 | 2.60 | 2.73 | 2.50 | 2.50 | 2.49 | 2.48 | 2.56 | 2.58 |
| α ($\times 10^{-7}$/° C.) | 57 | 58 | 73 | 84 | 83 | 82 | 79 | 92 | 80 |
| E (GPa) | 71 | 70 | 72 | 63 | 73 | 81 | 84 | 81 | 83 |
| $T_g$ (° C.) | 465 | 465 | 461 | 447 | 449 | 435 | 478 | 462 | 468 |
| $T_2$ (° C.) | 1449 | 1376 | 1317 | 1340 | 1373 | 1382 | 1449 | 1406 | 1423 |
| $T_4$ (° C.) | 1040 | 1041 | 991 | 970 | 951 | 932 | 1020 | 965 | 984 |
| $T_L$ (° C.) | — | — | — | — | — | — | — | — | — |
| $T_4 - T_L$ (° C.) | — | — | — | — | — | — | — | — | — |
| Water resistance (mg) | 0.17 | 0.12 | 0.22 | 0.23 | 0.22 | 0.18 | 0.40 | 0.18 | 0.29 |

TABLE 1-continued

| | Ex. 225 | Ex. 226 | Ex. 227 | Ex. 228 | Ex. 229 | Ex. 230 | Ex. 231 | Ex. 232 | Ex. 233 |
|---|---|---|---|---|---|---|---|---|---|
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0413 | 0.0433 | 0.0449 | 0.0402 | 0.0432 | 0.0387 | 0.0331 | 0.0343 | 0.0358 |
| Radio transmittance/t (thickness: 3.85 mm) | 11.9 | 12.5 | 13.0 | 11.6 | 12.5 | 11.2 | 9.5 | 9.9 | 10.3 |
| β-OH (mm⁻¹) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount | — | — | — | — | — | — | — | — | — |
| at 75 to 90 GHz of laminated glass (dB) | — | — | — | — | — | — | — | — | — |
| Frequency at maximum radio transmitted amount of laminated glass (GHz) | — | — | — | — | — | — | — | — | — |
| Embodiment | 8 | 8 | 8 | 9 | 9 | 9 | 9 | 9 | 9 |
| $SiO_2$ (mol %) | 67.30 | 70.30 | 70.30 | 69.95 | 69.95 | 69.95 | 65.93 | 67.85 | 69.95 |
| $Al_2O_3$ (mol %) | 4.00 | 1.45 | 2.00 | 2.00 | 1.00 | 3.50 | 1.00 | 0.80 | 1.00 |
| $B_2O_3$ (mol %) | 3.00 | 10.00 | 5.00 | 3.00 | 5.00 | 8.00 | 6.00 | 7.00 | 4.00 |
| MgO (mol %) | 1.00 | 3.48 | 4.13 | 0.50 | 0.50 | 0.50 | 0.00 | 0.20 | 7.98 |
| CaO (mol %) | 5.00 | 2.00 | 5.00 | 10.48 | 7.48 | 0.00 | 3.50 | 4.38 | 0.00 |
| SrO (mol %) | 3.33 | 3.00 | 0.00 | 0.00 | 0.00 | 2.48 | 3.00 | 6.20 | 0.00 |
| BaO (mol %) | 0.00 | 0.05 | 0.05 | 0.05 | 1.00 | 0.00 | 7.00 | 0.00 | 1.00 |
| $TiO_2$ (mol %) | 0.05 | 0.05 | 0.05 | 0.05 | 0.05 | 0.05 | 0.05 | 0.05 | 0.05 |
| $ZrO_2$ (mol %) | 0.50 | 0.00 | 0.00 | 0.00 | 0.00 | 0.00 | 0.00 | 0.00 | 0.00 |
| $Li_2O$ (mol %) | 9.50 | 4.50 | 4.50 | 8.00 | 10.00 | 11.00 | 4.50 | 6.00 | 11.00 |
| $Na_2O$ (mol %) | 4.00 | 1.00 | 4.50 | 3.00 | 2.00 | 2.00 | 4.50 | 3.00 | 2.00 |
| $K_2O$ (mol %) | 2.30 | 4.20 | 4.50 | 3.00 | 3.00 | 2.00 | 4.50 | 1.50 | 3.00 |
| $Fe_2O_3$ (mol %) | 0.02 | 0.02 | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 | 0.00 | 0.00 |
| ZnO (mol %) | 0.00 | 0.00 | 0.00 | 0.00 | 0.00 | 0.50 | 0.00 | 3.00 | 0.00 |
| RO (mol %) | 9.33 | 8.48 | 9.13 | 10.98 | 8.98 | 2.98 | 13.50 | 10.78 | 8.98 |
| $R_2O$ (mol %) | 15.80 | 9.70 | 13.50 | 14.00 | 15.00 | 15.00 | 13.50 | 10.50 | 16.00 |
| $7Al_2O_3 + 3MgO$ (mol %) | 31.0 | 20.6 | 26.4 | 15.5 | 8.5 | 26.0 | 7.0 | 6.2 | 30.9 |
| $7Al_2O_3 + 3MgO − 4Li_2O$ (mol %) | −7.0 | 2.6 | 8.4 | −16.5 | −31.5 | −18.0 | −11.0 | −17.8 | −13.1 |
| $SiO_2 + Al_2O_3 + MgO + CaO + SrO + BaO + Li_2O +$ | 96.5 | 90.0 | 95.0 | 97.0 | 95.0 | 91.5 | 94.0 | 90.0 | 96.0 |
| $Na_2O + K_2O + Fe_2O_3 + TiO_2$ (mol %) | 6.0 | 5.5 | 9.1 | 11.0 | 8.0 | 0.5 | 3.5 | 4.6 | 8.0 |
| MgO + CaO (mol %) | 15.8 | 33.8 | 55.8 | 7.0 | 7.5 | 7.5 | 0.0 | 2.1 | 127.7 |
| $R_2O × MgO$ (mol %)² | 0.25 | 0.10 | 0.33 | 0.21 | 0.13 | 0.13 | 0.33 | 0.29 | 0.13 |
| $Na_2O/R_2O$ | 0.15 | 0.43 | 0.33 | 0.21 | 0.20 | 0.13 | 0.33 | 0.14 | 0.19 |
| $K_2O/R_2O$ | 18.8 | 19.7 | 18.5 | 17.0 | 20.0 | 23.0 | 19.5 | 17.5 | 20.0 |
| $R_2O + B_2O_3$ (mol %) | 71.3 | 71.8 | 72.3 | 72.0 | 71.0 | 73.5 | 66.9 | 68.7 | 71.0 |
| $SiO_2 + Al_2O_3$ (mol %) | | | | | | | | | |

TABLE 1-continued

| | Ex. 234 | Ex. 235 | Ex. 236 | Ex. 237 | Ex. 238 | Ex. 239 | Ex. 240 | Ex. 241 | Ex. 242 |
|---|---|---|---|---|---|---|---|---|---|
| Embodiment | 9 | 9 | 9 | 9 | 9 | 9 | 9 | 10 | 10 |
| $SiO_2$ (mol %) | 69.95 | 67.95 | 65.75 | 73.75 | 65.75 | 65.75 | 66.75 | 72.38 | 72.00 |
| $Al_2O_3$ (mol %) | 1.20 | 3.00 | 5.00 | 0.60 | 3.00 | 5.50 | 4.50 | 0.00 | 0.80 |
| $B_2O_3$ (mol %) | 4.00 | 4.00 | 10.00 | 10.00 | 5.00 | 2.00 | 2.00 | 2.00 | 2.00 |
| MgO (mol %) | 5.00 | 1.50 | 0.20 | 0.00 | 0.00 | 0.50 | 0.10 | 0.10 | 3.00 |
| CaO (mol %) | 1.28 | 4.00 | 4.48 | 0.00 | 5.00 | 2.00 | 1.90 | 3.06 | 4.14 |
| SrO (mol %) | 1.00 | 0.00 | 0.00 | 2.28 | 0.00 | 0.00 | 0.00 | 3.50 | 0.00 |
| BaO (mol %) | 1.00 | 0.48 | 0.00 | 2.30 | 3.18 | 4.18 | 5.18 | 1.00 | 0.00 |
| $TiO_2$ (mol %) | 0.05 | 0.05 | 0.05 | 0.05 | 0.05 | 0.05 | 0.05 | 0.04 | 0.04 |
| $ZrO_2$ (mol %) | 0.00 | 0.00 | 0.00 | 0.00 | 0.00 | 1.00 | 0.50 | 2.00 | 1.00 |
| $Li_2O$ (mol %) | 8.50 | 9.00 | 14.50 | 4.00 | 16.00 | 15.00 | 13.00 | 0.00 | 0.00 |
| $Na_2O$ (mol %) | 4.00 | 5.00 | 0.00 | 2.00 | 0.50 | 2.00 | 3.00 | 7.50 | 8.50 |
| $K_2O$ (mol %) | 4.00 | 5.00 | 0.00 | 5.00 | 1.50 | 2.00 | 3.00 | 7.50 | 8.50 |
| $Fe_2O_3$ (mol %) | 0.02 | 0.02 | 0.02 | 0.02 | 0.02 | 0.02 | 0.02 | 0.42 | 0.02 |
| $CeO_2$ (mol %) | 0.00 | 0.00 | 0.00 | 0.00 | 0.00 | 0.00 | 0.00 | 0.00 | 0.00 |
| $Cr_2O_3$ (mol %) | 0.00 | 0.00 | 0.00 | 0.00 | 0.00 | 0.00 | 0.00 | 0.00 | 0.00 |
| FeO (mol %) | — | — | — | — | — | — | — | — | — |
| Fe-Redox (%) | — | — | — | — | — | — | — | — | — |
| Exponential approximation formula of relation between frequency and radio transmittance (as calculated as 18 mm thickness) constant 1 | — | — | — | — | — | — | — | — | — |
| Exponential approximation formula of relation between frequency and radio transmittance (as calculated as 18 mm thickness) constant 2 | — | — | — | — | — | — | — | — | — |
| Radio transmittance with 18 mm thickness at 100 GHz | 41% | 47% | 45% | 38% | 42% | 49% | 53% | 47% | 44% |
| d | 2.58 | 2.53 | 2.46 | 2.49 | 2.50 | 2.50 | 2.77 | 2.65 | 2.47 |
| α (×$10^{-7}$/° C.) | 81 | 60 | 77 | 79 | 77 | 66 | 93 | 72 | 76 |
| E (GPa) | 82 | 69 | 73 | 80 | 78 | 73 | 70 | 79 | 81 |
| $T_g$ (° C.) | 457 | 451 | 471 | 463 | 416 | 413 | 402 | 433 | 429 |
| $T_2$ (° C.) | 1401 | 1460 | 1465 | 1420 | 1386 | 1463 | 1265 | 1308 | 1435 |
| $T_4$ (° C.) | 965 | 1021 | 1023 | 999 | 949 | 984 | 867 | 918 | 950 |
| $T_L$ (° C.) | — | — | — | — | — | — | — | — | — |
| $T_4 - T_L$ (° C.) | — | — | — | — | — | — | — | — | — |
| Water resistance (mg) | 0.26 | 0.18 | 0.28 | 0.26 | 0.21 | 0.30 | 0.21 | 0.20 | 0.24 |
| Visible light transmittance $T_{VA}$ | ○ | ○ | ○ | ○ | ○ | ○ | ○ | ○ | ○ |
| Visible light transmittance $T_{VA}$ measured value (%) | — | — | — | — | — | — | — | — | — |
| Solar direct transmittance Te | ○ | ○ | ○ | ○ | ○ | ○ | ○ | ○ | ○ |
| Solar direct transmittance Te measured value (%) | — | — | — | — | — | — | — | — | — |
| Ultraviolet transmittance $T_{uv}$ measured value (%) | — | — | — | — | — | — | — | — | — |
| A × radio transmittance (area: 0.0009 m²) | 0.0373 | 0.0422 | 0.0404 | 0.0344 | 0.0380 | 0.0443 | 0.0476 | 0.0423 | 0.0400 |
| Radio transmittance/t (thickness: 3.85 mm) | 10.8 | 12.2 | 11.7 | 9.9 | 11.0 | 12.8 | 13.7 | 12.2 | 11.5 |
| β-OH ($mm^{-1}$) | — | — | — | — | — | — | — | — | — |
| Transmittance at wavelength 905 nm (%) | — | — | — | — | — | — | — | — | — |
| Transmittance at wavelength 1550 nm (%) | — | — | — | — | — | — | — | — | — |
| Maximum radio transmitted amount at 75 to 90 GHz of laminated glass (dB) | — | — | — | — | — | — | — | — | — |
| Frequency at maximum radio transmitted amount of laminated glass (GHz) | — | — | — | — | — | — | — | — | — |

TABLE 1-continued

| | | | | | | | |
|---|---|---|---|---|---|---|---|
| SnO$_2$ (mol %) | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 |
| ZnO (mol %) | 0.00 | 0.00 | 0.00 | 0.00 | 0.00 | 0.50 | 0.00 |
| RO (mol %) | 8.28 | 5.98 | 4.68 | 8.18 | 6.68 | 7.66 | 7.14 |
| R$_2$O (mol %) | 16.50 | 19.00 | 14.50 | 18.00 | 19.00 | 15.00 | 17.00 |
| 7Al$_2$O$_3$ + 3MgO (mol %) | 23.4 | 25.5 | 35.6 | 21.0 | 40.0 | 31.8 | 14.6 |
| 7Al$_2$O$_3$ + 3MgO − 4Li$_2$O (mol %) | −10.6 | −10.5 | −22.4 | −43.0 | −20.0 | −20.2 | 14.6 |
| SiO2 + Al$_2$O$_3$ + MgO + CaO + SrO + BaO + Li$_2$O + Na$_2$O + K$_2$O + Fe$_2$O$_3$ + TiO$_2$ (mol %) | 96.0 | 96.0 | 90.0 | 95.0 | 97.0 | 97.5 | 97.0 |
| MgO + CaO (mol %) | 6.3 | 5.5 | 4.7 | 5.0 | 2.5 | 2.0 | 7.1 |
| R$_2$O × MgO (mol %)$^2$ | 82.5 | 28.5 | 2.9 | 0.0 | 9.5 | 1.9 | 51.0 |
| Na$_2$O/R$_2$O | 0.24 | 0.26 | 0.00 | 0.03 | 0.11 | 0.16 | 0.50 |
| K$_2$O/R$_2$O | 0.24 | 0.26 | 0.00 | 0.08 | 0.11 | 0.16 | 0.50 |
| R$_2$O + B$_2$O$_3$ (mol %) | 20.5 | 23.0 | 24.5 | 23.0 | 21.0 | 21.0 | 19.0 |
| SiO$_2$ + Al$_2$O$_3$ (mol %) | 71.2 | 71.0 | 70.8 | 68.8 | 71.3 | 71.3 | 72.8 |
| FeO (mol %) | | | | | | | |
| Fe-Redox (%) | | | | | | | |
| Exponential approximation formula of relation between frequency and radio transmittance (as calculated as 18 mm thickness) constant 1 | | | | | | | |
| Exponential approximation formula of relation between frequency and radio transmittance (as calculated as 18 mm thickness) constant 2 | | | | | | | |
| Radio transmittance with 18 mm thickness at 100 GHz | 48% | 51% | 39% | 55% | 42% | 43% | 43% | 45% | 42% |
| d | | | | | | | |
| α (×10$^{-7}$/° C.) | 2.50 | 2.48 | 2.47 | 2.53 | 2.53 | 2.57 | 2.59 | 2.48 |
| E (GPa) | 84 | 91 | 58 | 66 | 84 | 90 | 96 | 100 |
| T$_g$ (° C.) | 77 | 74 | 81 | 64 | 88 | 83 | 70 | 66 |
| T$_2$ (° C.) | 422 | 416 | 396 | 430 | 448 | 425 | 520 | 514 |
| T$_4$ (° C.) | 1418 | 1381 | 1351 | 1507 | 1399 | 1384 | 1419 | 1457 |
| T$_L$ (° C.) | 954 | 933 | 908 | 1017 | 907 | 901 | 998 | 1025 |
| T$_4$ − T$_L$ (° C.) | | | | | | | |
| Water resistance (mg) | 0.30 | 0.25 | 0.31 | 0.24 | 0.40 | 0.36 | 0.30 | 0.41 |
| Visible light transmittance T$_{VA}$ | ○ | ○ | ○ | ○ | ○ | ○ | ○ | ○ |
| Visible light transmittance T$_{VA}$ measured value (%) | | | | | | | |
| Solar direct transmittance Te | ○ | ○ | ○ | ○ | ○ | ○ | ○ | ○ |
| Solar direct transmittance Te measured value (%) | | | | | | | |
| Ultraviolet transmittance T$_{uv}$ measured value (%) | | | | | | | |
| A × radio transmittance (area: 0.0009 m$^2$) | 0.0429 | 0.0461 | 0.0351 | 0.0492 | 0.0374 | 0.0387 | 0.0407 | 0.0385 | 0.0378 |
| Radio transmittance/t (thickness: 3.85 mm) | 12.4 | 13.3 | 10.1 | 14.2 | 10.8 | 11.2 | 11.7 | 11.1 | 10.9 |
| β-OH (mm$^{-1}$) | | | | | | | |
| Transmittance at wavelength 905 nm (%) | | | | | | | |
| Transmittance at wavelength 1550 nm (%) | | | | | | | |
| Maximum radio transmitted amount at 75 to 90 GHz of laminated glass (dB) | | | | | | | |
| Frequency at maximum radio transmitted amount of laminated glass (GHz) | | | | | | | |

TABLE 1-continued

| Embodiment | Ex. 243 | Ex. 244 | Ex. 245 | Ex. 246 | Ex. 247 | Ex. 248 | Ex. 249 |
|---|---|---|---|---|---|---|---|
| | 10 | 10 | 10 | 10 | 10 | 10 | 10 |
| $SiO_2$ (mol %) | 70.34 | 70.34 | 70.34 | 67.74 | 72.41 | 74.01 | 75.00 |
| $Al_2O_3$ (mol %) | 1.20 | 1.20 | 1.20 | 0.60 | 0.60 | 1.00 | 0.30 |
| $B_2O_3$ (mol %) | 0.00 | 1.00 | 0.50 | 10.00 | 4.00 | 7.00 | 5.00 |
| MgO (mol %) | 4.30 | 2.50 | 3.00 | 0.50 | 4.00 | 1.00 | 1.00 |
| CaO (mol %) | 4.30 | 0.00 | 9.10 | 15.10 | 6.56 | 5.76 | 5.76 |
| SrO (mol %) | 0.00 | 2.00 | 0.00 | 0.00 | 0.00 | 0.00 | 0.00 |
| BaO (mol %) | 4.30 | 6.60 | 0.00 | 0.00 | 0.00 | 0.00 | 8.88 |
| $TiO_2$ (mol %) | 0.04 | 0.04 | 0.04 | 0.04 | 0.04 | 0.04 | 0.04 |
| $ZrO_2$ (mol %) | 0.50 | 1.30 | 0.80 | 0.00 | 0.00 | 0.00 | 0.00 |
| $Li_2O$ (mol %) | 0.00 | 0.00 | 0.00 | 0.00 | 0.00 | 0.00 | 0.00 |
| $Na_2O$ (mol %) | 7.50 | 10.00 | 3.00 | 3.00 | 6.05 | 7.95 | 2.00 |
| $K_2O$ (mol %) | 7.50 | 5.00 | 12.00 | 3.00 | 6.32 | 3.22 | 2.00 |
| $Fe_2O_3$ (mol %) | 0.02 | 0.02 | 0.02 | 0.02 | 0.02 | 0.02 | 0.02 |
| $CeO_2$ (mol %) | 0.00 | 0.00 | 0.00 | 0.00 | 0.00 | 0.00 | 0.00 |
| Cr2O3 (mol %) | 0.00 | 0.00 | 0.00 | 0.00 | 0.00 | 0.00 | 0.00 |
| $SnO_2$ (mol %) | 0.00 | 0.00 | 0.00 | 0.00 | 0.00 | 0.00 | 0.00 |
| PbO (mol %) | 0.00 | 0.00 | 0.00 | 0.00 | 0.00 | 0.00 | 0.00 |
| ZnO (mol %) | 0.00 | 0.00 | 0.00 | 0.00 | 0.00 | 0.00 | 0.00 |
| RO (mol %) | 12.90 | 11.10 | 12.10 | 15.60 | 10.56 | 6.76 | 15.64 |
| $R_2O$ (mol %) | 15.00 | 15.00 | 15.00 | 6.00 | 12.37 | 11.17 | 4.00 |
| $7Al_2O_3 + 3MgO$ (mol %) | 21.3 | 15.9 | 17.4 | 5.7 | 16.2 | 10.0 | 5.1 |
| $7Al_2O_3 + 3MgO - 4Li_2O$ (mol %) | 21.3 | 15.9 | 17.4 | 5.7 | 16.2 | 10.0 | 5.1 |
| $SiO2 + Al_2O_3 + MgO + CaO + SrO + BaO + Li_2O +$ | 99.5 | 97.7 | 98.7 | 90.0 | 96.0 | 93.0 | 95.0 |
| $K_2O + B_2O_3 + Fe_2O_3 + TiO_2$ (mol %) | | | | | | | |
| MgO + CaO (mol %) | 8.6 | 2.5 | 12.1 | 15.6 | 10.6 | 6.8 | 6.8 |
| $R_2O \times MgO$ (mol %)$^2$ | 64.5 | 37.5 | 45.0 | 3.0 | 49.5 | 11.2 | 4.0 |
| $Na_2O/R_2O$ | 0.50 | 0.67 | 0.20 | 0.50 | 0.49 | 0.71 | 0.50 |
| $K_2O/R_2O$ | 0.50 | 0.33 | 0.80 | 0.50 | 0.51 | 0.29 | 0.50 |
| $R_2O + B_2O_3$ (mol %) | 15.0 | 16.0 | 15.5 | 16.0 | 16.4 | 18.2 | 9.0 |
| $SiO_2 + Al_2O_3$ (mol %) | 71.5 | 71.5 | 71.5 | 68.3 | 73.0 | 75.0 | 75.3 |
| FeO (mol %) | — | — | — | — | — | — | — |
| Fe-Redox (%) | — | — | — | — | — | — | — |
| Exponential approximation formula of relation between frequency and radio transmittance (as calculated as 18 mm thickness) constant 1 | — | — | — | — | — | — | — |
| Exponential approximation formula of relation between frequency and radio transmittance (as calculated as 18 mm thickness) constant 2 | — | — | — | — | — | — | — |
| Radio transmittance with 18 mm thickness at 100 GHz | 36% | 39% | 30% | 55% | 43% | 48% | 50% |
| d | — | — | — | — | — | — | — |
| $\alpha$ (×10$^{-7}$/° C.) | 2.61 | 2.66 | 2.50 | 2.55 | 2.47 | 2.46 | 2.78 |
| E (GPa) | 103 | 101 | 98 | 61 | 85 | 72 | 61 |
| $T_g$ (° C.) | 70 | 70 | 63 | 69 | 68 | 66 | 70 |
| $T_2$ (° C.) | 522 | 502 | 590 | 542 | 532 | 508 | 560 |
| $T_4$ (° C.) | 1458 | 1441 | 1474 | 1363 | 1488 | 1498 | 1572 |
| $T_L$ (° C.) | 1012 | 975 | 1070 | 1001 | 1047 | 1044 | 1066 |
| $T_4 - T_L$ (° C.) | — | — | — | — | — | — | — |
| Water resistance (mg) | 0.39 | 0.37 | 0.26 | 0.20 | 0.41 | 0.35 | 0.25 |
| Visible light transmittance $T_{VA}$ | ◯ | ◯ | ◯ | ◯ | ◯ | ◯ | ◯ |

TABLE 1-continued

| | | | | | |
|---|---|---|---|---|---|
| Visible light transmittance $T_{VA}$ measured value (%) | — | — | — | — | — | — |
| Solar direct transmittance Te | ○ | ○ | ○ | ○ | ○ | ○ |
| Solar direct transmittance Te measured value (%) | — | — | — | — | — | — |
| Ultraviolet transmittance $T_{uv}$ measured value (%) | — | — | — | — | — | — |
| A × radio transmittance (area: 0.0009 m²) | 0.0327 | 0.0357 | 0.0270 | 0.0493 | 0.0386 | 0.043 | 0.0449 |
| Radio transmittance/t (thickness: 3.85 mm) | 9.4 | 10.3 | 7.8 | 14.2 | 11.1 | 12.4 | 13 |
| β-OH (mm⁻¹) | — | — | — | — | — | — |
| Transmittance at wavelength 905 nm (%) | — | — | — | — | — | — |
| Transmittance at wavelength 1550 nm (%) | — | — | — | — | — | — |
| Maximum radio transmitted amount at 75 to 90 GHz of laminated glass (dB) | — | — | — | — | — | — |
| Frequency at maximum radio transmitted amount of laminated glass (GHz) | — | — | — | — | — | — |

[Studies on Calculation Model of Radio Transmittance]

Using the glass plate employed in Comparative Example 1 in Table 1, the difference between the transmittance of radio waves measured and the calculated model was confirmed. The measured value is one obtained by measurement by free space method using a 30 cm×30 cm glass plate. The calculation model of the free space method is a calculation model used in simulation by CST Microwave Studio 2016 electromagnetic simulator. The basic conditions of the simulation are as described in this specification. As a result of the studies, it was found that by adjusting the tan δ value input in the calculation model with precision to three decimal places, the calculation model in a high frequency band (for example at least 50 GHz) was optimized, and more accurate fitting to measured values with respect to the glass plates having different thicknesses (for example 5 mm and 10 mm) was achieved.

Using the optimized calculation model, the radio transmittance or the approximate transmittance with respect to Comparative Example (conventional glass plate) was determined, and compared with those in Examples 1 to 249. As a result, the glass in each Example had a radio transmittance at a frequency of 100 GHz as calculated as 18 mm thickness of at least 20%, and was found to be superior to that in Comparative Example. Further, it was found that both radio transmittance×A where A is 0.009 m$^2$ and radio transmittance/thickness t at a thickness of 3.85 mm were more excellent than in Comparative Example.

[Comparison of Radio Transmittance]

FIGS. 2A to 2D are graphs illustrating the electric field strength ratios of glass plates with 18 mm thickness in Comparative Example 1 and Examples 1 to 20. The black curve represents the electric field strength ratio in Comparative Example, the black dotted line represents the radio transmittance calculated by the exponential approximation of curve of the electric field strength ratio in Comparative Example (approximation into a function [radio transmittance]=[constant 1]×e$^{[constant2]\times[frequency]}$, that is, "exponential approximation of the relation between the frequency and the electric field strength ratio"). Likewise, gray curves respectively represent the electric field strength ratios in the respective Examples, and gray dotted lines represent ratio transmittances calculated by corresponding exponential approximation. The glass plates in Examples are found to generally have a high radio transmittance in GHz frequency band.

Figure 3A:
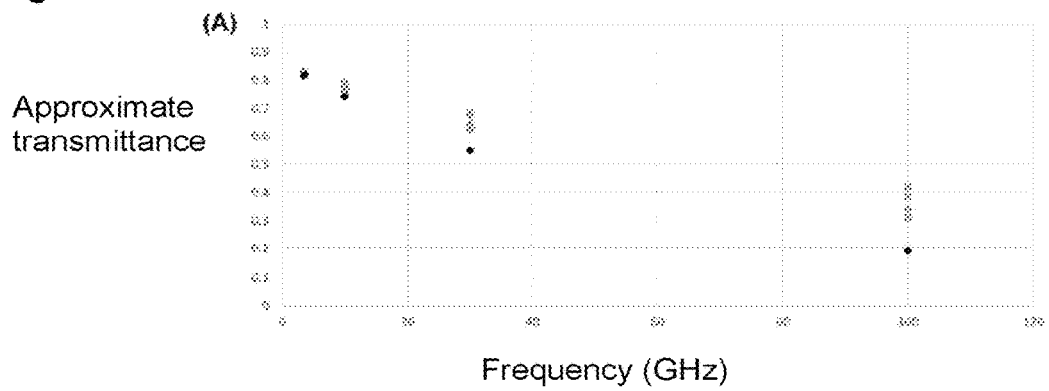
FIG. 3A is a graph illustrating the approximate transmittances in Comparative Example 1 and Examples 1 to 6.
Figure 3B:
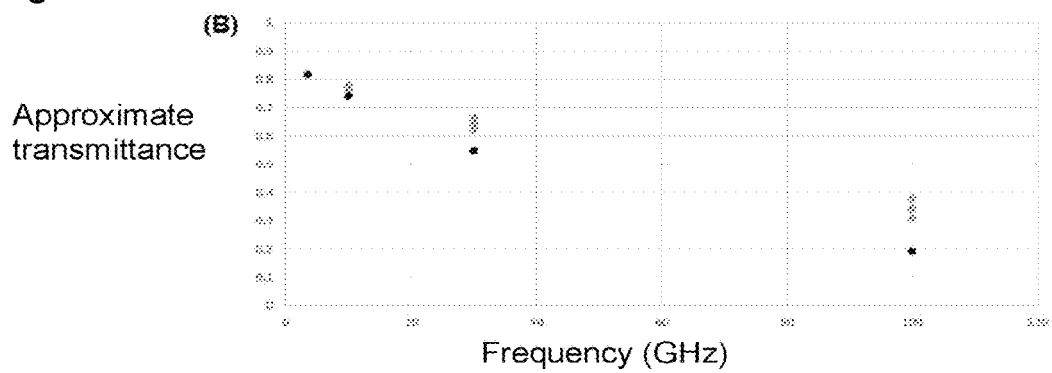
FIG. 3B is a graph illustrating the approximate transmittances in Comparative Example 1 and Examples 7 to 12.
Figure 3C:
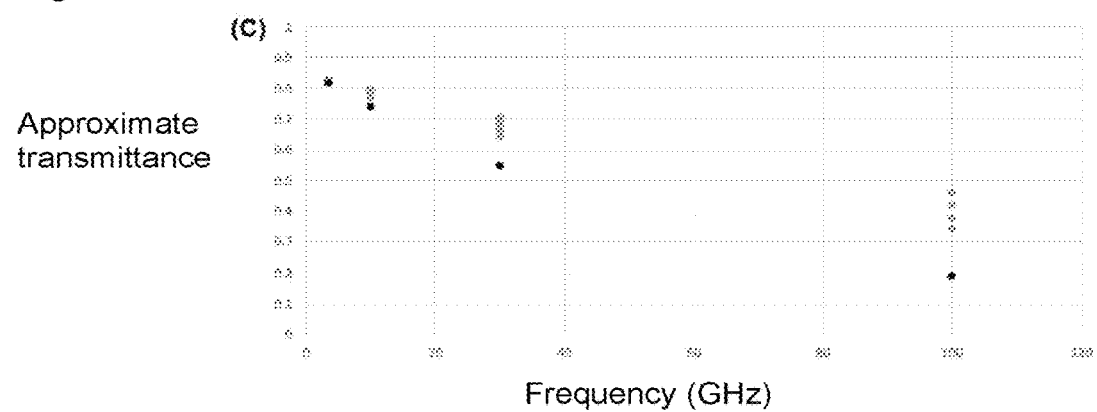
FIG. 3C is a graph illustrating the approximate transmittances in Comparative Example 1 and Examples 13 to 17.
Figure 3D:
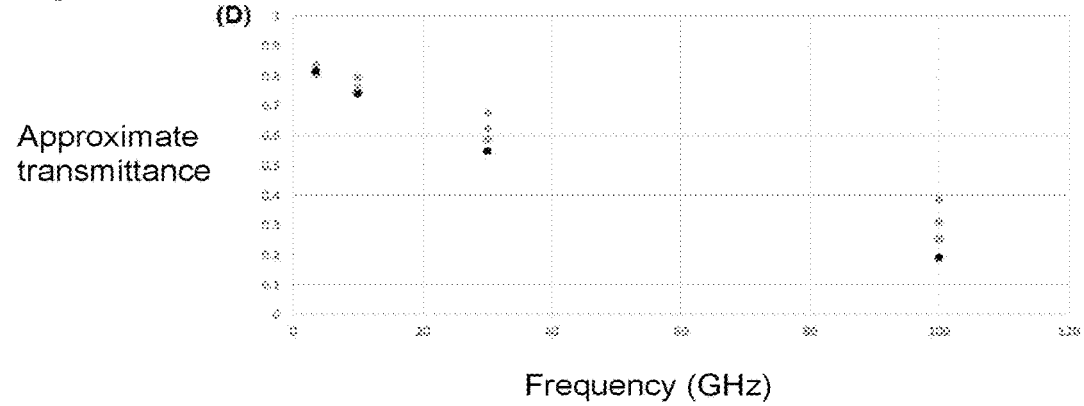
FIG. 3D is a graph illustrating the approximate transmittances in Comparative Example 1 and Examples 18 to 20.

FIGS. 3A to 3D are graphs illustrating the approximate transmittances calculated at representative frequencies based on the exponential approximation formula obtained in FIGS. 2A to 2D. FIG. 3A corresponds to FIG. 2A, FIG. 3B to FIG. 2B, FIG. 3C to FIG. 2C, and FIG. 3D to FIG. 2D, and represent the approximate transmittances in Comparative Example 1 and Examples 1 to 20. It is found that in each Example, remarkably improved radio transmission characteristics than in Comparative Example are obtained.

Further, the glass plates in Examples 21 to 249 have any of the composition ranges as described in the above ten embodiments, and thereby have a high radio transmittance.

Further, the dielectric loss tan δ at a frequency of 35 GHz was at least 0.001 and at most 0.019 with respect to the glass in Examples 5 to 7 and 17 to 20, at least 0.001 and at most 0.013 with respect to the glass in Examples 2, 4, 8 to 10, 12, 14, 16 and 21 to 23, and at least 0.001 and at most 0.011 with respect to the glass in Examples 1, 3, 11, 13, 15 and 24.

From the results in Examples 3, 4, 11 and 25, the laminated glass in each Example has a higher radio transmittance than the laminated glass in Comparative Example.

INDUSTRIAL APPLICABILITY

The glass plate of the present invention is widely applicable as a window material of a building and a vehicle in which use of a radio-utilizing apparatus such as a mobile phone or radar is assumed.

Further, the glass plate of the present invention is suitable as a glass plate for a radio communication apparatus employing radio waves at a high frequency of at least 1.0 GHz.

This application is a continuation of PCT Application No. PCT/JP2018/017236 filed on Apr. 27, 2018, which is based upon and claims the benefit of priorities from Japanese Patent Application No. 2017-090141 filed on Apr. 28, 2017 and Japanese Patent Application No. 2017-140687 filed on Jul. 20, 2017. The contents of those applications are incorporated herein by reference in their entireties.

REFERENCE SYMBOLS

10: frame, 20: opening, 20: wave source, 40: measurement point.

What is claimed is:

1. A glass plate, comprising:
a glass having a composition including $55 \leq SiO_2 \leq 73.56$, $1.44 \leq Al_2O_3 \leq 9$, $6.0 \leq B_2O_3 \leq 13$, $0 \leq MgO \leq 15$, $0 \leq CaO \leq 20$, $0 \leq SrO \leq 15$, $0 \leq BaO \leq 1$, $0.01 \leq Li_2O \leq 19.1$, $0 \leq Na_2O \leq 16$, $0.9 \leq K_2O \leq 16$, $0 \leq ZrO_2 \leq 2$, $0.001 \leq Fe_2O_3 \leq 5$, $0.001 \leq TiO_2 \leq 5$, $0 \leq PbO < 0.001$, and $0 \leq ZnO \leq 3$ such that the $0.91 \leq R_2O \leq 20$, $0 \leq RO \leq 20$, $56.44 \leq SiO_2 + Al_2O_3 \leq 75$, $85 \leq SiO_2 + Al_2O_3 + MgO + CaO + SrO + BaO + Li_2O + Na_2O + K_2O + Fe_2O_3 + TiO_2 \leq 100$, $10 < 7Al_2O_3 + 3MgO - 4Li_2O \leq 66$, and $0 \leq Na_2O/R_2O \leq 0.8$, by mol % based on oxides, where $R_2O$ is a total content of alkali metal oxides, and RO is a total content of MgO, CaO, SrO, and BaO,
wherein the glass plate has a radio transmittance of at least 20% at a frequency of 100 GHz as calculated as 18 mm thickness.

2. The glass plate according to claim 1, wherein the composition of the glass has $60 \leq SiO_2 \leq 73$, $0 \leq MgO \leq 10$, $0.5 \leq CaO \leq 18$, $0.5 \leq SrO \leq 12$, $1 \leq Li_2O \leq 15$, $1 \leq Na_2O \leq 15$, $1 \leq K_2O \leq 15$, $0.5 \leq ZrO_2 \leq 1.8$, $5 \leq R_2O \leq 18$, $5 \leq RO \leq 19$, $11 \leq 7Al_2O_3 + 3MgO - 4Li_2O \leq 60$, $0.05 \leq Na_2O/R_2O \leq 0.6$ and $0 \leq ZnO \leq 2$ by mol % based on oxides.

3. The glass plate according to claim 1, wherein the glass plate has a radio transmittance of at least 25% at a frequency of 100 GHz as calculated as 18 mm thickness.

4. The glass plate according to claim 1, wherein the glass plate has a radio transmittance of at most 84% at a frequency of 100 GHz as calculated as 18 mm thickness.

5. The glass plate according to claim 1, which satisfies a linear approximation of y>(0.0607×x), wherein y (V/m) is the electric field strength at a measurement point 10λ apart from the opening, and x is a value obtained by dividing the opening area S (mm$^2$) by $\lambda^2$, when plane waves at a frequency of 10 GHz at an electric field strength of 1 V/m are made to enter the glass plate having a thickness of 1.2λ from a wave source 2λ apart from an opening.

6. The glass plate according to claim 1, which satisfies an exponential approximation of y'>exp(−0.081×x'), wherein y' is the approximate transmittance at a frequency of 100 GHz, and x' is the thickness (mm) of the glass plate.

7. The glass plate according to claim 1, which satisfies an exponential approximation y"=[constant 1]×e$^{[constant\ 2]\times x''}$, of y">0.8619e$^{-0.015x''}$ of the relation between the frequency x" and the radio transmittance y" at a frequency of from 6 to 20 GHZ, as calculated as 18 mm thickness.

8. The glass plate according to claim 1, which has an area of at least 900 mm².

9. The glass plate according to claim 1, which has a specific gravity of from 2.40 to 3.00, a Young's modulus of from 60 GPa to 100 GPa and an average coefficient of linear expansion from 50° C. to 350° C. of from $35 \times 10^{-7}$ to $120 \times 10^{-7}$.

10. The glass plate according to claim 1, which has a $Na_2O$ elution amount of from 0.001 mg to 0.6 mg in a water resistance test.

11. The glass plate according to claim 1, wherein a temperature at which the glass viscosity becomes $10^2$ dPa·s $T_2$ is at most 1,750° C., a temperature at which the glass viscosity becomes $10^4$ dPa·s $T_4$ is at most 1,350° C., and $T_4$-$T_L$ is at least −150° C., wherein $T_L$ is the liquid phase temperature of the glass.

12. The glass plate according to claim 1, which has a glass transition point Tg of from 400° C. to 750° C.

13. The glass plate according to claim 1, which has a visible light transmittance $T_{VA}$ of from 30 to 92% as calculated as 3.85 mm plate thickness.

14. The glass plate according to claim 1, which has a solar direct transmittance Te of from 35 to 91% as calculated as 3.85 mm plate thickness.

15. The glass plate according to claim 1, wherein A×radio transmittance is from 0.0225 m²·% to 8,400 m²·%, wherein A is the area (m²) of the glass plate.

16. The glass plate according to claim 1, wherein radio transmittance/t is from 0.7%/mm to 84%/mm, wherein t is the thickness (mm) of the glass plate.

17. A radio communication apparatus, comprising:
the glass plate of claim 1.

18. A window, comprising:
the glass plate of claim 1.

19. The window according to claim 18, which is suitable for an automobile or suitable for a building.

* * * * *